(12) United States Patent
Kouma et al.

(10) Patent No.: US 8,520,279 B2
(45) Date of Patent: Aug. 27, 2013

(54) MICRO MOVABLE DEVICE AND INTERFEROMETER

(75) Inventors: Norinao Kouma, Kawasaki (JP); Osamu Tsuboi, Kawasaki (JP); Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 12/614,903

(22) Filed: Nov. 9, 2009

(65) Prior Publication Data

US 2010/0208347 A1 Aug. 19, 2010

(30) Foreign Application Priority Data

Feb. 13, 2009 (JP) .................................. 2009-031368

(51) Int. Cl.
*G02B 26/08* (2006.01)
(52) U.S. Cl.
USPC .................. 359/200.6; 359/198.1; 359/201.2; 359/221.2; 310/309; 356/900
(58) Field of Classification Search
USPC .............................. 359/199.2, 200.6; 310/309
See application file for complete search history.

(56) References Cited

U.S. PATENT DOCUMENTS

| 7,324,251 | B2 | 1/2008 | Tsuboi et al. | |
| 7,344,262 | B2 | 3/2008 | Greywall | |
| 2003/0210511 | A1 | 11/2003 | Sakai et al. | |
| 2004/0119376 | A1 * | 6/2004 | Chou et al. | 310/309 |
| 2006/0119216 | A1 | 6/2006 | Kouma et al. | |
| 2006/0279169 | A1 * | 12/2006 | Yoda et al. | 310/309 |
| 2007/0110334 | A1 | 5/2007 | Takahashi et al. | |
| 2008/0284279 | A1 * | 11/2008 | Obi | 310/309 |
| 2009/0122380 | A1 | 5/2009 | Suzuki | |

FOREIGN PATENT DOCUMENTS

| JP | 2006-102934 A | 4/2006 |
| JP | 2006-162663 A | 6/2006 |
| JP | 2007-017565 A | 1/2007 |
| JP | 2007-139543 A | 6/2007 |
| JP | 2008-294455 A | 12/2008 |
| WO | 2004/034124 A1 | 4/2004 |
| WO | 2004/034126 A1 | 4/2004 |

OTHER PUBLICATIONS

Japanese Office Action dated Apr. 2, 2013, issued in corresponding Japanese Patent Application No. 2009-031368, w/ English translation.

* cited by examiner

*Primary Examiner* — James Phan
(74) *Attorney, Agent, or Firm* — Westerman, Hattori, Daniels & Adrian, LLP

(57) ABSTRACT

A micro movable device includes a movable member, a stationary portion, and connecting portions each connected to the movable member and the stationary portion. The movable member includes a pair of electrodes. The stationary portion includes a pair of electrodes cooperating with the electrodes of the movable member to generate a driving force for translating the movable member in its thickness direction. The connection points at which the respective connecting portions are connected to the movable member are spaced from each other. The electrodes of the movable member are positioned between two mutually spaced connection points, as viewed along the spacing direction of the two connection points.

15 Claims, 48 Drawing Sheets

US 8,520,279 B2

MICRO MOVABLE DEVICE AND INTERFEROMETER

CROSS-REFERENCE TO RELATED APPLICATION

This application is based upon and claims the benefit of priority of the prior Japanese Patent Application No. 2009-031368, filed on Feb. 13, 2009, the entire contents of which are incorporated herein by reference.

FIELD

The embodiments discussed herein are related to micro movable devices and interferometers incorporating a micro mirror device.

BACKGROUND

Nowadays, very small devices are produced by micro machine technology and widely used in various technical fields. Examples of such devices include micro mirror devices, angular velocity sensors and acceleration sensors, all of which are provided with a tiny movable member. Among these, micro mirror devices are used for light reflection, in the field of e.g. optical disks or optical communication. Angular velocity sensors and acceleration sensors are utilized for providing e.g. a camera shake compensation system of video cameras or camera-equipped mobile phones, a car navigation system, an airbag release timing system, and an attitude control system of automobiles or robots. Typically, a micro movable device includes a stationary portion, a movable member, a connecting portion to connect the movable member to the stationary portion, and a driving mechanism for generating a driving force to move the movable member. The driving force may be adjustable so as to control the displacement of the movable member in operation. Conventional micro movable device are described, for example, in International Publication Pamphlet No. WO 2004/034124, Japanese Laid-open Patent Publication No. 2006-162663, and US Patent Application Publication No. 2004/0119376.

SUMMARY

According to an aspect of the embodiment, a micro movable device is provided, which includes: a movable member provided with a pair of first electrodes spaced from each other; a stationary portion provided with a pair of second electrodes cooperating with the first electrodes to generate a driving force for translating the movable member in a direction crossing the spacing direction in which the first electrodes are spaced from each other; and a plurality of connecting portions each connected to the movable member and the stationary portion. The connecting portions may include a first connecting portion and a second connecting portion, where the first connecting portion is connected to the movable member at a first connection point, and the second connecting portion is connected to the movable member at a second connection point that is spaced from the first connection point. The first electrodes are positioned between the first connection point and the second connection point, as viewed along the spacing direction in which the first connection point and the second connection point are spaced from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
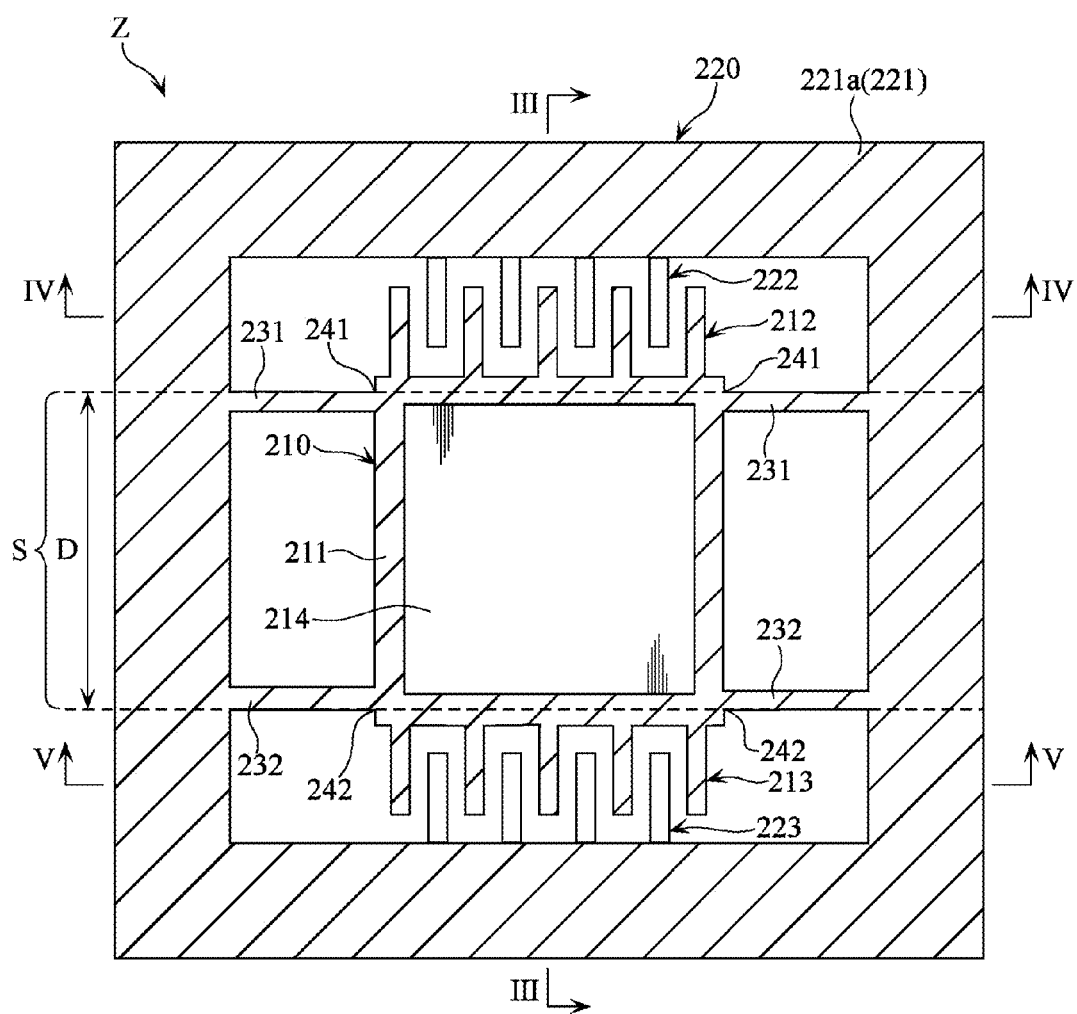
FIG. 1 is a plan view illustrating a micro mirror device as a related art.
Figure 2:
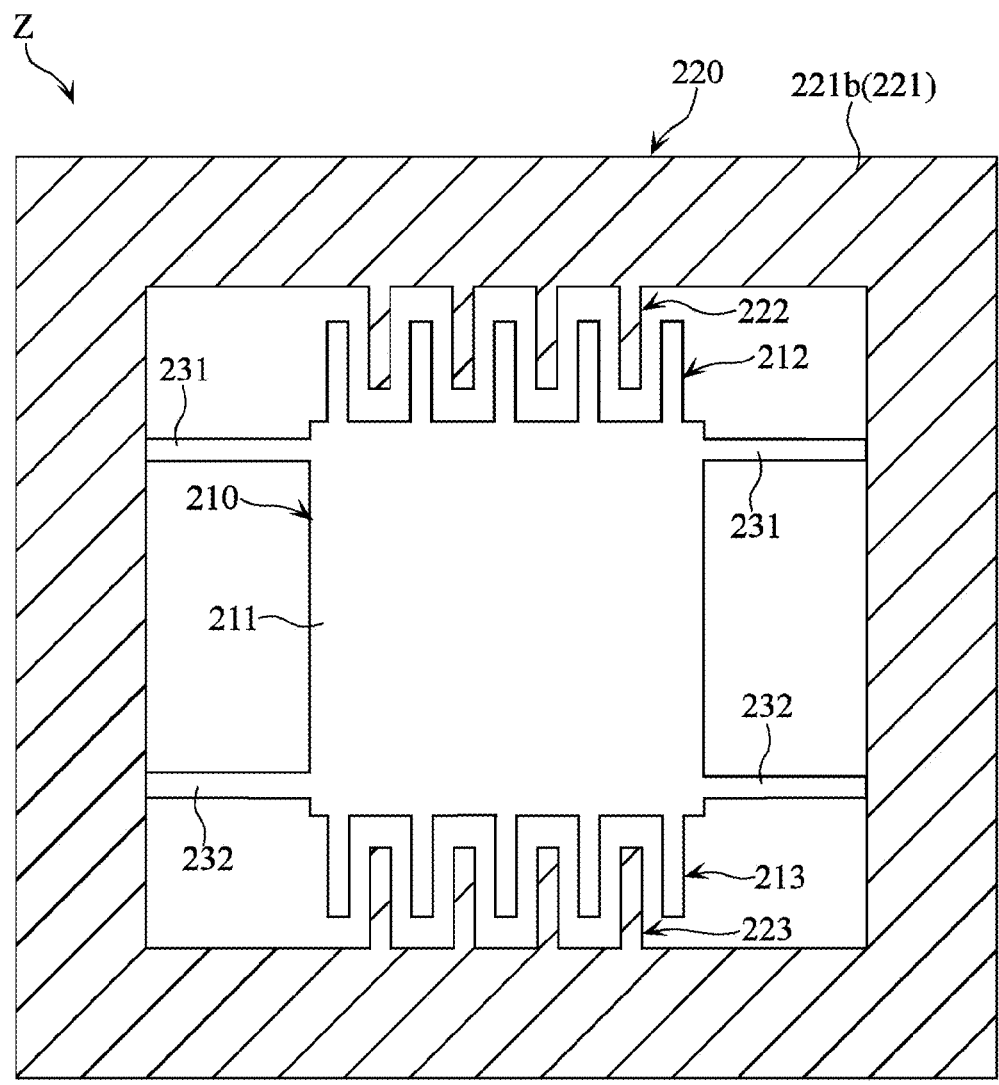
FIG. 2 is another plan view of the micro mirror device illustrated in FIG. 1.
Figure 3:
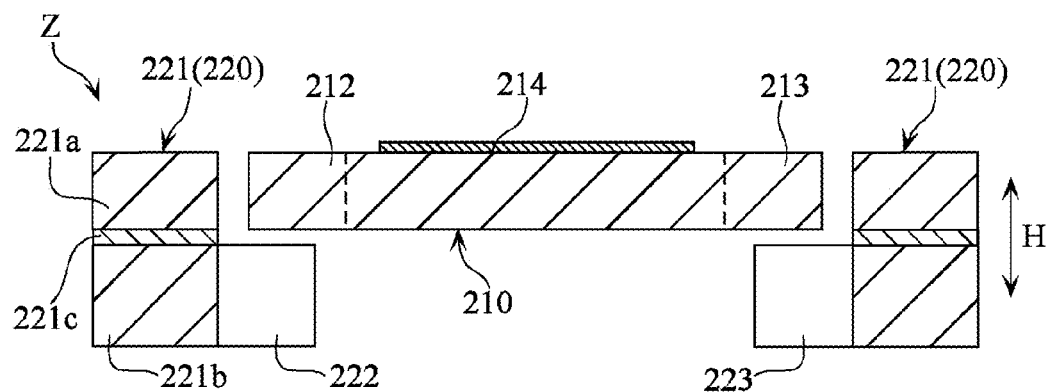
FIG. 3 is a sectional view taken along lines III-III in FIG. 1.
Figure 4:
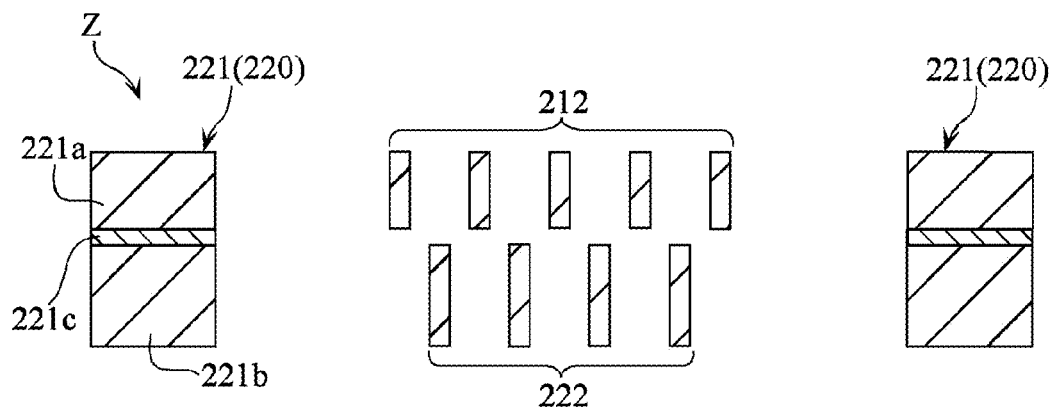
FIG. 4 is a sectional view taken along lines IV-IV in FIG. 1.
Figure 5:
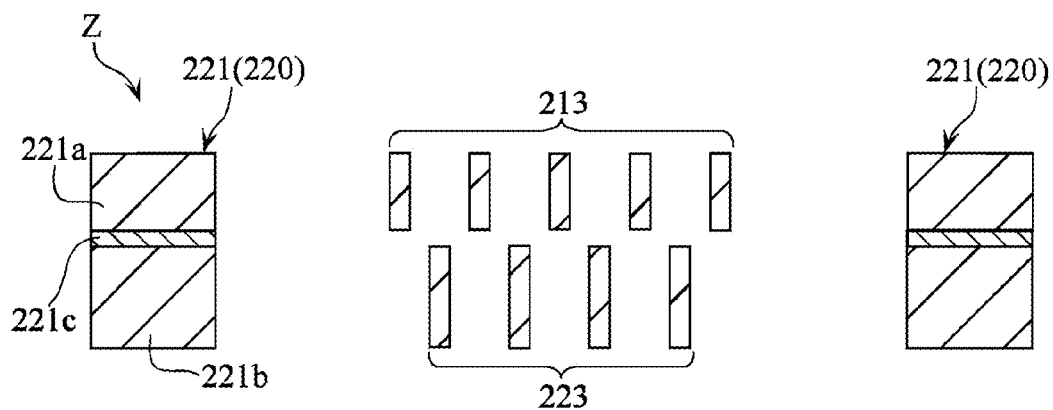
FIG. 5 is a sectional view taken along lines V-V in FIG. 1.

FIGS. 1-5 illustrate a micro mirror device Z. FIG. 1 is a plan view of the micro mirror device Z. FIG. 2 is a plan view of the other side of the micro mirror device Z illustrated in FIG. 1. FIGS. 3-5 are sectional views taken along lines III-III in FIG. 1, lines IV-IV in FIG. 1 and lines V-V in FIG. 1, respectively.

The micro mirror device Z includes a movable member 210, a stationary portion 220, a pair of connection bars 231 and a pair of connection bars 232. The micro mirror device Z is made by processing an SOI (silicon on insulator) wafer by bulk micromachining such as MEMS. The SOI wafer has a laminated structure made up of a first silicon layer, a second silicon layer and an insulating layer intervening between the two silicon layers. Each of the silicon layers is electrically conductive due to the doping of impurity. The above-described portions of the micro mirror device Z are mainly made of the first silicon layer and/or the second silicon layer. For a better understanding, the portions made of the first silicon layer are indicated by hatching in FIG. 1, whereas the portions made of the second silicon layer are indicated by hatching in FIG. 2.

The movable member 210 is made of the first silicon layer and includes a land 211, and electrodes 212 and 213. On the land 211, a mirror surface 214 having a light reflecting function is provided. Each of the electrodes 212 and 213 has a comb-tooth electrode structure including a set of electrode teeth projecting from an edge of the land 210. The electrodes 212 and 213 are electrically connected to each other via the land 211.

The stationary portion 220 includes a frame 221, and electrodes 222 and 223. As illustrated in FIGS. 1 and 2, the frame 221 surrounds the movable member 210. As illustrated in FIGS. 3-5, the frame 221 has a laminated structure made up of a first layer 221a made of the first silicon layer, a second layer 221b made of the second silicon layer, and an insulating layer 221c intervening between the first and the second layers 221a and 221b. The first layer 221a and the second layer 221b are electrically separated. The electrodes 222 and 223 are made of the second silicon layer. Each of the electrodes 222 and 223 has a comb-tooth electrode structure including a set of electrode teeth projecting from the second layer 221b of the frame 221 toward the movable member 210. The electrode 222 is arranged to face the above-described electrode 212 and cooperates with the electrode 212 to generate an electrostatic attraction force. The electrode 223 is arranged to face the above-described electrode 213 and cooperates with the electrode 213 to generate an electrostatic attraction force. The electrodes 222 and 223 are electrically connected to each other via the second layer 221b of the frame 221.

The connection bars 231 and 232 are made of the first silicon layer and connect the movable member 210 and the stationary portion 220 to each other. Each of the connection bars 231 is connected to the land 211 of the movable member 210 at a position adjacent to the electrode 212 and also connected to the first layer 221a of the frame 221. The point at which each of the connection bars 231 and the movable member 210 are connected to each other is referred to as a connection point 241. Each of the connection bars 232 is connected to the land 211 of the movable member 210 at a position adjacent to the electrode 213 and also connected to the first layer 221a of the frame 221. The points at which each of the connection bars 232 and the movable member 210 are connected to each other are referred to as a connection point 242.

Figure 6:
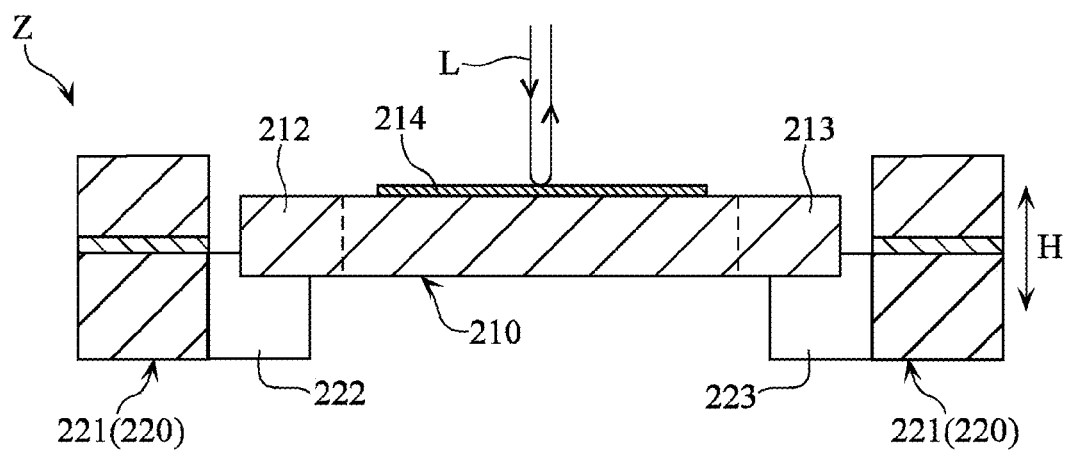
FIG. 6 is a sectional view taken along lines III-III in FIG. 1, illustrating the state in which the movable member of the micro mirror device of FIG. 1 is translated.

In the micro mirror device Z, by applying a driving voltage across the electrodes 212, 213 and the electrodes 222, 223, the movable member 210 is translated in the thickness direction H indicated in FIG. 3. The potential application to the electrodes 212 and 213 by the voltage application is achieved via the first layer 221a of the frame 221 of the stationary portion 220, the connection bars 231, 232 and the land 211 of the movable member 210. To the electrodes 212 and 213, e.g. a ground potential is applied. The potential application to the electrodes 222 and 223 by the voltage application is achieved via the second layer 221b of the frame 221 of the stationary portion 220. By the application of a potential difference between the electrode 212, 213 and the electrode 222, 223, an electrostatic attraction force is generated between the electrodes 212 and 222 as well as between the electrodes 213 and 223. As a result, the electrodes 212 and 213 are attracted to the electrodes 222 and 223, respectively. Thus, tension is applied to the connection bars 231 and 232 to cause the connection bars 231 and 232 to be elastically deformed. As illustrated in FIG. 6, due to the attraction of the electrodes 212 and 213 to the electrodes 222 and 223, the movable member 210 is translated in the thickness direction H. When the electrostatic attraction force is eliminated, the connection bars 231 and 232 recover the original shape, and the movable member 210 returns to the initial position (position in the natural state) illustrated in FIG. 3. When the light L is to impinge on the mirror surface 214 on the land 211 at right angles for reflection, the reflection position of the light L on the mirror surface 214 can be changed by translating the movable member 210 in the above-described manner, so that the optical path length of the light L can be changed. In FIG. 6, for a better understanding, the light paths of the light L before and after reflection are depicted as non-overlapping lines. (This applies for light L depicted in other figures described below.)

Figure 7:
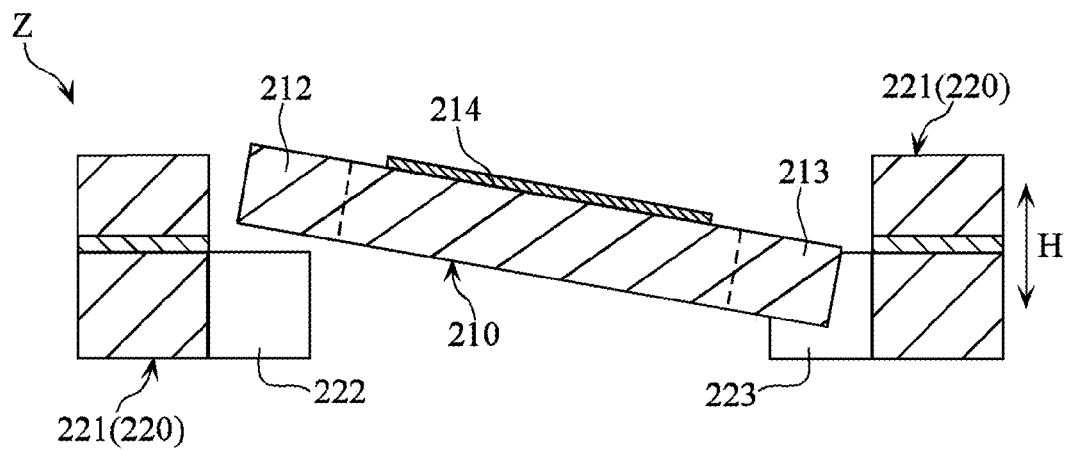
FIG. 7 is a sectional view taken along lines III-III in FIG. 1, illustrating the state in which the movable member of the micro mirror device of FIG. 1 is rotated.

In the micro mirror device Z, the movable member 210 easily rotates because of the following reasons. In the micro mirror device Z, the connection bars 231 and 232 are connected to the movable member 210 at locations between the electrodes 212 and 213. That is, the entirety of the electrodes 212 and 213 is positioned in an external region outside an internal region S. Herein, the internal region S is the region extending from the paired connection points 241 to the paired connection points 242 in the spacing direction D in which the electrodes 212 and 213 are spaced from each other. Thus, when the micro mirror device Z is driven, the electrostatic attraction force as the driving force is applied to the movable member 21 in the external region. Specifically, with the paired connection points 241 serving as the fulcrum, the first electrostatic attraction force generated between the electrodes 212 and 222 acts on the movable member 210 and the electrode 212 as a first rotation force. At the same time, with the paired connection points 242 serving as the fulcrum, the second electrostatic attraction force generated between the electrodes 213 and 223 acts on the movable member 210 and the electrode 213 as a second rotation force. Even when the movable member 210 including the electrodes 212 and 213 and the stationary portion 220 including the electrodes 222 and 223 are so designed that the first and the second rotation forces be equal to each other, the two rotation forces cannot be actually equal, because the actual dimension of each part is different from the design dimension due to manufacturing errors. Specifically, even when the movable member 210 and the stationary portion 220 are designed to have a symmetrical shape so that the first and the second electrostatic attraction forces be equal in magnitude, manufacturing errors cause inequality in shape of the movable member 210 or the stationary portion 220 on two sides. As a result, the first and the second electrostatic attraction forces cannot be equal in magnitude. Thus, one of the first electrostatic attraction force and the second electrostatic attraction force, that is larger, acts more powerfully on the movable member 210 as a rotation driving force, whereby the rotation of the movable member 210 is induced. For instance, when the second electrostatic attraction force generated between the electrodes 213 and 223 is larger than the first electrostatic attraction force generated between the electrodes 212 and 222, the second electrostatic attraction force acts more powerfully on the movable member 210 as a rotation driving force. In this case, the movable member 210 rotates as illustrated in FIG. 7. In this way, the movable member 210 of the micro mirror device Z rotates easily. When the movable member 210 rotates, the light L impinging on the mirror surface 214 on the movable member 210 may not be reflected in a proper direction.

Figure 8:
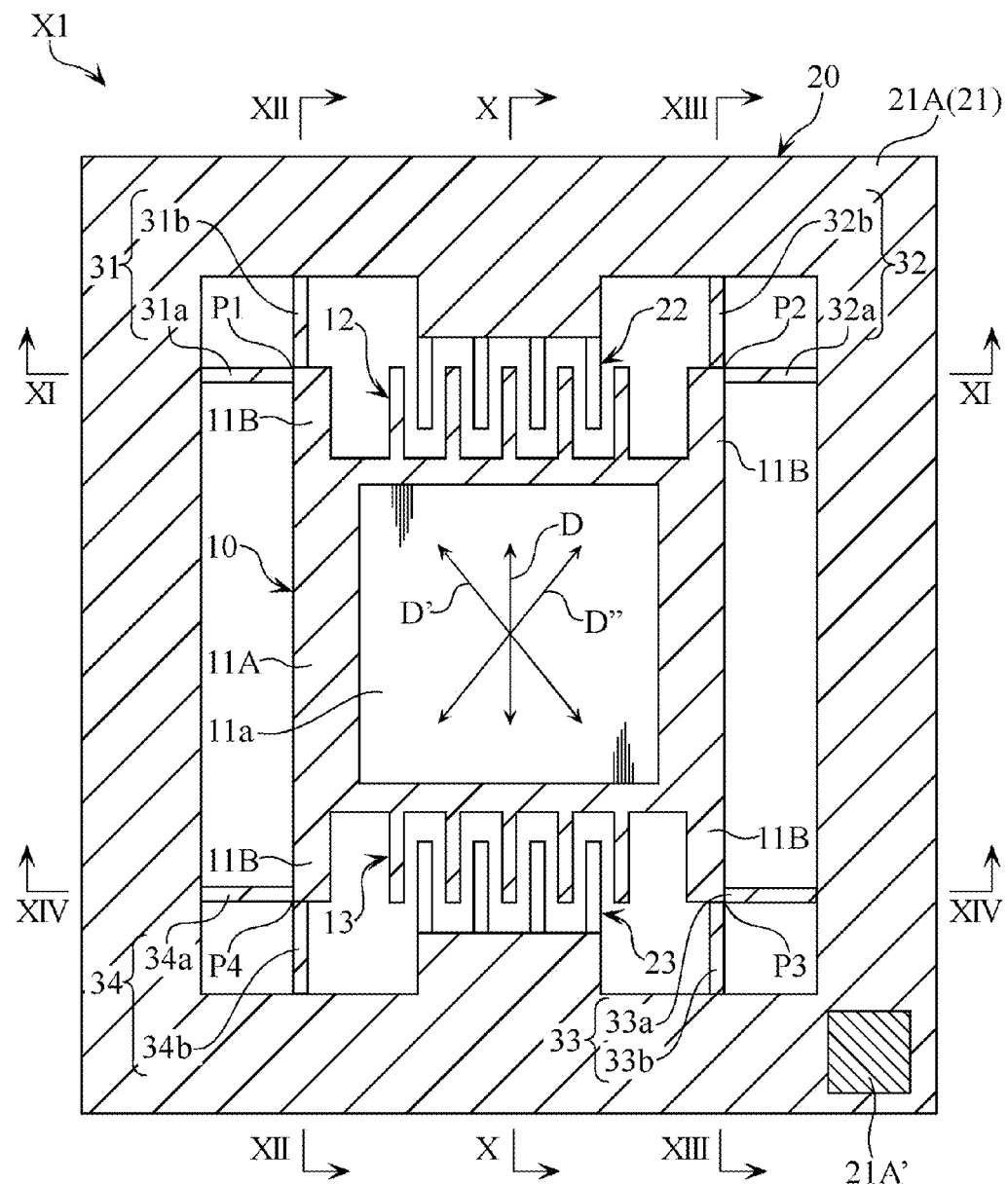
FIG. 8 is a plan view illustrating a micro movable device according to a first embodiment.
Figure 9:
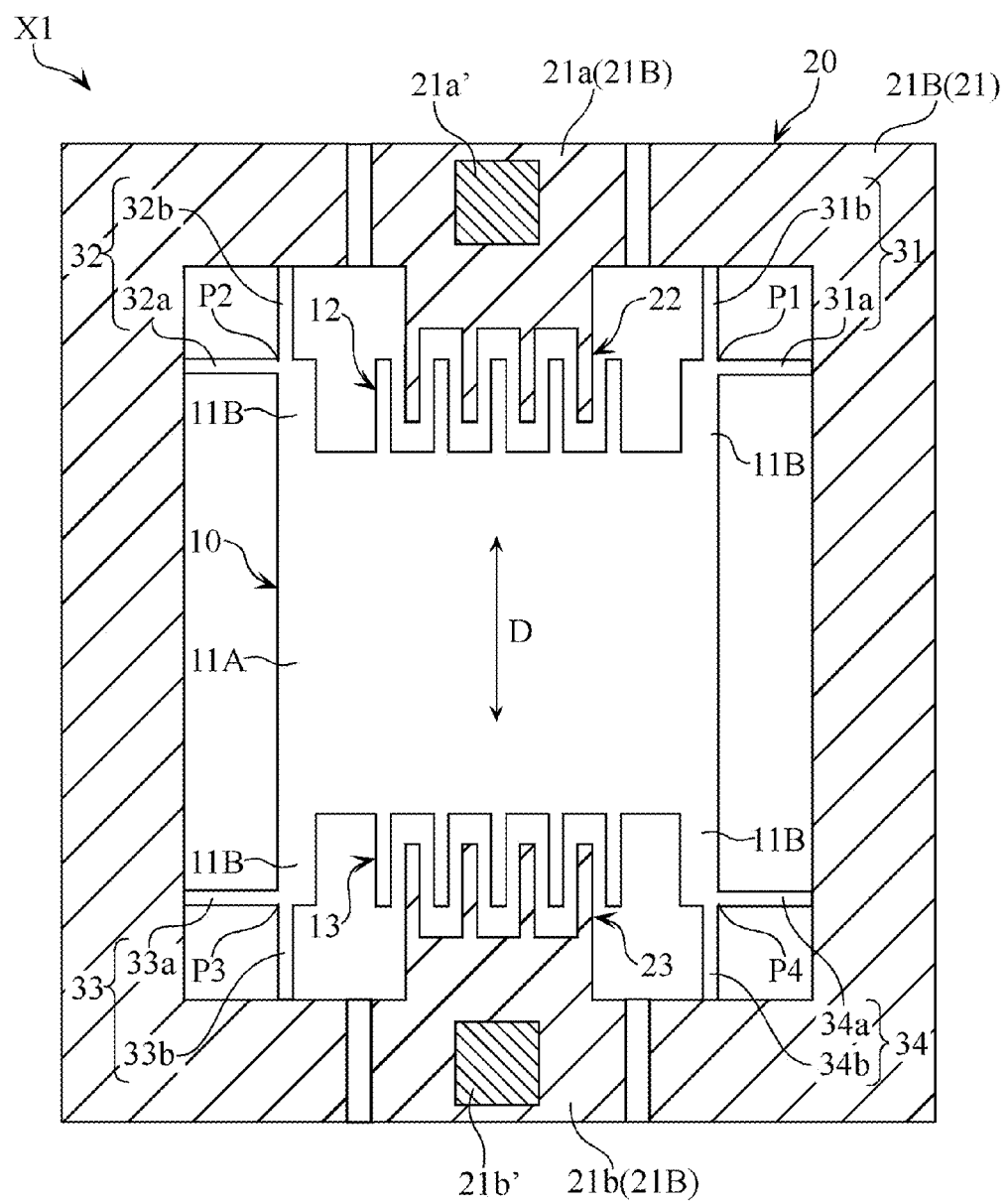
FIG. 9 is another plan view of the micro movable device illustrated in FIG. 8.

FIGS. 8-14 illustrate a micro movable device X1 according to a first embodiment. FIG. 8 is a plan view of the micro movable device X1. FIG. 9 is another plan view of the micro movable device X1. FIGS. 10-14 are sectional views taken along lines X-X in FIG. 8, lines XI-XI in FIG. 8, lines XII-XII in FIG. 8, lines XIII-XIII in FIG. 8 and lines XIV-XIV in FIG. 8, respectively.

The micro movable device X1 is a micro mirror device including a movable member 10, a stationary portion 20 and connecting portions 31, 32, 33 and 34. The micro movable device X1 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X1 are mainly made of the first silicon layer and/or the second silicon layer. FIG. 8 illustrates the first silicon layer side, whereas FIG. 9 illustrates the second silicon layer side. For a better understanding, the portions made of the first silicon layer are indicated by hatching in FIG. 8, whereas the portions made of the second silicon layer are indicated by hatching in FIG. 9.

The movable member 10 is mainly made of the first silicon layer. The movable member 10 includes a rectangular land 11A, four arms 11B and electrodes 12 and 13. On the land 11A, a mirror surface 11a having a light reflecting function is provided. Each of the arms 11B extends from a respective one of the corners of the land 11A. Each of the electrodes 12 and 13 has a comb-tooth electrode structure including a set of electrode teeth projecting from an edge of the land 11A. The electrodes 12 and 13 are electrically connected to each other via the land 11A.

The stationary portion 20 includes a frame 21, and electrodes 22 and 23. As illustrated in FIGS. 8 and 9, the frame 21 surrounds the movable member 10. As illustrated in FIGS. 10-14, the frame 21 has a laminated structure made up of a first layer 21A made of the first silicon layer, a second layer 21B made of the second silicon layer, and an insulating layer 21C intervening between the first and the second layers 21A and 21B. The second layer 21B includes portions 21a and 21b. The first layer 21A and the second layer 21B are electrically separated. The portions 21a and 21b are electrically separated. As illustrated in FIG. 8, an electrode pad 21A' is provided on the first layer 21A. As illustrated in FIG. 9, electrode pads 21a' and 21b' are provided on the portions 21a and 21b of the second layer 21B.

Figure 10:
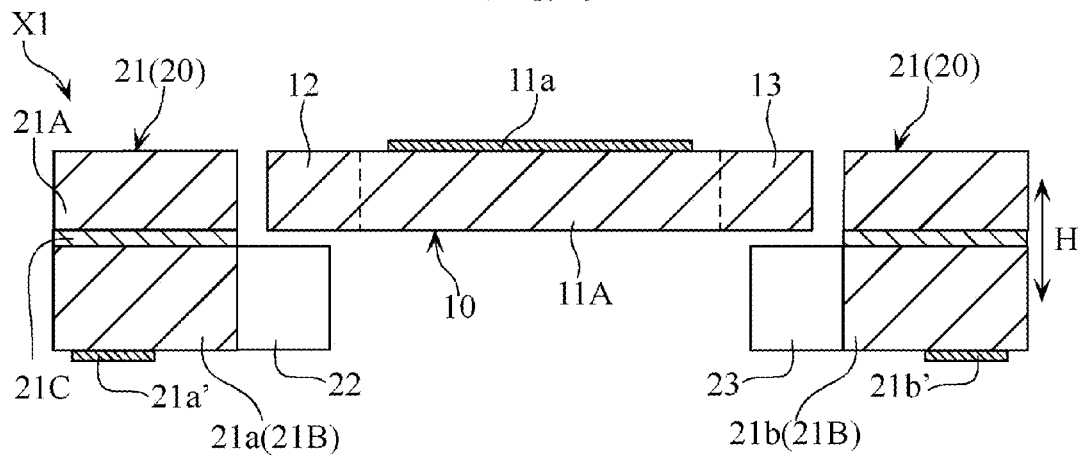
FIG. 10 is a sectional view taken along lines X-X in FIG. 8.

The electrodes 22 and 23 are made of the second silicon layer. The electrode 22 has a comb-tooth electrode structure including a set of electrode teeth projecting from the portion 21a of the second layer 21B of the frame 21 toward the movable member 10. The electrode 22 is arranged to face the above-described electrode 12 as illustrated in FIG. 10 and cooperates with the electrode 12 to generate an electrostatic attraction force. The electrode 23 has a comb-tooth electrode structure including a set of electrode teeth projecting from the portion 21b of the second layer 21B toward the movable member 10. The electrode 23 is arranged to face the above-described electrode 13 and cooperates with the electrode 13 to generate an electrostatic attraction force. The electrodes 22 and 23 are electrically separated.

Figure 11:
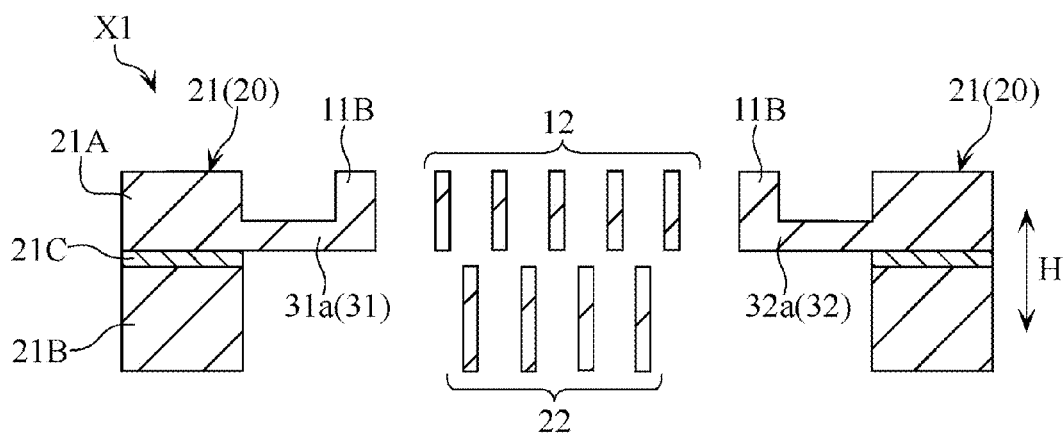
FIG. 11 is a sectional view taken along lines XI-XI in FIG. 8.
Figure 12:
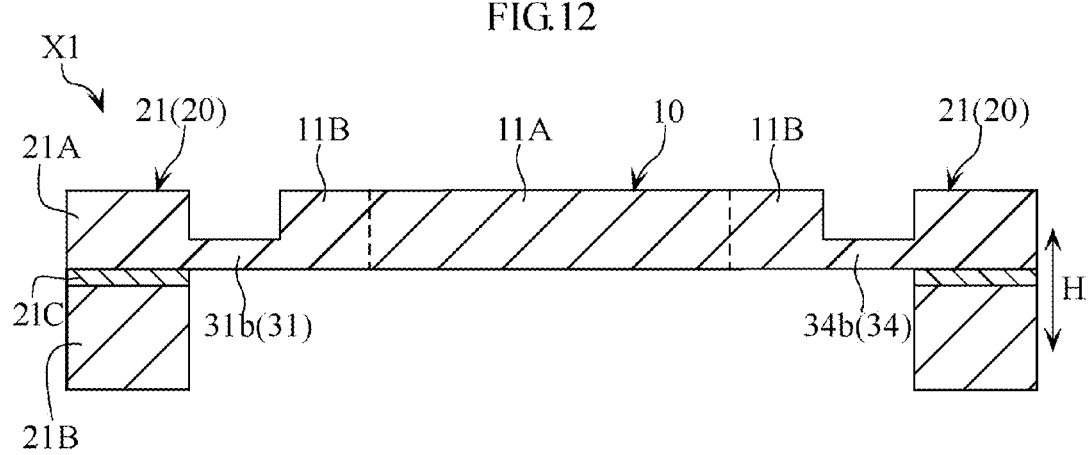
FIG. 12 is a sectional view taken along lines XII-XII in FIG. 8.

The connecting portions 31-34 are made of the first silicon layer and connect the movable member 10 and the stationary portion 20 to each other, as illustrated in FIG. 8. The connecting portion 31 is made up of a connection bar 31a extending perpendicularly to the spacing direction D of the electrodes 12 and 13 and a connection bar 31b extending in the spacing direction D of the electrodes 12 and 13. The connecting portion 31, i.e., the connection bars 31a and 31b are connected to one of the arms 11B of the movable member 10 and also connected to the first layer 21A of the frame 21 of the stationary portion 20. The point at which the connecting portion 31 and the arm 11B of the movable member are connected to each other is referred to as a connection point P1. As illustrated in FIGS. 11 and 12, the connecting portion 31 (connection bars 31a and 31b) is smaller in thickness than the movable member 10 and the first layer 21A of the frame 21.

Figure 13:
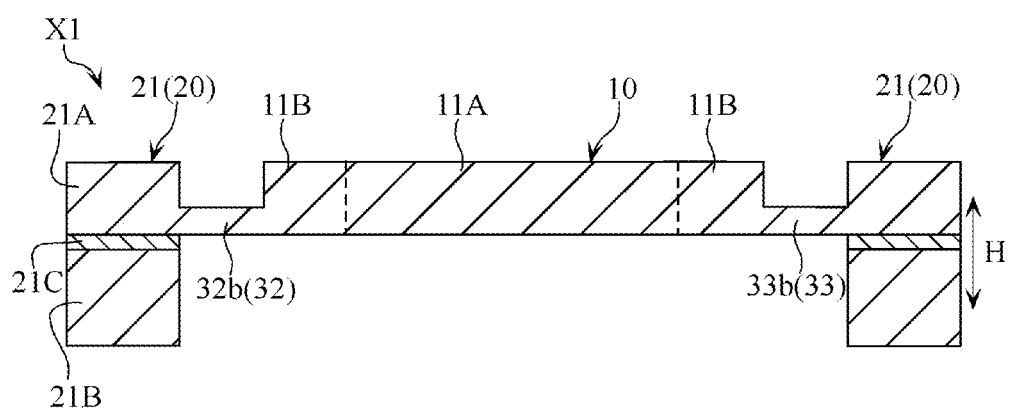
FIG. 13 is a sectional view taken along lines XIII-XIII in FIG. 8.

The connecting portion 32 is made up of a connection bar 32a extending perpendicularly to the spacing direction D of the electrodes 12 and 13 and a connection bar 32b extending in the spacing direction D of the electrodes 12 and 13. The connecting portion 32, i.e., the connection bars 32a and 32b are connected to one of the arms 11B of the movable member 10 and also connected to the first layer 21A of the frame 21 of the stationary portion 20. The point at which the connecting portion 32 and the arm 11B of the movable member 10 are connected to each other is referred to as a connection point P2. As illustrated in FIGS. 11 and 13, the connecting portion 32 (connection bars 32a and 32b) is smaller in thickness than the movable member 10 and the first layer 21A of the frame 21.

Figure 14:
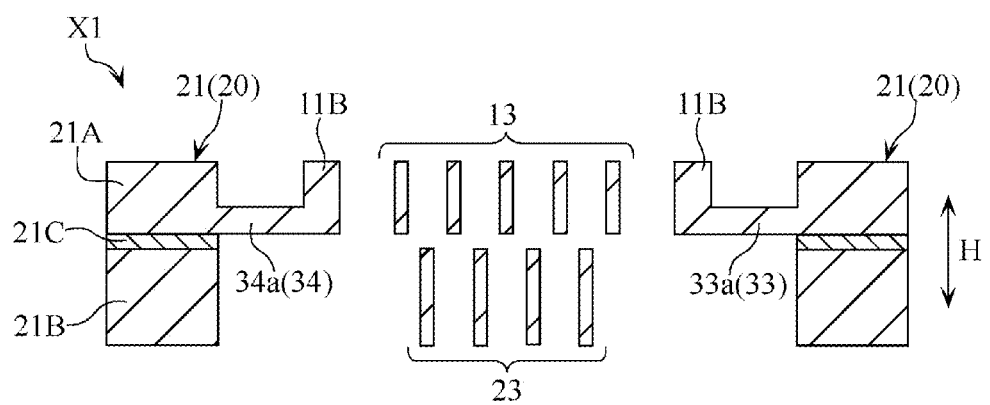
FIG. 14 is a sectional view taken along lines XIV-XIV in FIG. 8.

The connecting portion 33 is made up of a connection bar 33a extending perpendicularly to the spacing direction D of the electrodes 12 and 13 and a connection bar 33b extending in the spacing direction D of the electrodes 12 and 13. The connecting portion 33, i.e., the connection bars 33a and 33b are connected to one of the arms 11B of the movable member 10 and also connected to the first layer 21A of the frame 21 of the stationary portion 20. The point at which the connecting portion 33 and the arm 11B of the movable member 10 are connected to each other is referred to as a connection point P3. As illustrated in FIGS. 13 and 14, the connecting portion 33 (connection bars 33a and 33b) is smaller in thickness than the movable member 10 and the first layer 21A of the frame 21.

The connecting portion 34 is made up of a connection bar 34a extending perpendicularly to the spacing direction D of the electrodes 12 and 13 and a connection bar 34b extending in the spacing direction D of the electrodes 12 and 13. The connecting portion 34, i.e., the connection bars 34a and 34b are connected to one of the arms 11B of the movable member 10 and also connected to the first layer 21A of the frame 21 of the stationary portion 20. The point at which the connecting portion 34 and the arm 11B of the movable member 10 are connected to each other is referred to as a connection point P4. As illustrated in FIGS. 12 and 14, the connecting portion 34 (connection bars 34a and 34b) is smaller in thickness than the movable member 10 and the first layer 21A of the frame 21.

Figure 15:
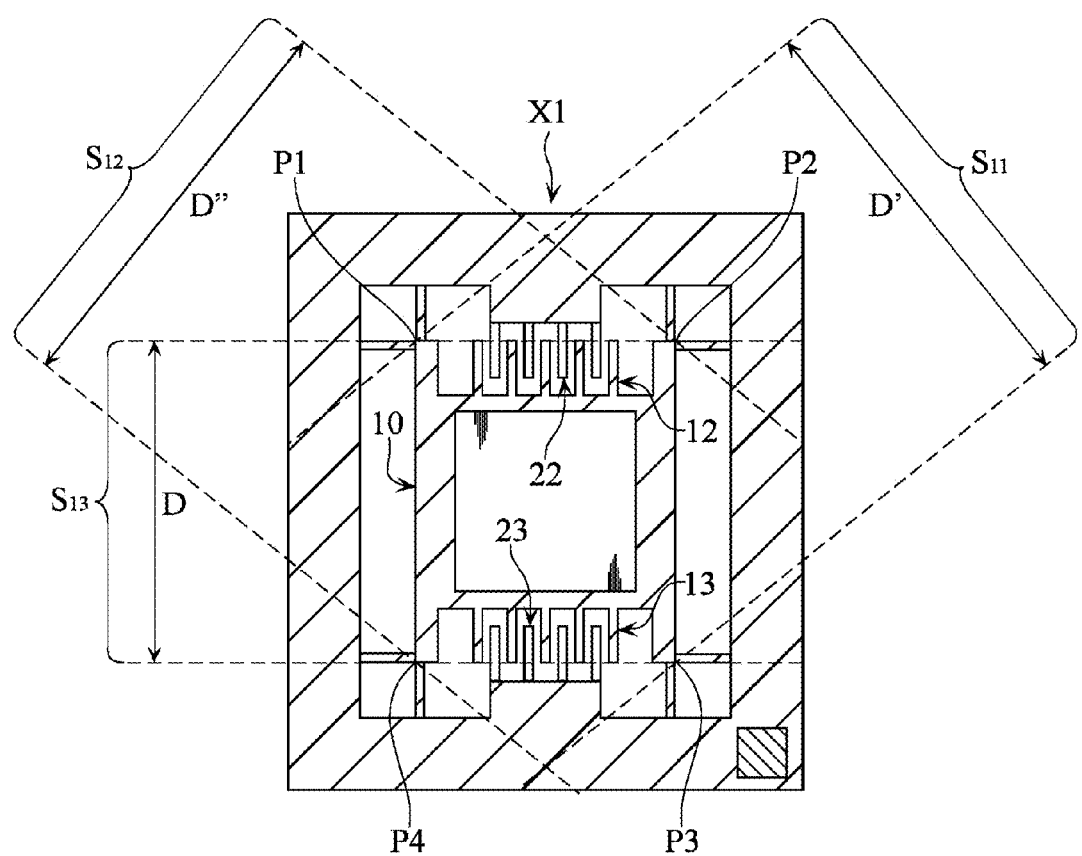
FIG. 15 is a plan view illustrating internal regions according to the first embodiment.

As illustrated in FIG. 15, in the micro movable device X1, the entirety of the electrodes 12 and 13 of the movable member 10, which are utilized for generating an electrostatic attraction force with the electrodes 22 and 23, is positioned within the internal region $S_{11}$ extending between the connection points P1 and P3 in the spacing direction D' in which the connection points P1 and P3 are spaced from each other. The entirety of the electrodes 12 and 13 is also positioned within the internal region $S_{12}$ extending between the connection points P2 and P4 in the spacing direction D" in which the connection points P2 and P4 are spaced from each other. The entirety of the electrodes 12 and 13 is also positioned within the internal region $S_{13}$ extending between a set of connection points P1, P2 and a set of connection points P3, P4 in the spacing direction D in which the set of connection points P1, P2 and the set of connection points P3, P4 are spaced from each other. The entirety of the electrodes 12 and 13 is also positioned within the region extending between a set of connection points P1, P4 and a set of connection points P2, P3 in the spacing direction in which the set of connection points P1, P4 and the set of connection points P2, P3 are spaced from each other (i.e., the direction perpendicular to the spacing direction D).

In the micro movable device X1, the movable member 10 is translated in the thickness direction H indicated in FIG. 10 by applying a driving voltage across the electrodes 12 and 22 and across the electrodes 13 and 23. The potential application to the electrodes 12 and 13 by the voltage application is achieved via the electrode pad 21A' on the first layer 21A of the frame 21 of the stationary portion 20, the first layer 21A, the connecting portions 31-34, and the arms 11B and land 11A of the movable member 10. To the electrodes 12 and 13, e.g. a ground potential is applied. The potential application to the electrode 22 by the voltage application is achieved via the electrode pad 21a' on the portion 21a of the second layer 21B of the frame 21 of the stationary portion 20 and the portion 21a. The potential application to the electrode 23 is achieved via the electrode pad 21b' on the portion 21b of the second layer 21B of the frame 21 and the portion 21b. The potential to be applied to the electrodes 22 and 23 can be set individually for each electrode.

Figure 16:
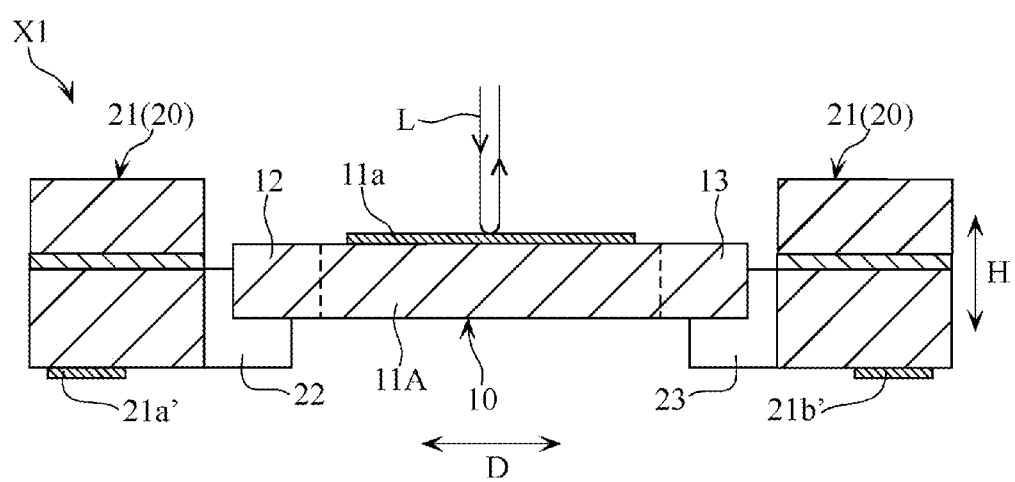
FIG. 16 is a sectional view taken along lines X-X in FIG. 8, illustrating the state in which the movable member of the micro movable device according to the first embodiment is translated.

When no voltage is applied across the electrodes 12, 22 and across the electrodes 13, 23, the movable member 10, which is connected to the stationary portion 20 via the connecting portions 31-34, is at a position in the natural state, as illustrated in FIG. 10. When a potential difference is generated by the application of a driving voltage across the electrodes 12 and 22, an electrostatic attraction force is generated between the electrodes 12 and 22. When a potential difference is generated by the application of a driving voltage across the electrodes 13 and 23, an electrostatic attraction force is generated between the electrodes 13 and 23. The electrostatic attraction forces generated in this way act on the electrodes 12 and 13 as a driving force, so that the electrodes 12 and 13 of the movable member 10 are attracted to the electrodes 22 and 23 of the stationary portion 20, respectively. In this process, tension is applied to the connection bars 31a, 31b, 32a, 32b, 33a, 33b, 34a and 34b of the connecting portions 31-34, so that the connection bars are elastically deformed. As illustrated in FIG. 16, due to the attraction of the electrodes 12 and 13 to the electrodes and 23, the movable member 10 is translated in the thickness direction H. The direction of the translation crosses the spacing direction D of the electrodes 12 and 13. The amount of translation depends on the magnitude of the driving force applied to the electrodes 12 and 13 of the movable member 10. The amount of translation of the movable member 10 from the position in the natural state can be changed by controlling the voltage to be applied to each set of the electrodes and thereby adjusting the driving force.

When the electrostatic attraction force is eliminated, the connection bars 31a, 31b, 32a, 32b, 33a, 33b, 34a and 34b recover the original shape, and the movable member 10 returns to the initial position (position in the natural state) illustrated in FIG. 10.

When the light L is to impinge on the mirror surface 11a on the land 11A at right angles for reflection, the reflection position of the light L on the mirror surface 11a can be changed by translating the movable member 10 in the above-described manner, so that the optical path length of the light L can be changed.

As noted before, in the micro movable device X1, the entirety of the electrodes 12 and 13 of the movable member 10, which are utilized for generating an electrostatic attraction force with the electrodes 22 and 23, is positioned within the internal region $S_{11}$ extending between the connection points P1 and P3 in the spacing direction D' of the connection points P1 and P3. Thus, in translating the movable member 10 from the position in the natural state or changing the amount of the translation, the electrostatic attraction force as the driving force acts on the movable member 10, or the electrodes 12 and 13 within the internal region $S_{11}$. This is suitable for suppressing the rotation of the movable member 10 in translating the movable member 10 or changing the amount of the translation.

Unlike this embodiment, when the entirety or part of one of the electrodes 12 and 13 is positioned in an external region on one side of the internal region $S_{11}$, at least part of the electrostatic attraction force acts on the movable member 10 within the external region. In this case, due to the principle of leverage, the electrostatic attraction force acting in the external region induces the rotation of the movable member 10, with the connection point P1 or P3 that is closer to this electrostatic attraction force serving as the fulcrum. When the entirety of the electrode and the entirety of the electrode 13 are positioned in external regions on opposite sides of the internal region $S_{11}$, the electrostatic attraction force acts on the movable member 10 within the two external regions. Specifically, the first electrostatic attraction force generated between the electrodes 12 and 22 acts on the movable member 10 or the electrode 12 within one of the external regions as a first rotation force, with the connection point P1 serving as the fulcrum. At the same time, the second electrostatic attraction force generated between the electrodes 13 and 23 acts on the movable member 10 or the electrode 13 in the other external region as a second rotation force, with the connection point P3 serving as the fulcrum. Even when the movable member 10 including the electrodes 12 and 13 and the stationary portion 20 including the electrodes 22 and 23 are so designed that the first and the second rotation forces be equal to each other, the two rotation forces cannot be actually equal, because the actual dimension of each part is different from the design dimension due to manufacturing errors. Thus, one of the first rotation force (first electrostatic attraction force) and the second rotation force (second electrostatic attraction force), that is larger, acts more powerfully on the movable member 10 as a rotation driving force, whereby the rotation of the movable member 10 is induced. In this way, when the entirety of the electrodes 12 and 13 of the movable member 10 is not positioned within the internal region $S_{11}$, the movable member 10 easily rotates.

Unlike this, in the micro movable device X1 in which the entirety of the electrodes 12 and 13 of the movable member 10 is positioned within the internal region $S_{11}$, the electrostatic attraction force as the driving force acts on the movable member 10 within the internal region $S_{11}$. Thus, the rotation of the movable member 10 about the connection point P1 or P3 as the fulcrum is prevented.

As noted before, in the micro movable device X1, the entirety of the electrodes 12 and 13 of the movable member is positioned within the internal region $S_{12}$ extending between the connection points P2 and P4 in the spacing direction D" of the connection points P2 and P4. Thus, in translating the movable member 10 from the position in the natural state or changing the amount of the translation, the electrostatic attraction force as the driving force acts on the movable member 10, or the electrodes 12 and 13 within the internal region $S_{12}$. This is suitable for suppressing the rotation of the movable member 10 in translating the movable member 10 or changing the amount of the translation.

Unlike this embodiment, when the entirety or part of one of the electrodes 12 and 13 is positioned in an external region on one side of the internal region $S_{12}$, at least part of the electrostatic attraction force acts on the movable member 10 within the external region. In this case, due to the principle of leverage, the electrostatic attraction force acting in the external region induces the rotation of the movable member 10, with the connection point P2 or P4 that is closer to this electrostatic attraction force serving as the fulcrum. When the entirety of the electrode and the entirety of the electrode 13 are positioned in external regions on opposite sides of the internal region $S_{12}$, the electrostatic attraction force acts on the movable member 10 within the two external regions. Specifically, the first electrostatic attraction force generated between the electrodes 12 and 22 acts on the movable member 10 or the electrode 12 within one of the external regions as a first rotation force, with the connection point P2 serving as the fulcrum. At the same time, the second electrostatic attraction force generated between the electrodes 13 and 23 acts on the movable member 10 or the electrode 13 in the other external region as a second rotation force, with the connection point P4 serving as the fulcrum. Even when the movable member 10 including the electrodes 12 and 13 and the stationary portion 20 including the electrodes 22 and 23 are so designed that the first and the second rotation forces be equal to each other, the two rotation forces cannot be actually equal, because the actual dimension of each part is different from the design dimension due to manufacturing errors. Thus, one of the first rotation force (first electrostatic attraction force) and the second rotation force (second electrostatic attraction force), that is larger, acts more powerfully on the movable member 10 as a rotation driving force, whereby the rotation of the movable member 10 is induced. In this way, when the entirety of the electrodes 12 and 13 of the movable member 10 is not positioned within the internal region $S_{12}$, the movable member 10 easily rotates.

Unlike this, in the micro movable device X1 in which the entirety of the electrodes 12 and 13 of the movable member 10 is positioned within the internal region $S_{12}$, the electrostatic attraction force as the driving force acts on the movable member 10 within the internal region $S_{12}$. Thus, the rotation of the movable member 10 about the connection point P2 or P4 as the fulcrum is prevented.

As noted before, in the micro movable device X1, the entirety of the electrodes 12 and 13 of the movable member is positioned within the internal region $S_{13}$ extending between the set of connection points P1, P2 and the set of connection points P3, P4 in the spacing direction D of the set of connection points P1, P2 and the set of connection points P3, P4. Thus, in translating the movable member 10 from the position in the natural state or changing the amount of the translation, the electrostatic attraction force as the driving force acts on the movable member 10, or the electrodes 12 and 13 within the internal region $S_{13}$. This is suitable for suppressing the rotation of the movable member 10 in translating the movable member 10 or changing the amount of the translation.

Unlike this embodiment, when the entirety or part of one of the electrodes 12 and 13 is positioned in an external region on one side of the internal region $S_{13}$, at least part of the electrostatic attraction force acts on the movable member 10 within the external region. In this case, due to the principle of leverage, the electrostatic attraction force acting in the external region induces the rotation of the movable member 10, with the set of connection points P1 and P2 or the set of connection points P3 and P4 that is closer to this electrostatic attraction force serving as the fulcrum. When the entirety of the electrode 12 and the entirety of the electrode 13 are positioned in external regions on opposite sides of the internal region $S_{13}$, the electrostatic attraction force acts on the movable member 10 within the two external regions. Specifically, the first electrostatic attraction force generated between the electrodes 12 and 22 acts on the movable member 10 or the electrode 12 within one of the external regions as a first rotation force, with the set of connection points P1 and P2 serving as the fulcrum. At the same time, the second electrostatic attraction force generated between the electrodes 13 and 23 acts on the movable member 10 or the electrode 13 in the other external region as a second rotation force, with the set of connection points P3 and P4 serving as the fulcrum. Even when the movable member 10 including the electrodes 12 and 13 and the stationary portion 20 including the electrodes 22 and 23 are so designed that the first and the second rotation forces be equal to each other, the two rotation forces cannot be actually equal, because the actual dimension of each part is different from the design dimension due to manufacturing errors. Specifically, even when the movable member 10 and the stationary portion 20 are designed to have a symmetrical shape so that the first and the second electrostatic attraction forces be equal in magnitude, manufacturing errors cause inequality in shape of the movable member 10 or the stationary portion 20 on two sides. As a result, the two electrostatic attraction forces cannot be equal in magnitude. Thus, one of the first rotation force (first electrostatic attraction force) and the second rotation force (second electrostatic attraction force), that is larger, acts more powerfully on the movable member 10 as a rotation driving force, whereby the rotation of the movable member 10 is induced. In this way, when the entirety of the electrodes 12 and 13 of the movable member 10 is not positioned within the internal region $S_{13}$, the movable member 10 easily rotates.

Unlike this, in the micro movable device X1 in which the entirety of the electrodes 12 and 13 10 is positioned within the internal region $S_{13}$, the electrostatic attraction force as the driving force acts on the movable member 10 within the internal region $S_{13}$. Thus, the rotation of the movable member 10 about the set of connection points P1 and P2 or the set of connection points P3 and P4 as the fulcrum is prevented.

As noted before, the electrodes 22 and 23 of the micro movable device X1, which are utilized for generating an electrostatic attraction force with the electrodes 12 and 13, are electrically separated. Thus, different potentials can be applied to the electrodes 22 and 23. Thus, the voltage to be applied across the electrodes 12 and 22 and that to be applied across the electrodes 13 and 23 can be adjusted individually, whereby the electrostatic attraction force to be generated between the electrodes 12 and 22 and that to be generated between the electrodes 13 and 23 can be controlled individually. By controlling the electrostatic attraction forces in this way, the posture of the movable member 10 of the micro movable device X1 is adjusted as desired.

In the micro movable device X1 which is capable of suppressing the rotation of the movable member 10, even when the movable member 10 rotates with the set of connection points P1 and P2 or the set of connection points P3 and P4 serving as the fulcrum, the amount of rotation is considerably small. Thus, even when the posture of the movable member 10 is to be controlled to cancel such rotation, it is not necessary to provide a large difference between the voltage to be applied across the electrodes 12 and 22 and that to be applied across the electrodes 13 and 23. Thus, in the micro movable device X1, the posture control of the movable member 10 is achieved without increasing the driving voltage.

In the micro movable device X1, the connecting portions 31-34 are connected respectively to the arms 11B extending from the land 11A of the movable member 10. This arrangement is suitable for positioning the electrodes 12 and 13 extending from the land 11A in the internal region $S_{11}$, $S_{12}$ or $S_{13}$.

As noted before, in the micro movable device X1, the connection bars 31a, 32a, 33a and 34a of the connecting portions 31-34 extend perpendicularly to the spacing direction D of the electrodes 12 and 13. With this arrangement, the displacement of the movable member 10 in a direction perpendicular to the spacing direction D is suppressed. Further, the connection bars 31b, 32b, 33b and 34b of the connecting portions 31-34 extend in the spacing direction D of the electrodes 12 and 13. With this arrangement, the displacement of the movable member 10 in the spacing direction D is suppressed.

As noted before, in the micro movable device X1, each of the electrodes 12, 13, 22 and 23 has a comb-tooth electrode structure. This arrangement is suitable for finely controlling the electrostatic attraction forces to be generated between the electrodes 12 and 22 and between the electrodes 13 and 23 to finely control the driving force for translating the movable member 10.

In the micro movable device X1, the connecting portions 31-34 or the connection bars 31a, 31b, 32a, 32b, 33a, 33b, 34a and 34b are smaller in thickness than the movable member 10 and the first layer 21A of the frame 21 of the stationary portion 20. Connecting portions 31-34 having a smaller thickness enable the movable member 10 to be translated with a smaller driving force. Thus, the connecting portions 31-34 which are smaller in thickness than the movable member 10 and the first layer 21A are suitable for reducing the driving voltage of the micro movable device X1.

Figure 17:
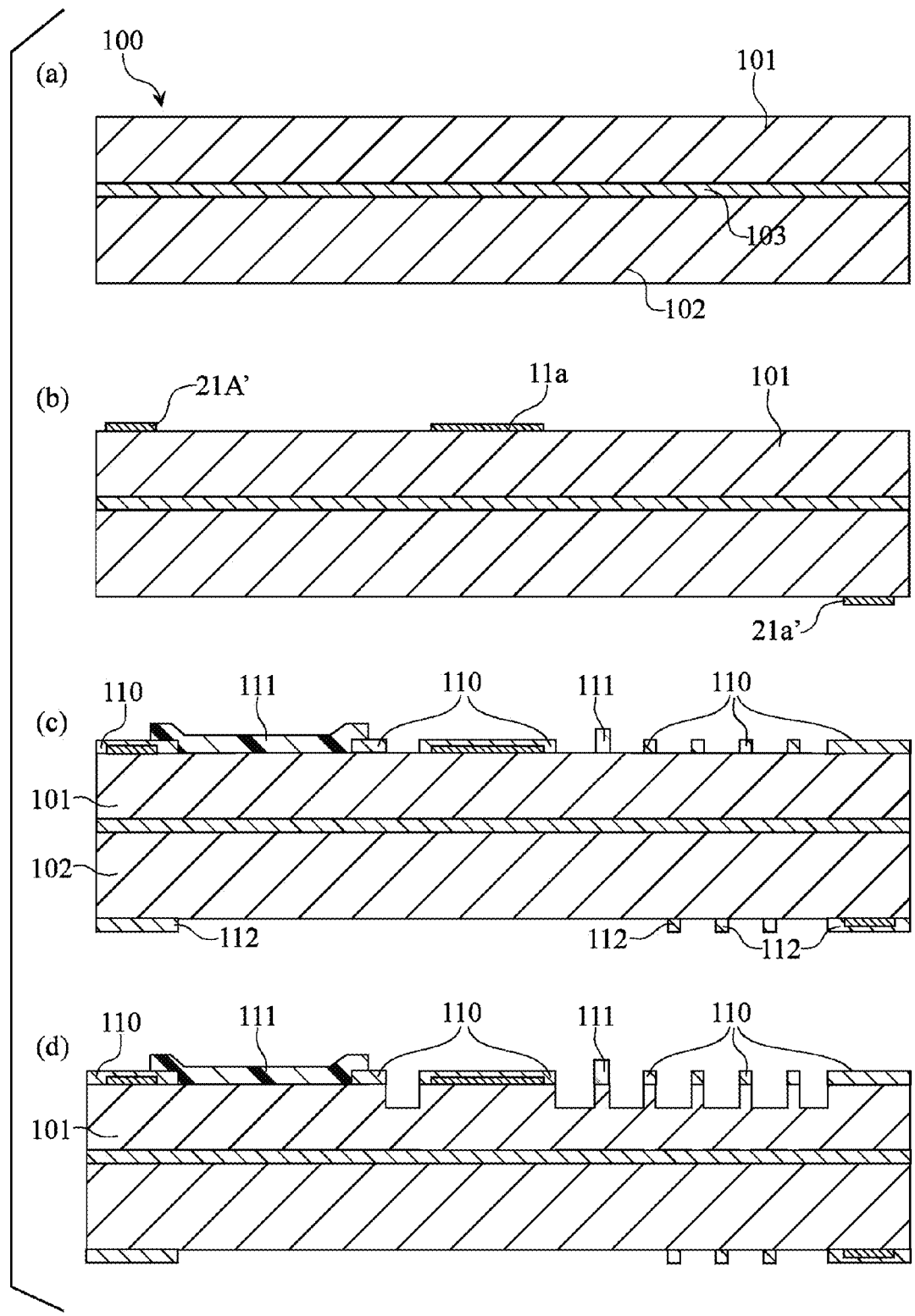
FIG. 17 illustrates process steps of a method for making the micro movable device according to the first embodiment.
Figure 18:
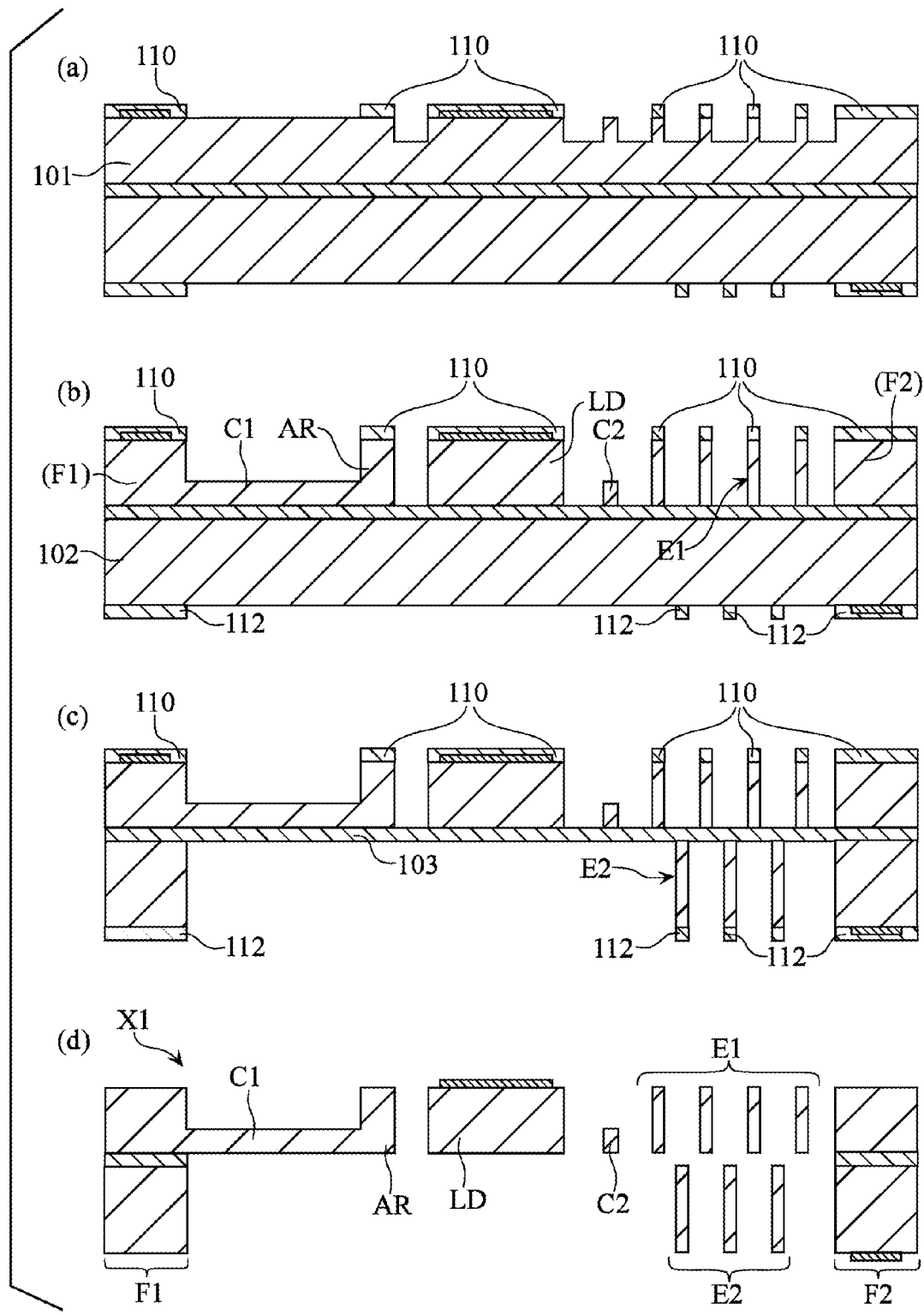
FIG. 18 illustrates process steps performed subsequent to the process steps illustrated in FIG. 17.

FIGS. 17 and 18 illustrate an example of a method for making a micro movable device X1. In this method for making the micro movable device X1, bulk micromachining is employed. FIGS. 17-18 illustrate changes in section in the making process until a land portion LD, an arm portion AR, frame portions F1 and F2, connecting portions C1 and C2 and sets of electrode portions E1 and E2 are formed as illustrated in FIG. 18(d). In each of these figures, a plurality of portions of a material substrate (wafer having a multiple layer structure), which are to become the parts of a single micro movable device, are illustrated as a continuous section. The land portion LD corresponds to part of the land 11A. The arm portion AR corresponds to part of the arm 11B. The frame portions F1 and F2 correspond to part of the frame 21 and are illustrated in a sectional view. The connecting portion C1 corresponds to part of the connecting portions 31-34 and is illustrated as a section of the connection bar 31a, 31b, 32a, 32b, 33a, 33b, 34a, 34b along the direction in which the connection bars extend. The connecting portion C2 corresponds to part of the connecting portions 31-34 and is illustrated as a cross section of the connection bar 31a, 31b, 32a, 32b, 33a, 33b, 34a, 34b. The electrode portion E1 corresponds to part of the electrodes 12 and 13 and is illustrated as a partial cross section of the electrode teeth 12, 13. The electrode portion E2 corresponds to part of the electrodes 22 and 23 and is illustrated as a partial cross section of the electrode teeth 22, 23.

To make a micro movable device X1, a material substrate 100 as illustrated in FIG. 17(a) is prepared. The material substrate 100 is an SOI wafer having a laminated structure made up of silicon layers 101 and 102, and an insulating layer 103 intervening between the silicon layers 101 and 102. The silicon layers 101 and 102 are made of a silicon material which is made electrically conductive by doping impurity. As the impurity, use may be made of a p-type impurity such as B or an n-type impurity such as P or Sb. The insulating layer 103 is made of e.g. silicon oxide. The silicon layer 101 has a thickness of e.g. 10 to 100 μm, whereas the silicon layer 102 has a thickness of e.g. 50 to 500 μm. The insulating layer 103 has a thickness of e.g. 0.3 to 3 μm.

Then, as illustrated in FIG. 17(b), a mirror surface 11a and an electrode pad 21A' are formed on the silicon layer 101, while an electrode pad 21a' and a non-illustrated electrode pad 21b' are formed on the silicon layer 102. Specifically, to form the mirror surface 11a and the electrode pad 21A', a film of Cr (50 nm) and then a film of Au (200 nm), for example, are successively formed on the silicon layer 101 by sputtering. Then, by performing etching with respect to these metal films by using a predetermined mask, patterns of the mirror surface 11a and the electrode pad 21A' are formed. As the etchant for Au, potassium iodide-iodine solution may be used. As the etchant for Cr, a diammonium cerium (IV) nitrate solution may be used. The electrode pads 21a' and 21b' may be formed on the silicone layer 102 in a manner similar to the formation of the electrode pad 21A' on the silicon layer 101.

Figure 19:
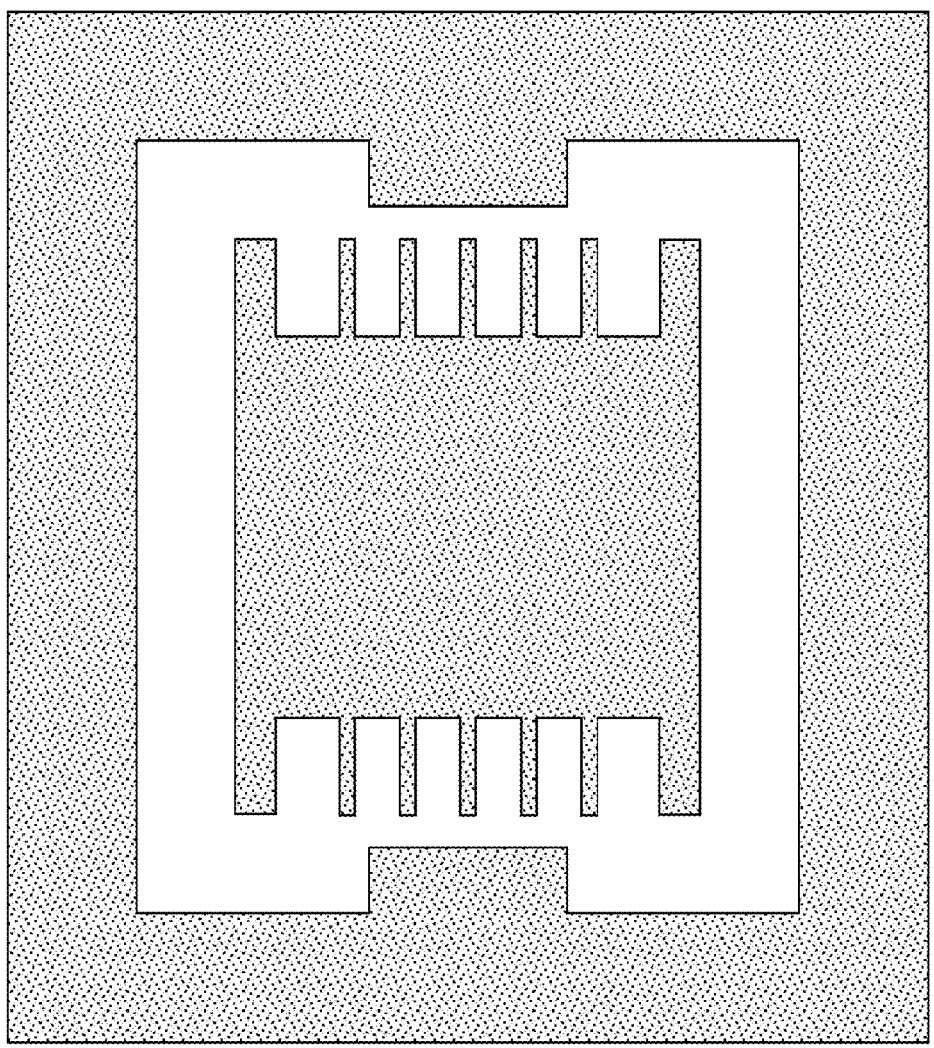
FIG. 19 is a plan view illustrating a mask pattern.
Figure 20:
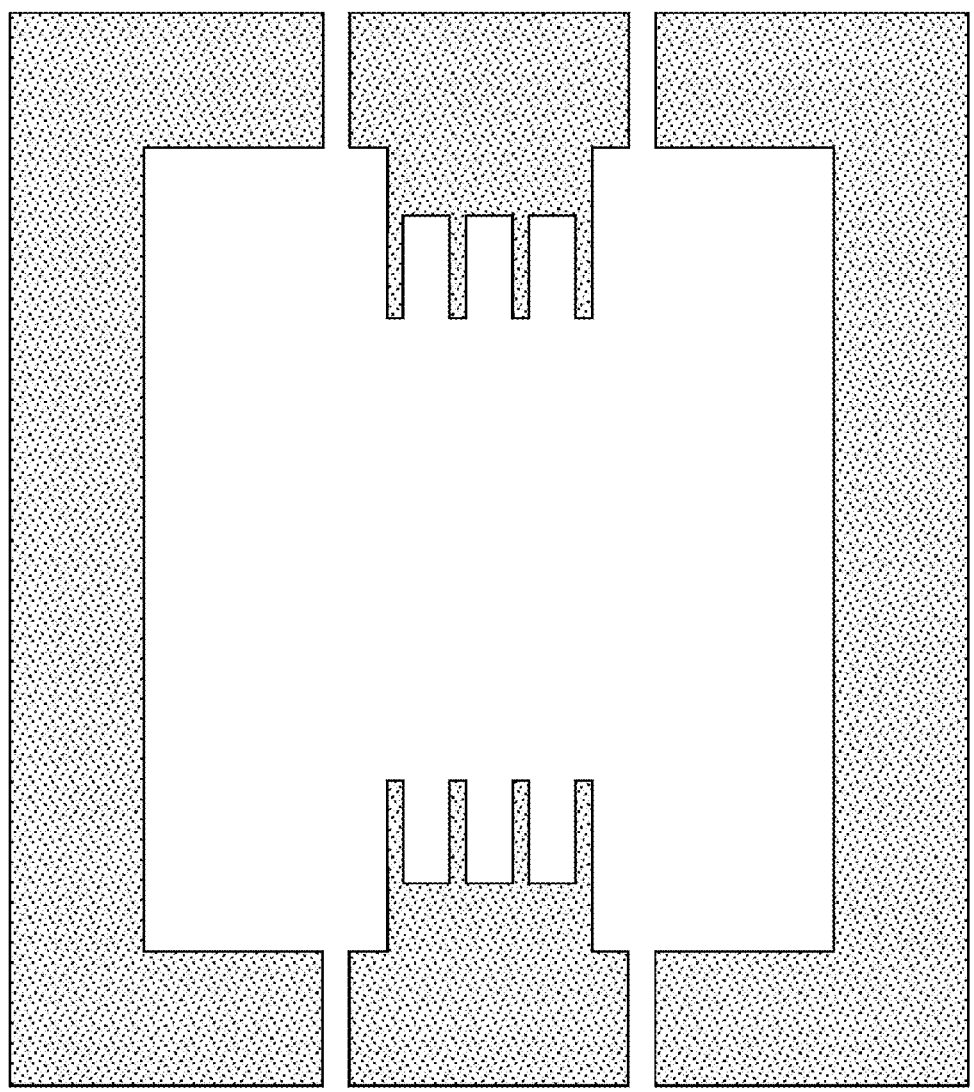
FIG. 20 is a plan view illustrating another mask pattern.

Then, as illustrated in FIG. 17(c), an oxide film pattern 110 and a resist pattern 111 are formed on the silicon layer 101, while an oxide film pattern 112 is formed on the silicon layer 102. The oxide film pattern 110 is formed to have a shape illustrated in FIG. 19, which corresponds to the movable member 10 (including the land 11A, the arms 11B and the electrodes 12 and 13) and part of the stationary portion 20 (part of the frame 21) to be formed at the silicon layer 101. The resist pattern 111 is formed to have a shape corresponding to the connecting portions 31-34. The oxide film pattern 112 is formed to have a shape illustrated in FIG. 19, which corresponds to part of the stationary portion 20 (including part of the frame 21 and electrodes 22 and 23) to be formed at the silicon layer 102.

Then, as illustrated in FIG. 17(d), the silicon layer 101 is etched to a predetermined depth by DRIE (deep reactive ion etching) by utilizing the oxide film pattern 110 and the resist pattern 111 as a mask. The "predetermined depth" means the depth corresponding to the thickness of the connecting portions C1 and C2, which may be e.g. 5 μm. In DRIE, good anisotropic etching is performed by Bosch process in which etching using $SF_6$ gas and sidewall protection using $C_4F_8$ gas are alternately repeated. The Bosch process can be employed also in DRIE described later.

Then, as illustrated in FIG. 18(a), the resist pattern 111 is removed. Specifically, the resist pattern 111 may be removed by using a remover.

Then, as illustrated in FIG. 18(b), by utilizing the oxide film pattern 110 as a mask, the silicon layer 101 is etched to the insulating layer 103 by DRIE, while the connecting portions C1 and C2 are formed by leaving the corresponding portions. By this etching process, the movable member 10 (the land portion LD, the arm portion AR, the electrode portion E1), part of the stationary portion 20 (part of the frame portions F1 and F2) and connecting portions 31-34 (connecting portions C1 and C2) are formed.

Then, as illustrated in FIG. 18(c), by utilizing the oxide film pattern 112 as a mask, the silicon layer 102 is etched to the insulating layer 103 by DRIE. By this etching process, part of the stationary portion 20 (part of the frame portions F1 and F2 and the electrode portion E2) are formed.

Then, as illustrated in FIG. 18(d), the oxide film patterns 110, 112 and the exposed portions of the insulating layer 103 are etched away. As the etching method, dry etching or wet etching may be employed. In dry etching, $CF_4$ or $CHF_3$ may be used as the etching gas. In wet etching, buffered hydrogen fluoride (BHF) consisting of hydrogen fluoride and ammonium fluoride may be used as the etchant.

Through the above-described process, the land portion LD, the arm portion AR, the frame portions F1 and F2, the connecting portions C1 and C2, and the electrode portions E1 and E2 are formed, whereby the micro movable device X1 is obtained. The micro movable devices according to other embodiments and variations to be described below can also be made by the same method.

Figure 21:
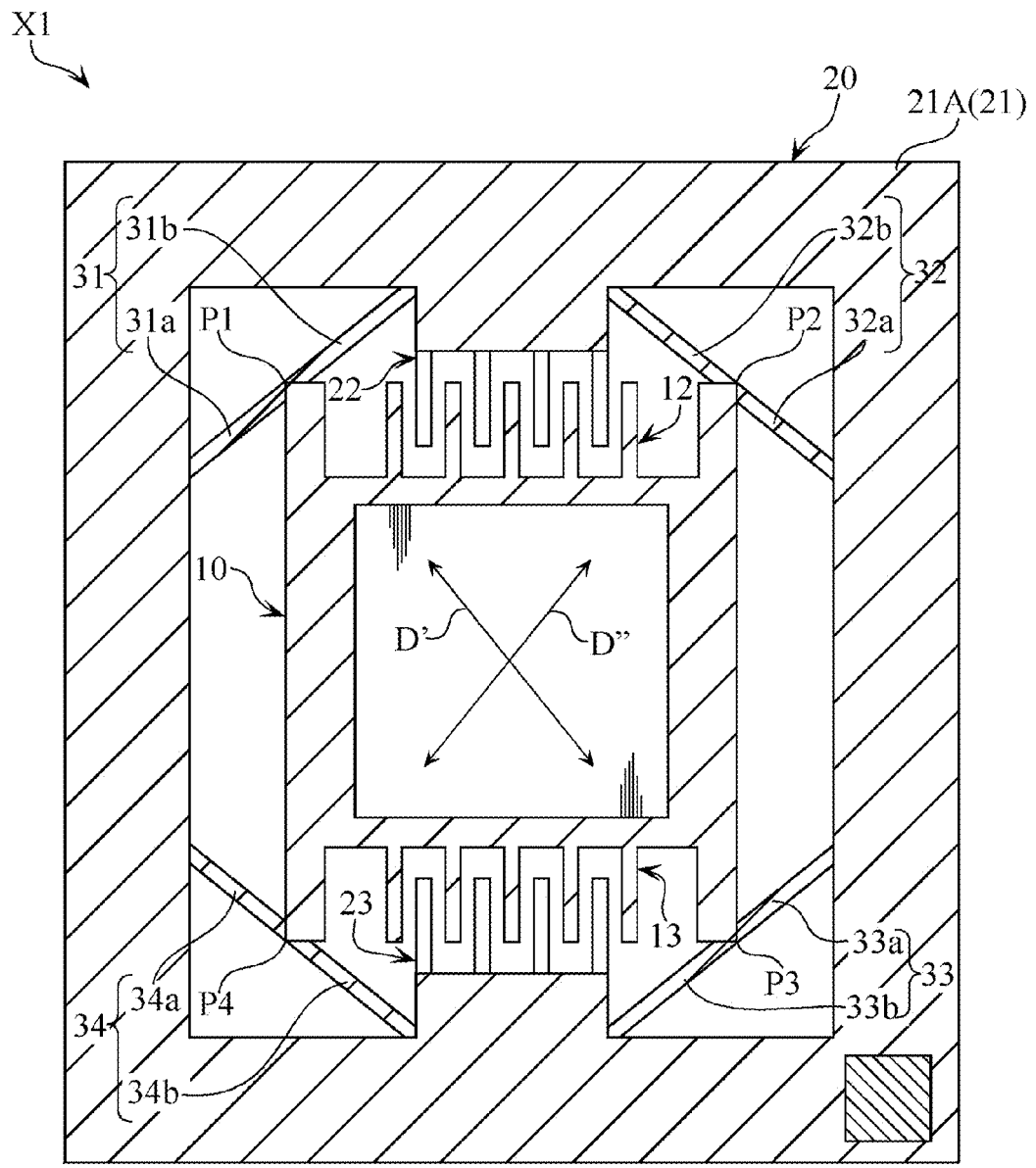
FIG. 21 is a plan view illustrating a first variation of the micro movable device according to the first embodiment.

FIG. 21 is a plan view illustrating a first variation of the micro movable device X1. The micro movable device X1 may include the connecting portions 31-34 as illustrated in FIG. 21. Specifically, in this variation, the connecting portion 31 is made up of connection bars 31a and 31b extending perpendicularly to the spacing direction D' of the connection points P1 and P3. The connecting portion 32 is made up of connection bars 32a and 32b extending perpendicularly to the spacing direction D" of the connection points P2 and P4. The connecting portion 33 is made up of connection bars 33a and 33b extending perpendicularly to the spacing direction D'. The connecting portion 34 is made up of connection bars 34a and 34b extending perpendicularly to the spacing direction D". With this arrangement, the connection bars 31a, 31b, 33a and 33b suppress the displacement of the movable member 10 in a direction perpendicular to the spacing direction D'. Further, the connection bars 32a, 32b, 34a and 34b suppress the displacement of the movable member 10 in a direction perpendicular to the spacing direction D".

Figure 22:
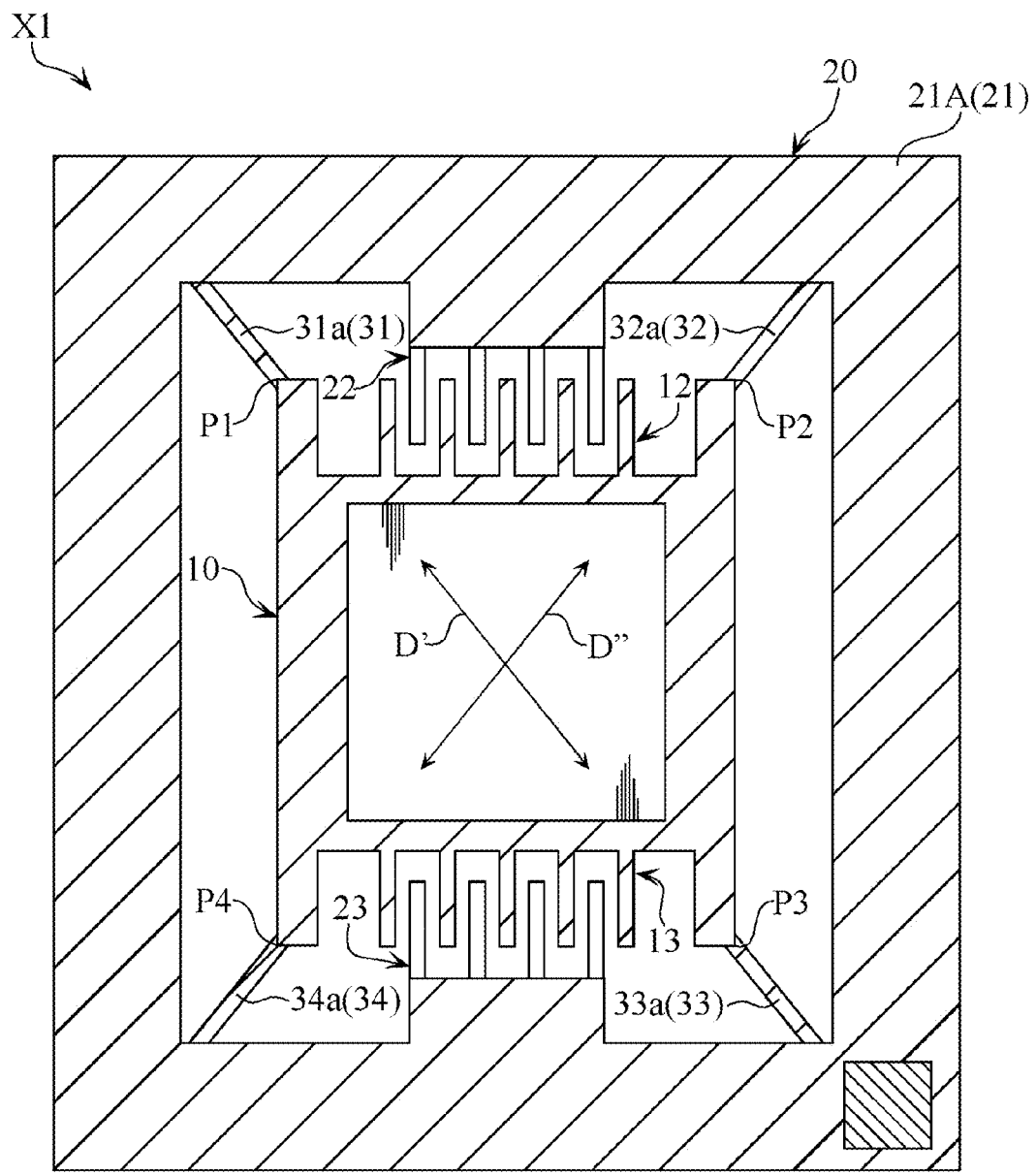
FIG. 22 is a plan view illustrating a second variation of the micro movable device according to the first embodiment.

FIG. 22 is a plan view illustrating a second variation of the micro movable device X1. The micro movable device X1 may include the connecting portions 31-34 as illustrated in FIG. 22. Specifically, in this variation, the connecting portion 31 is a connection bar 31a extending in the spacing direction D' of the connection points P1 and P3. The connecting portion 32 is a connection bar 32a extending in the spacing direction D" of the connection points P2 and P4. The connecting portion 33 is a connection bar 33a extending in the spacing direction D'. The connecting portion 34 is a connection bar 34a extending in the spacing direction D". With this arrangement, the connection bars 31a and 33a suppress the displacement of the movable member 10 in the spacing direction D', whereas the connection bars 32a and 34a suppress the displacement of the movable member 10 in the spacing direction D". Further, this variation in which the movable member 10 and the stationary portion 20 are connected to each other only by the four connection bars is more suitable for reducing the driving voltage for translating the movable member 10 than the arrangement in which the movable member 10 and the stationary portion 20 are connected to each other by a larger number of connection bars.

Figure 23:
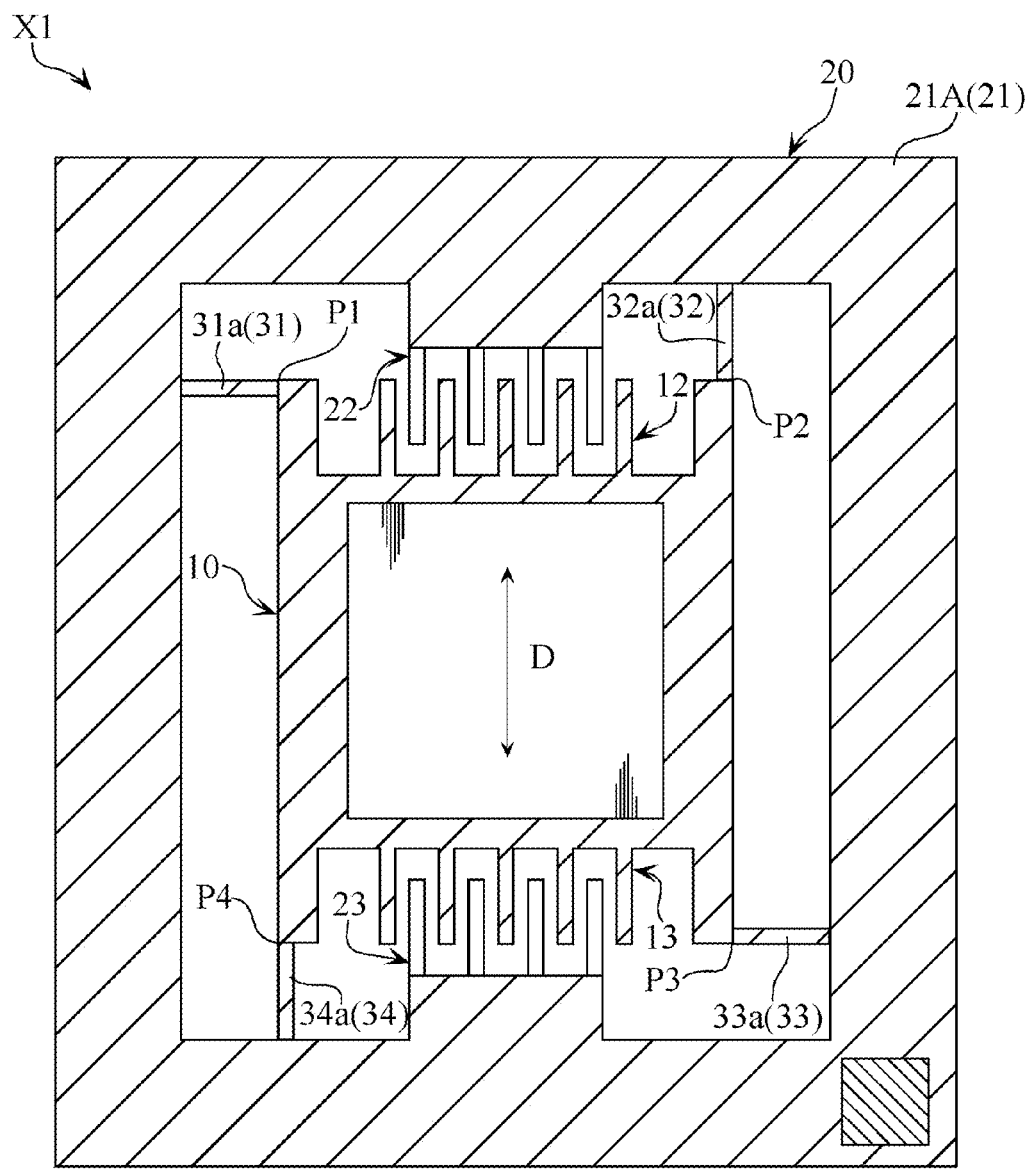
FIG. 23 is a plan view illustrating a third variation of the micro movable device according to the first embodiment.

FIG. 23 is a plan view illustrating a third variation of the micro movable device X1. The micro movable device X1 may include the connecting portions 31-34 as illustrated in FIG. 23. Specifically, in this variation, the connecting portion 31 is a connection bar 31a extending perpendicularly to the spacing direction D of the electrodes 12 and 13. The connecting portion 32 is a connection bar 32a extending in the spacing direction D. The connecting portion 33 is a connection bar 33a extending perpendicularly to the spacing direction D. The connecting portion 34 is a connection bar 34a extending in the spacing direction D. With this arrangement, the connection bars 31a and 33a suppress the displacement of the movable member 10 in a direction perpendicular to the spacing direction D, whereas the connection bars 32a and 34a suppress the displacement of the movable member 10 in the spacing direction D. Further, this variation in which the movable member 10 and the stationary portion 20 are connected to each other only by the four connection bars is more suitable for reducing the driving voltage for translating the movable member 10 than the arrangement in which the movable member 10 and the stationary portion 20 are connected to each other by a larger number of connection bars.

Figure 24:
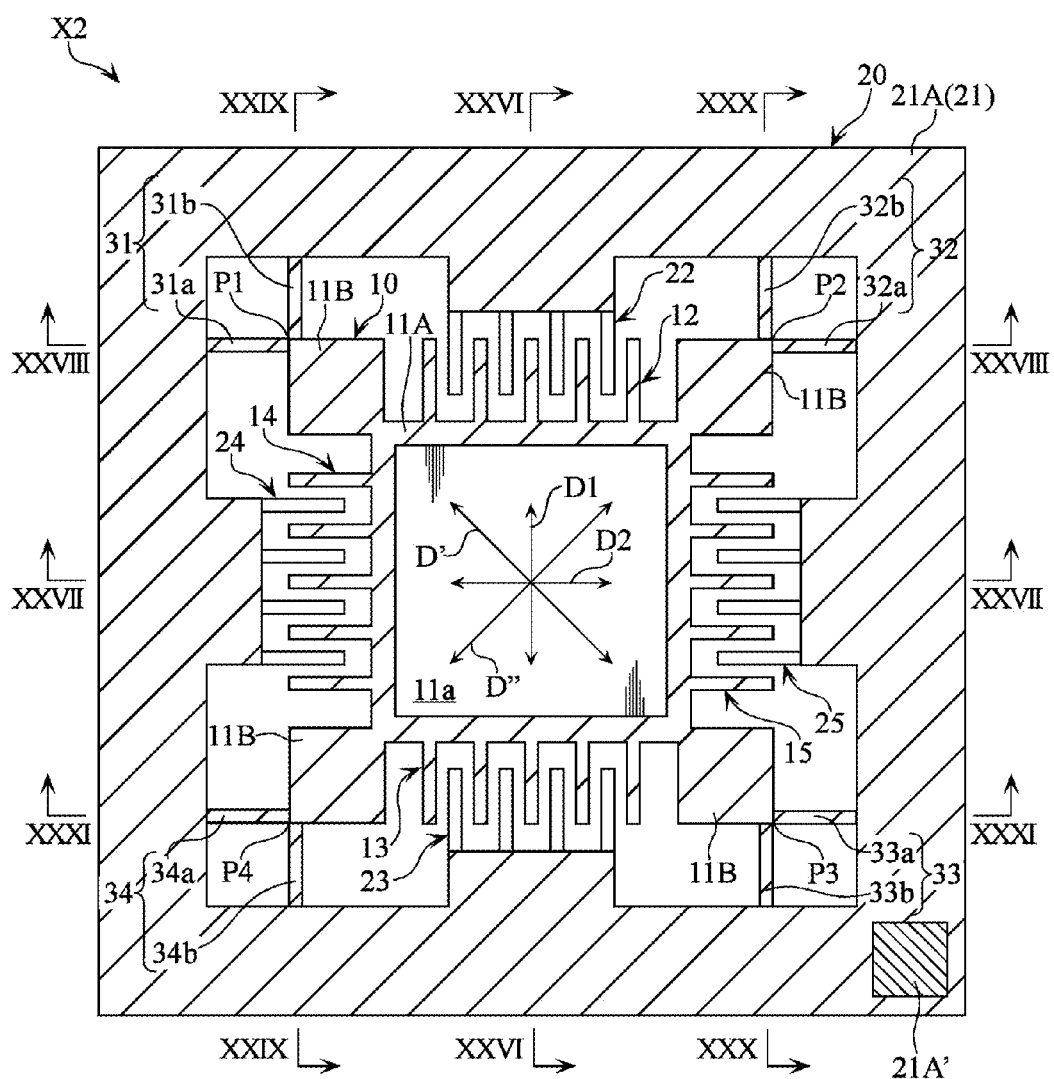
FIG. 24 is a plan view illustrating a micro movable device according to a second embodiment.
Figure 25:
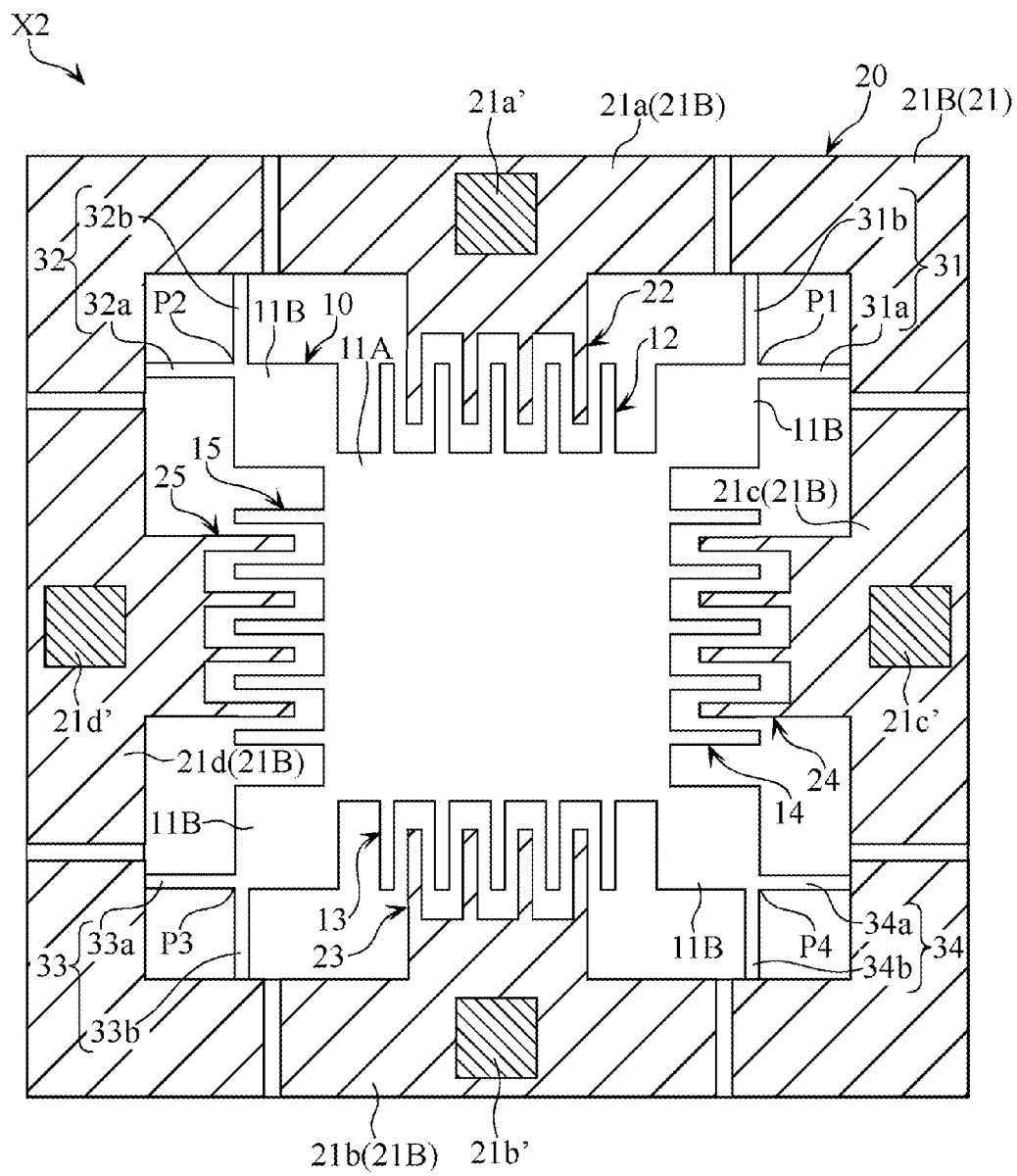
FIG. 25 is another plan view of the micro movable device illustrated in FIG. 24.

FIGS. 24-31 illustrate a micro movable device X2 according to a second embodiment. FIG. 24 is a plan view of the micro movable device X2. FIG. 25 is another plan view of the micro movable device X2. FIGS. 26-31 are sectional views taken along lines XXVI-XXVI in FIG. 24, lines XXVII-XXVII in FIG. 24, lines XXVIII-XXVIII in FIG. 24, lines XXIX-XXIX in FIG. 24, lines XXX-XXX in FIG. 24, and lines XXXI-XXXI in FIG. 24, respectively.

The micro movable device X2 is a micro mirror device including a movable member 10, a stationary portion 20 and connecting portions 31, 32, 33 and 34. The micro movable device X2 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X2 are mainly made of the first silicon layer and/or the second silicon layer. FIG. 24 illustrates the first silicon layer side, whereas FIG. 25 illustrates the second silicon layer side. For a better understanding, the portions made of the first silicon layer are indicated by hatching in FIG. 24, whereas the portions made of the second silicon layer are indicated by hatching in FIG. 25.

The movable member 10 is made of the first silicon layer. The movable member 10 includes a rectangular land 11A, four arms 11B and electrodes 12, 13, 14 and 15. On the land 11A, a mirror surface 11a having a light reflecting function is provided. Each of the arms 11B extends from a respective one of the corners of the land 11A. Each of the electrodes 12-15 has a comb-tooth electrode structure including a set of electrode teeth projecting from an edge of the land 11A. The electrodes 12-15 are electrically connected to each other via the land 11A. The spacing direction D1 in which the electrodes 12 and 13 are spaced from each other is perpendicular to the spacing direction D2 in which the electrodes 14 and 15 are spaced from each other.

The stationary portion 20 includes a frame 21, and electrodes 22, 23, 24 and 25. As illustrated in FIGS. 24 and 25, the frame 21 surrounds the movable member 10. As illustrated in FIGS. 26-31, the frame 21 has a laminated structure made up of a first layer 21A made of the first silicon layer, a second layer 21B made of the second silicon layer, and an insulating layer 21C intervening between the first and the second layers 21A and 21B. The second layer 21B includes portions 21a, 21b, 21c and 21d. The first layer 21A and the second layer 21B are electrically separated. The portions 21a-21d are electrically separated. As illustrated in FIG. 24, an electrode pad 21A' is provided on the first layer 21A. As illustrated in FIG. 25, electrode pads 21a', 21b', 21c' and 21d' are provided on the portions 21a-21d of the second layer 21B.

The electrodes 22-25 are made of the second silicon layer. The electrode 22 has a comb-tooth electrode structure including a set of electrode teeth projecting from the portion 21a of the second layer 21B of the frame 21 toward the movable member 10. The electrode 22 is arranged to face the electrode 12 and cooperates with the electrode to generate an electrostatic attraction force. The electrode 23 has a comb-tooth electrode structure including a set of electrode teeth projecting from the portion 21b of the second layer 21B toward the movable member 10. The electrode 23 is arranged to face the electrode 13 and cooperates with the electrode 13 to generate an electrostatic attraction force. The electrode 24 has a comb-tooth electrode structure including a set of electrode teeth projecting from the portion 21c of the second layer 21B toward the movable member 10. The electrode 24 is arranged to face the electrode 14 and cooperates with the electrode 14 to generate an electrostatic attraction force. The electrode 25 has a comb-tooth electrode structure including a set of electrode teeth projecting from the portion 21d of the second layer 21B toward the movable member 10. The electrode 25 is arranged to face the electrode 15 and cooperates with the electrode 15 to generate an electrostatic attraction force. The electrodes 22-25 are electrically separated.

Figure 28:
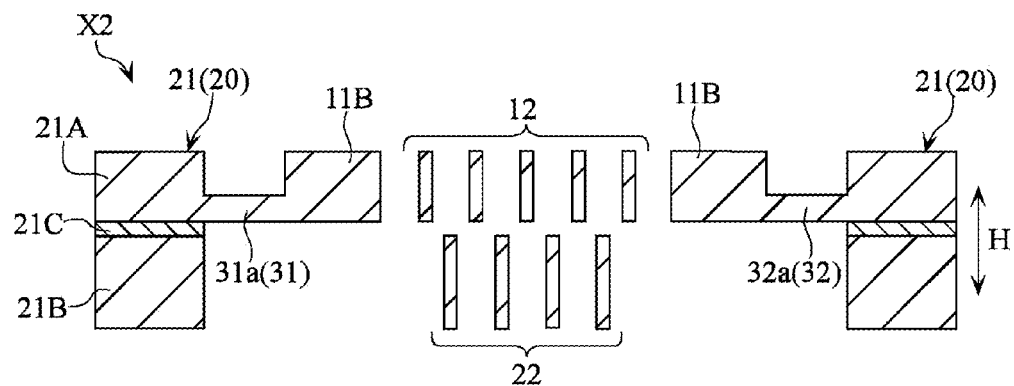
FIG. 28 is a sectional view taken along lines XXVIII-XXVIII in FIG. 24.
Figure 29:
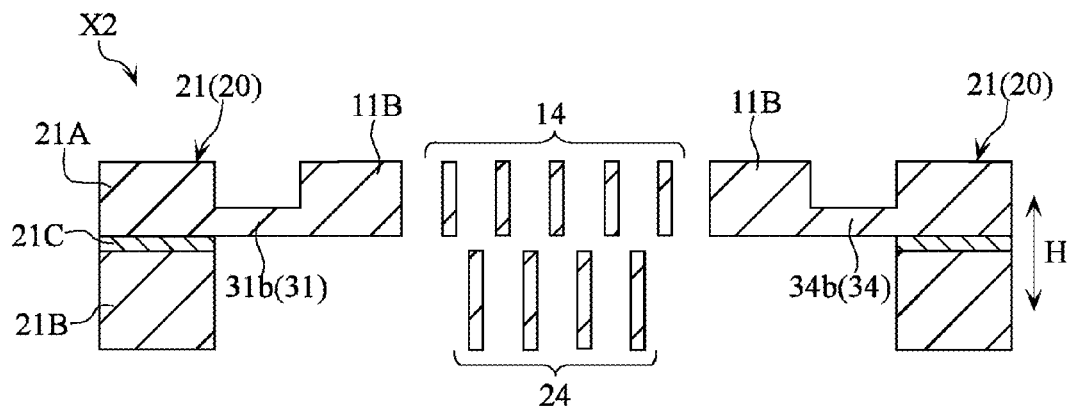
FIG. 29 is a sectional view taken along lines XXIX-XXIX in FIG. 24.

The connecting portions 31-34 are made of the first silicon layer and connect the movable member 10 and the stationary portion 20 to each other, as illustrated in FIG. 24. The connecting portion 31 is made up of a connection bar 31a extending perpendicularly to the spacing direction D1 of the electrodes 12 and 13 and a connection bar 31b extending perpendicularly to the spacing direction D2 of the electrodes 14 and 15. The connecting portion 31, i.e., the connection bars 31a and 31b are connected to one of the arms 11B of the movable member 10 and also connected to the first layer 21A of the frame 21 of the stationary portion 20. The point at which the connecting portion 31 and the arm 11B of the movable member 10 are connected to each other is referred to as a connection point P1. As illustrated in FIGS. 28 and 29, the connecting portion 31 (connection bars 31a and 31b) is smaller in thickness than the movable member 10 and the first layer 21A of the frame 21.

Figure 30:
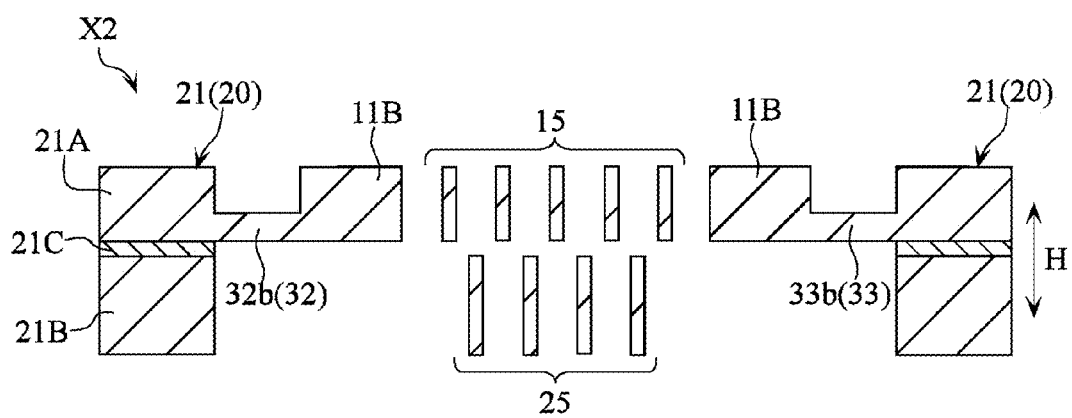
FIG. 30 is a sectional view taken along lines XXX-XXX in FIG. 24.

The connecting portion 32 is made up of a connection bar 32a extending perpendicularly to the spacing direction D1 of the electrodes 12 and 13 and a connection bar 32b extending perpendicularly to the spacing direction D2 of the electrodes 14 and 15. The connecting portion 32, i.e., the connection bars 32a and 32b are connected to one of the arms 11B of the movable member 10 and also connected to the first layer 21A of the frame 21 of the stationary portion 20. The point at which the connecting portion 32 and the arm 11B of the movable member 10 are connected to each other is referred to as a connection point P2. As illustrated in FIGS. 28 and 30, the connecting portion 32 (connection bars 32a and 32b) is smaller in thickness than the movable member 10 and the first layer 21A of the frame 21.

Figure 31:
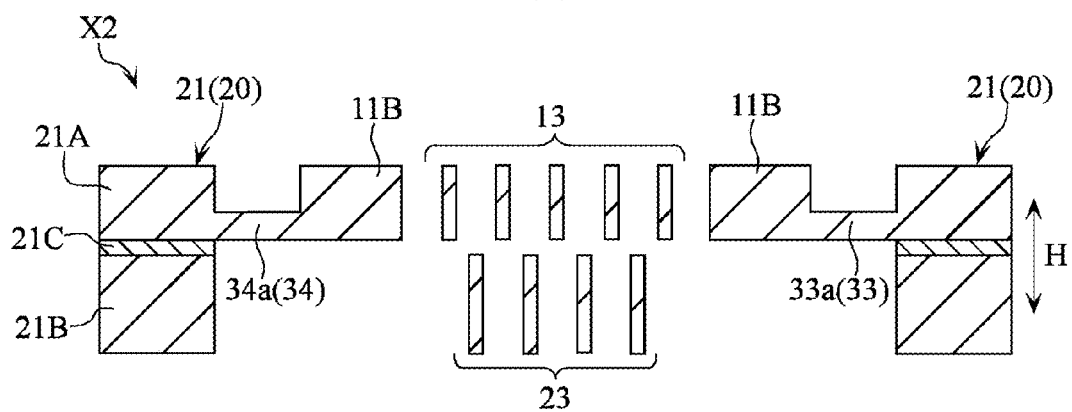
FIG. 31 is a sectional view taken along lines XXXI-XXXI in FIG. 24.

The connecting portion 33 is made up of a connection bar 33a extending perpendicularly to the spacing direction D1 of the electrodes 12 and 13 and a connection bar 33b extending perpendicularly to the spacing direction D2 of the electrodes 14 and 15. The connecting portion 33, i.e., the connection bars 33a and 33b are connected to one of the arms 11B of the movable member 10 and also connected to the first layer 21A of the frame 21 of the stationary portion 20. The point at which the connecting portion 33 and the arm 11B of the movable member 10 are connected to each other is referred to as a connection point P3. As illustrated in FIGS. 30 and 31, the connecting portion 33 (connection bars 33a and 33b) is smaller in thickness than the movable member 10 and the first layer 21A of the frame 21.

The connecting portion 34 is made up of a connection bar 34a extending perpendicularly to the spacing direction D1 of the electrodes 12 and 13 and a connection bar 34b extending perpendicularly to the spacing direction D2 of the electrodes 14 and 15. The connecting portion 34, i.e., the connection bars 34a and 34b are connected to one of the arms 11B of the movable member 10 and also connected to the first layer 21A of the frame 21 of the stationary portion 20. The point at which the connecting portion 34 and the arm 11B of the movable member 10 are connected to each other is referred to as a connection point P4. As illustrated in FIGS. 29 and 31, the connecting portion 34 (connection bars 34a and 34b) is smaller in thickness than the movable member 10 and the first layer 21A of the frame 21.

Figure 32:
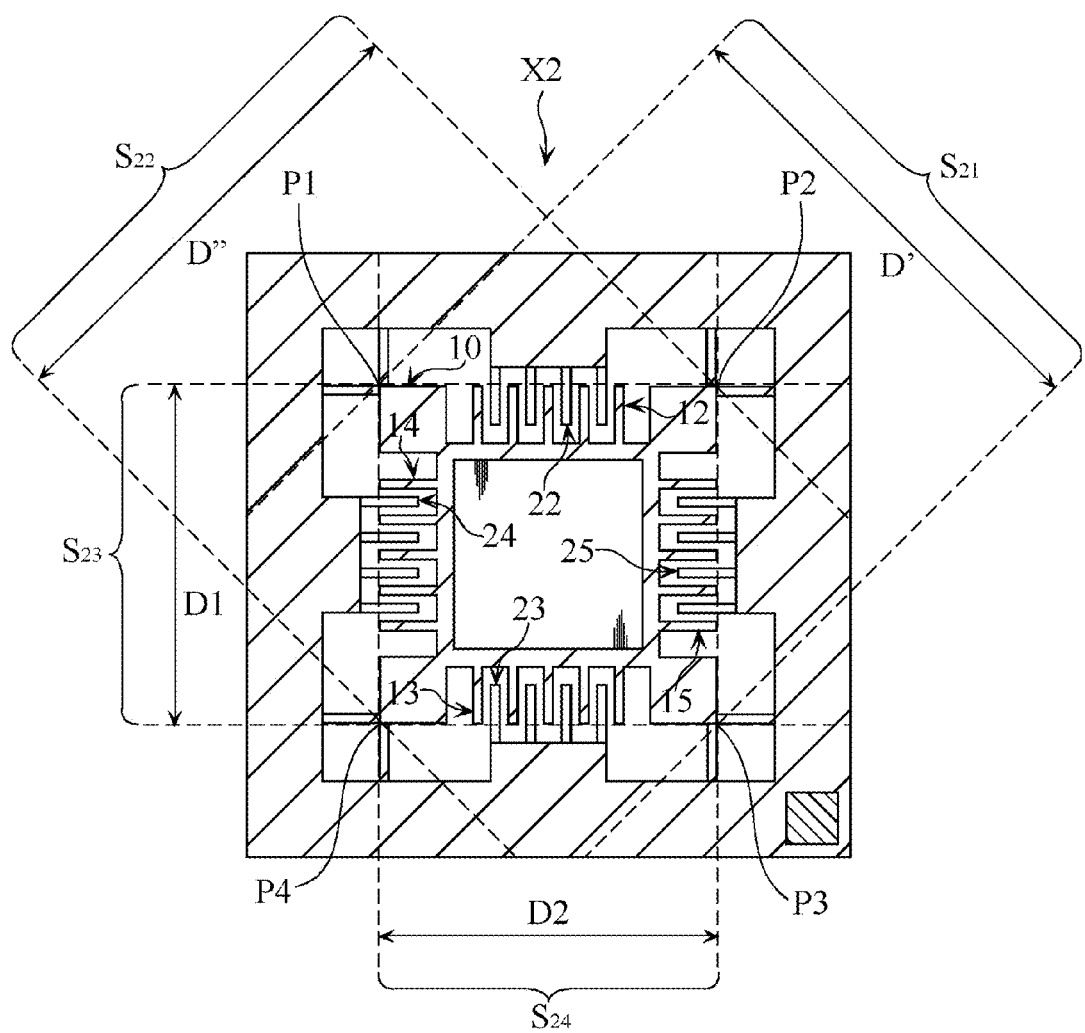
FIG. 32 is a plan view illustrating internal regions according to the second embodiment.

As illustrated in FIG. 32, in the micro movable device X2, the entirety of the electrodes 12-15 of the movable member 10, which are utilized for generating an electrostatic attraction force with the electrodes 22-25, is positioned within the internal region $S_{21}$ extending between the connection points P1 and P3 in the spacing direction D' in which the connection points P1 and P3 are spaced from each other. The entirety of the electrodes 12-15 are also positioned within the internal region $S_{22}$ extending between the connection points P2 and P4 in the spacing direction D" in which the connection points P2 and P4 are spaced from each other. The entirety of the electrodes 12-15 are also positioned within the internal region $S_{23}$ extending between a set of connection points P1, P2 and a set of connection points P3, P4 in the spacing direction D1 in which the set of connection points P1, P2 and the set of connection points P3, P4 are spaced from each other. The entirety of the electrodes 12-15 are also positioned within the internal region $S_{24}$ extending between a set of connection points P1, P4 and a set of connection points P2, P3 in the spacing direction D2 in which the set of connection points P1, P4 and the set of connection points P2, P3 are spaced from each other.

Figure 26:
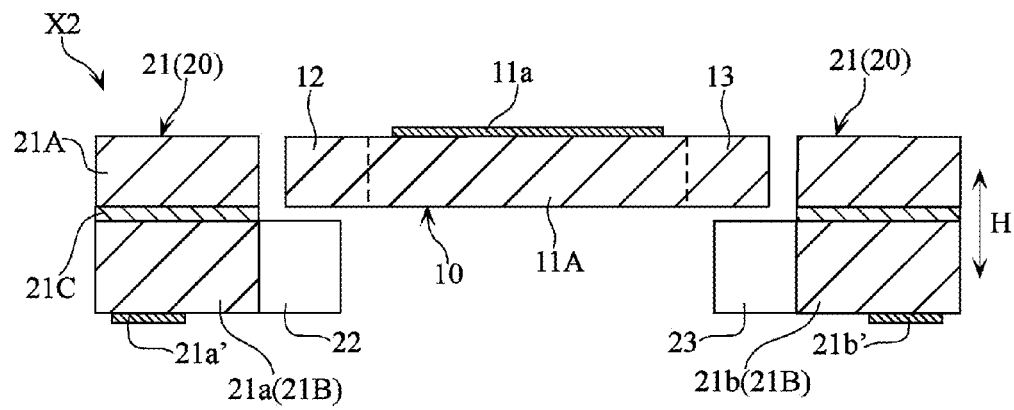
FIG. 26 is a sectional view taken along lines XXVI-XXVI in FIG. 24.
Figure 27:
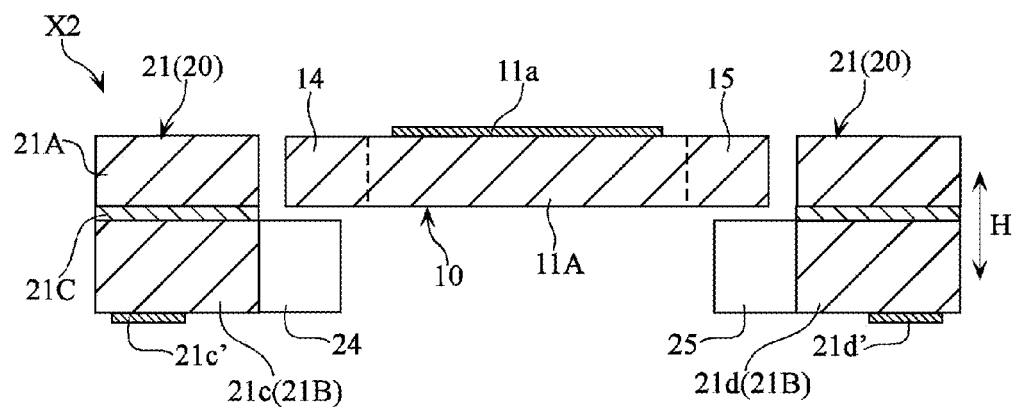
FIG. 27 is a sectional view taken along lines XXVII-XXVII in FIG. 24.

In the micro movable device X2, the movable member 10 is translated in the thickness direction H indicated in FIG. 26 by applying a driving voltage across the electrodes 12 and 22, the electrodes 13 and 23, the electrodes 14 and 24 and the electrodes 15 and 25. The potential application to the electrodes 12-15 by the voltage application is achieved via the electrode pad 21A' on the first layer 21A of the frame 21 of the stationary portion 20, the first layer 21A, the connecting portions 31-34, and the arms 11B and land 11A of the movable member 10. To the electrodes 12-15, e.g. a ground potential is applied. The potential application to the electrode 22 by the voltage application is achieved via the electrode pad 21a' on the portion 21a of the second layer 21B of the frame 21 of the stationary portion 20 and the portion 21a. The potential application to the electrode 23 is achieved via the electrode pad 21b' on the portion 21b of the second layer 21B of the frame 21 and the portion 21b. The potential application to the electrode 24 is achieved via the electrode pad 21c' on the portion 21c of the second layer 21B of the frame 21 and the portion 21c. The potential application to the electrode 25 is achieved via the electrode pad 21d' on the portion 21d of the second layer 21B of the frame 21 and the portion 21d. The potential to be applied to the electrodes 22-25 can be set individually for each electrode.

Figure 33:
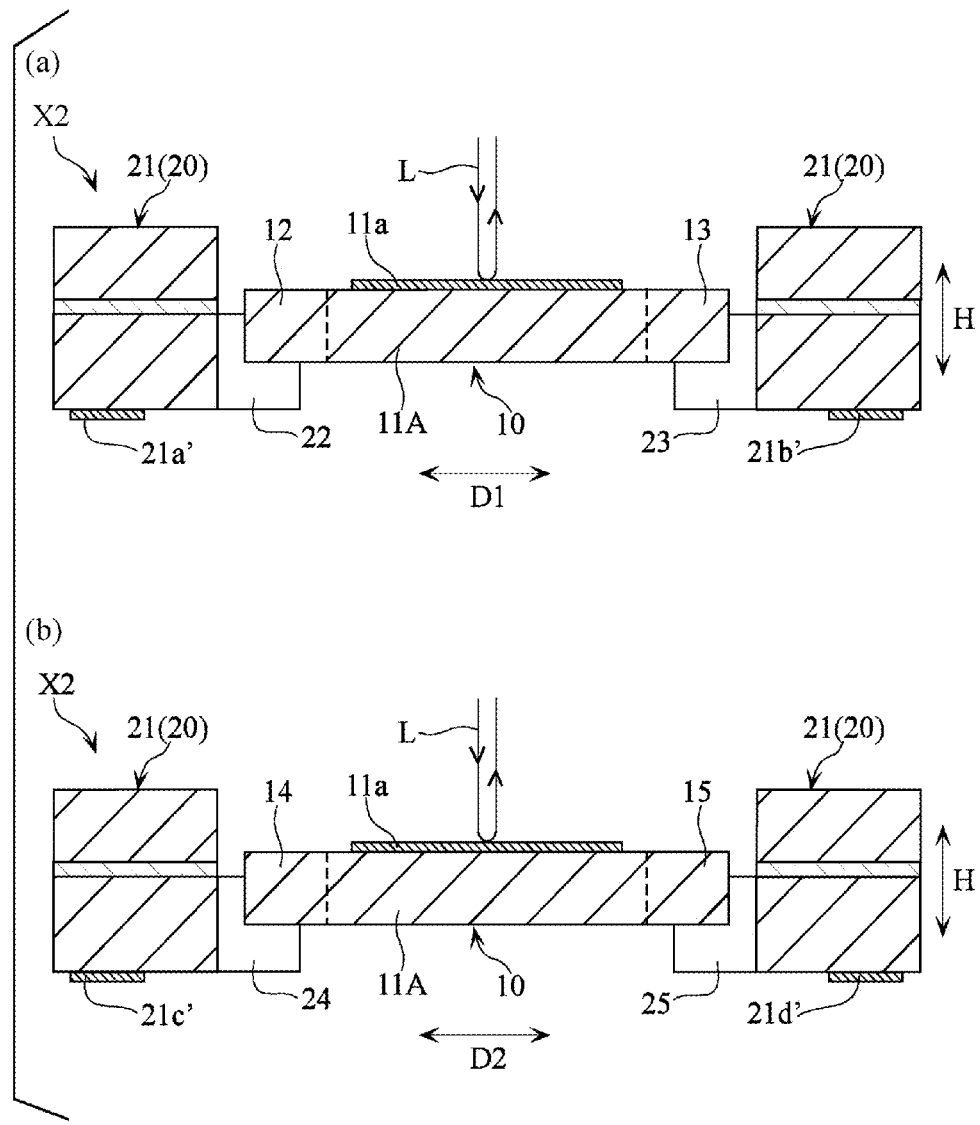
FIG. 33 illustrates the translation of the movable member of the micro movable device of the second embodiment, where (a) is a sectional view taken along lines XXVI-XXVI in FIG. 24, and (b) is a sectional view taken along lines XXVII-XXVII in FIG. 24.

When no voltage is applied across the electrodes 12 and 22, the electrodes 13 and 23, the electrodes 14 and 24 and the electrodes 15 and 25, the movable member 10, which is connected to the stationary portion 20 via the connecting portions 31-34, is at a position in the natural state as illustrated in FIG. 26. When a potential difference is generated by the application of a driving voltage across the electrodes 12 and 22, an electrostatic attraction force is generated between the electrodes 12 and 22. When a potential difference is generated by the application of a driving voltage across the electrodes 13 and 23, an electrostatic attraction force is generated between the electrodes 13 and 23. When a potential difference is generated by the application of a driving voltage across the electrodes 14 and 24, an electrostatic attraction force is generated between the electrodes 14 and 24. When a potential difference is generated by the application of a driving voltage across the electrodes 15 and 25, an electrostatic attraction force is generated between the electrodes 15 and 25. The electrostatic attraction forces generated in this way act on the electrodes 12-15 as a driving force, so that the electrodes 12-15 of the movable member 10 are attracted to the electrodes 22-25 of the stationary portion 20, respectively. In this process, tension is applied to the connection bars 31a, 31b, 32a, 32b, 33a, 33b, 34a and 34b of the connecting portions 31-34, so that the connection bars are elastically deformed. Since the electrodes 12 and 13 are attracted to the electrodes 22 and 23 as illustrated in FIG. 33(a), while the electrodes 14 and 15 are attracted to the electrodes 24 and 25 as illustrated in FIG. 33(b), the movable member 10 is translated in the thickness direction H. The direction of the translation crosses both of the spacing direction D1 of the electrodes 12 and 13 and the spacing direction D2 of the electrodes 14 and 15. The amount of translation depends on the magnitude of the driving force applied to the electrodes 12-15 of the movable member 10. The amount of translation of the movable member 10 from the position in the natural state can be changed by controlling the voltage to be applied to each set of the electrodes and thereby adjusting the driving force.

When the electrostatic attraction force is eliminated, the connection bars 31a, 31b, 32a, 32b, 33a, 33b, 34a and 34b recover the original shape, and the movable member 10 returns to the initial position (position in the natural state) illustrated in FIG. 26.

When the light L is to impinge on the mirror surface 11a on the land 11A at right angles for reflection, the reflection position of the light L on the mirror surface 11a can be changed by translating the movable member 10 in the above-described manner, so that the optical path length of the light L can be changed.

As noted before, in the micro movable device X2, the entirety of the electrodes 12-15 of the movable member 10, which are utilized for generating an electrostatic attraction force with the electrodes 22-25, is positioned within the internal region $S_{21}$ extending between the connection points P1 and P3 in the spacing direction D' of the connection points P1 and P3. Thus, in translating the movable member 10 from the position in the natural state or changing the amount of the translation, the electrostatic attraction force as the driving force acts on the movable member 10, or the electrodes 12-15 within the internal region $S_{21}$. This is suitable for suppressing the rotation of the movable member 10 about the connection point P1 or P3 as the fulcrum in translating the movable member 10 or changing the amount of the translation.

As noted before, in the micro movable device X2, the entirety of the electrodes 12-15 of the movable member 10, which are utilized for generating an electrostatic attraction force with the electrodes 22-25, is positioned within the internal region $S_{22}$ extending between the connection points P2 and P4 in the spacing direction D" of the connection points P2 and P4. Thus, in translating the movable member 10 from the position in the natural state or changing the amount of the translation, the electrostatic attraction force as the driving force acts on the movable member 10, or the electrodes 12-15 within the internal region $S_{22}$. This is suitable for suppressing the rotation of the movable member 10 about the connection point P2 or P4 as the fulcrum in translating the movable member 10 or changing the amount of the translation.

As noted before, in the micro movable device X2, the entirety of the electrodes 12-15 of the movable member 10 is positioned within the internal region $S_{23}$ extending between the set of connection points P1, P2 and the set of connection points P3, P4 in the spacing direction D1 of the set of connection points P1, P2 and the set of connection points P3, P4. Thus, in translating the movable member 10 from the position in the natural state or changing the amount of the translation, the electrostatic attraction force as the driving force acts on the movable member 10, or the electrodes 12-15 within the internal region $S_{23}$. This is suitable for suppressing the rotation of the movable member 10 about the set of connection points P1, P2 or the set of connection points P3, P4 as the fulcrum in translating the movable member 10 or changing the amount of the translation.

As noted before, in the micro movable device X2, the entirety of the electrodes 12-15 of the movable member 10 is positioned within the internal region $S_{24}$ extending between the set of connection points P1, P4 and the set of connection points P2, P3 in the spacing direction D2 of the set of connection points P1, P4 and the set of connection points P2, P3. Thus, in translating the movable member 10 from the position in the natural state or changing the amount of the translation, the electrostatic attraction force as the driving force acts on the movable member 10, or the electrodes 12-15 within the internal region $S_{24}$. This is suitable for suppressing the rotation of the movable member 10 about the set of connection points P1, P4 or the set of connection points P2, P3 as the fulcrum in translating the movable member 10 or changing the amount of the translation.

As noted before, in the micro movable device X2, the electrodes 22-25 (stationary electrodes), which are utilized for generating an electrostatic attraction force with the electrodes 12-15, are electrically separated. Thus, different potentials can be applied to the electrodes 22-25. Thus, respective voltages to be applied across the electrodes 12 and 22, the electrodes 13 and 23, the electrodes 14 and 24 and the electrodes 15 and 25 can be adjusted individually. As a result, respective electrostatic attraction forces to be generated between the electrodes 12 and 22, the electrodes 13 and 23, the electrodes 14 and 24 and the electrodes 15 and 25 can be controlled individually. By controlling the electrostatic attraction forces in this way, the posture of the movable member 10 of the micro movable device X2 is adjusted as desired.

In the micro movable device X2 which is capable of suppressing the rotation of the movable member 10, even when the movable member 10 rotates with the set of connection points P1 and P2 or the set of connection points P3 and P4 serving as the fulcrum, the amount of rotation is considerably small. Thus, even when the posture of the movable member 10 is to be controlled to cancel such rotation, it is not necessary to provide a large difference between the voltage to be applied across the electrodes 12 and 22 and that to be applied across the electrodes 13 and 23. Similarly, even when the movable member 10 rotates with the set of connection points P1 and P4 or the set of connection points P2 and P3 serving as the fulcrum, the amount of rotation is considerably small. Thus, even when the posture of the movable member 10 is to be controlled to cancel such rotation, it is not necessary to provide a large difference between the voltage to be applied across the electrodes 14 and 24 and that to be applied across the electrodes 15 and 25. Thus, in the micro movable device X2, the posture control of the movable member 10 is achieved without increasing the driving voltage.

The above-described technical advantages due to the electrical separation of the electrodes 22-25, or the stationary electrodes are obtained also in the micro movable devices of other embodiments, which will described later.

In the micro movable device X2, the connecting portions 31-34 are connected respectively to the arms 11B extending from the land 11A of the movable member 10. This arrangement is suitable for positioning the electrodes 12-15 extending from the land 11A in the internal region $S_{21}$, $S_{22}$ $S_{23}$ or $S_{24}$.

As noted before, in the micro movable device X2, the connection bars 31a, 32a, 33a and 34a of the connecting portions 31-34 extend perpendicularly to the spacing direction D1 of the electrodes 12 and 13. With this arrangement, the displacement of the movable member 10 in a direction perpendicular to the spacing direction D1 is suppressed. Further, the connection bars 31b, 32b, 33b and 34b of the connecting portions 31-34 extend perpendicularly to the spacing direction D2 of the electrodes 14 and 15. With this arrangement, the displacement of the movable member 10 in a direction perpendicular to the spacing direction D2 is suppressed.

As noted before, in the micro movable device X2, each of the electrodes 12-15, 22-25 has a comb-tooth electrode structure. This arrangement is suitable for finely controlling the electrostatic attraction forces to be generated between the electrodes 12 and 22, the electrodes and 23, the electrodes 14 and 24 and the electrodes 15 and 25 to finely control the driving force for translating the movable member 10. This advantage due to the comb-tooth electrode structure of the electrodes for generating a driving force is obtained also in the micro movable devices of other embodiments, which will be described later.

In the micro movable device X2, the connecting portions 31-34 or the connection bars 31a, 31b, 32a, 32b, 33a, 33b, 34a and 34b are smaller in thickness than the movable member 10 and the first layer 21A of the frame 21 of the stationary portion 20. Connecting portions 31-34 having a smaller thickness enable the movable member 10 to be translated with a smaller driving force. Thus, the connecting portions 31-34 which are smaller in thickness than the movable member 10 and the first layer 21A are suitable for reducing the driving voltage of the micro movable device X2. This advantage due to the connection of the movable member and the stationary portion by thin connecting portions is obtained also in the micro movable devices of other embodiments, which will be described later.

Figure 34:
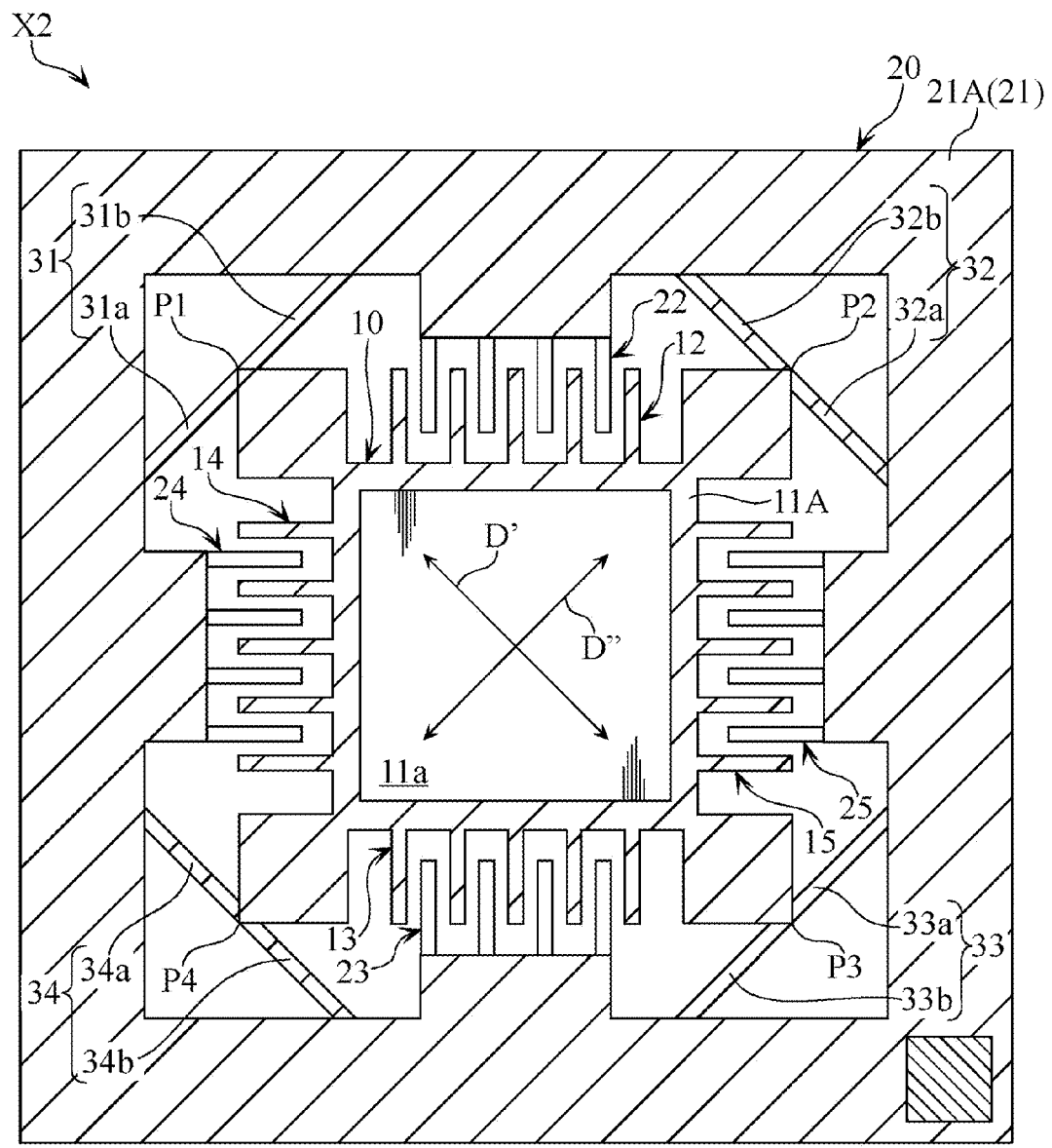
FIG. 34 is a plan view illustrating a first variation of the micro movable device according to the second embodiment.

FIG. 34 is a plan view illustrating a first variation of the micro movable device X2. The micro movable device X2 may include the connecting portions 31-34 as illustrated in FIG. 34. Specifically, in this variation, the connecting portion 31 is made up of connection bars 31a and 31b extending perpendicularly to the spacing direction D' of the connection points P1 and P3. The connecting portion 32 is made up of connection bars 32a and 32b extending perpendicularly to the spacing direction D" of the connection points P2 and P4. The connecting portion 33 is made up of connection bars 33a and 33b extending perpendicularly to the spacing direction D'. The connecting portion 34 is made up of connection bars 34a and 34b extending perpendicularly to the spacing direction D". With this arrangement, the connection bars 31a, 31b, 33a and 33b suppress the displacement of the movable member 10 in a direction perpendicular to the spacing direction D'. Further, the connection bars 32a, 32b, 34a and 34b suppress the displacement of the movable member 10 in a direction perpendicular to the spacing direction D".

Figure 35:
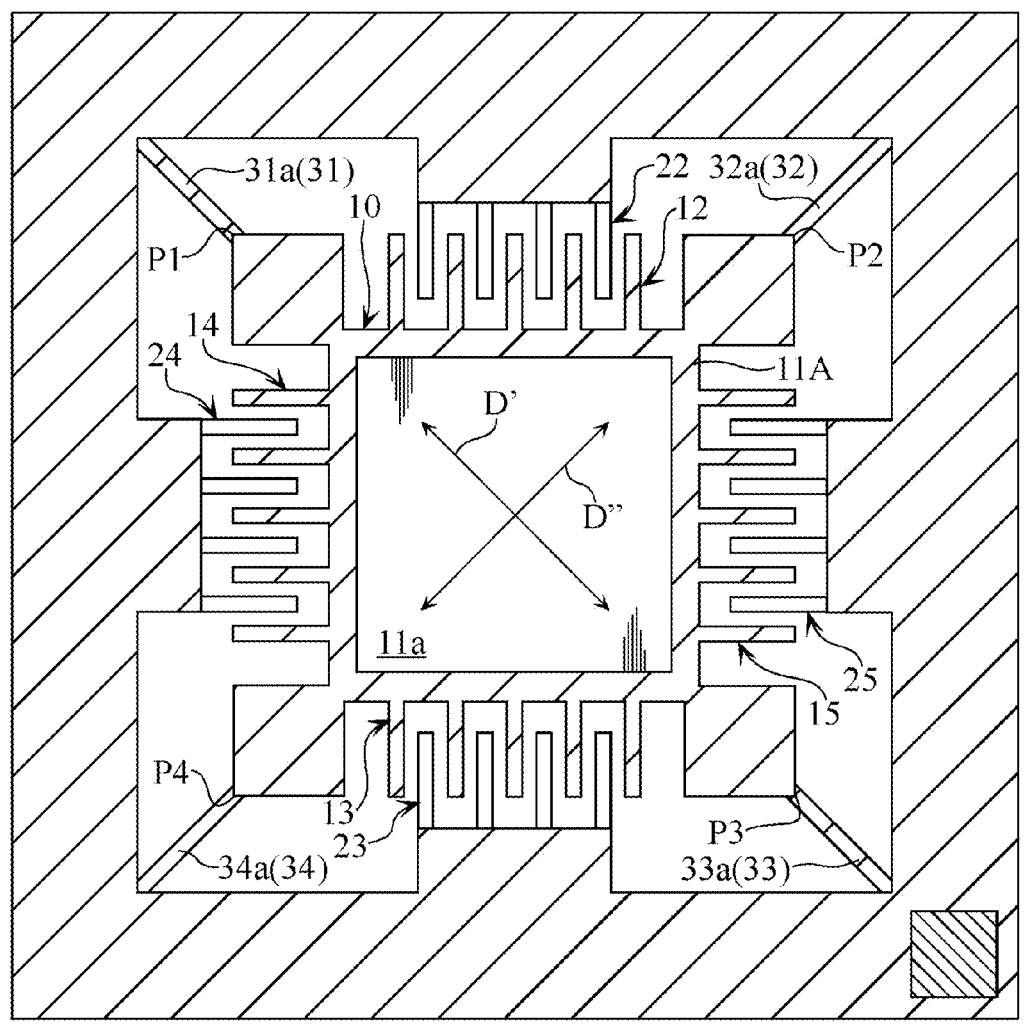
FIG. 35 is a plan view illustrating a second variation of the micro movable device according to the second embodiment.

FIG. 35 is a plan view illustrating a second variation of the micro movable device X2. The micro movable device X2 may include the connecting portions 31-34 as illustrated in FIG. 35. Specifically, in this variation, the connecting portion 31 is a connection bar 31a extending in the spacing direction D' of the connection points P1 and P3. The connecting portion 32 is a connection bar 32a extending in the spacing direction D" of the connection points P2 and P4. The connecting portion 33 is a connection bar 33a extending in the spacing direction D'. The connecting portion 34 is a connection bar 34a extending in the spacing direction D". With this arrangement, the connection bars 31a and 33a suppress the displacement of the movable member 10 in the spacing direction D', whereas the connection bars 32a and 34a suppress the displacement of the movable member 10 in the spacing direction D". Further, this variation in which the movable member 10 and the stationary portion 20 are connected to each other only by the four connection bars is more suitable for reducing the driving voltage for translating the movable member 10 than the arrangement in which the movable member 10 and the stationary portion 20 are connected to each other by a larger number of connection bars.

Figure 36:
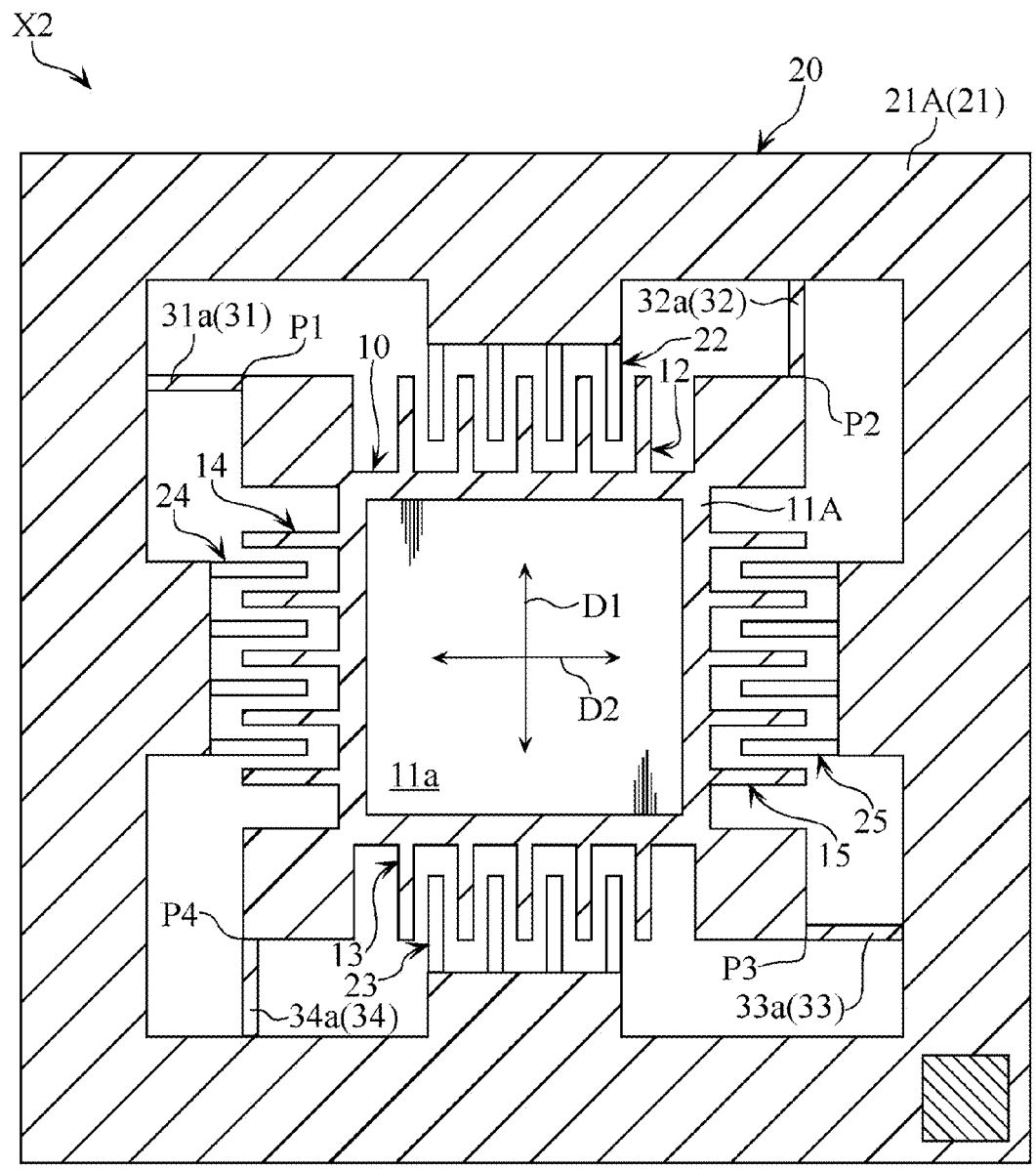
FIG. 36 is a plan view illustrating a third variation of the micro movable device according to the second embodiment.

FIG. 36 is a plan view illustrating a third variation of the micro movable device X2. The micro movable device X2 may include the connecting portions 31-34 as illustrated in FIG. 36. Specifically, in this variation, the connecting portion 31 is a connection bar 31a extending perpendicularly to the spacing direction D1 of the electrodes 12 and 13. The connecting portion 32 is a connection bar 32a extending perpendicularly to the spacing direction D2. The connecting portion 33 is a connection bar 33a extending perpendicularly to the spacing direction D1. The connecting portion 34 is a connection bar 34a extending perpendicularly to the spacing direction D2. With this arrangement, the connection bars 31a and 33a suppress the displacement of the movable member 10 in a direction perpendicular to the spacing direction D1, whereas the connection bars 32a and 34a suppress the displacement of the movable member 10 in a direction perpendicular to the spacing direction D2. Further, this variation in which the movable member 10 and the stationary portion 20 are connected to each other only by the four connection bars is more suitable for reducing the driving voltage for translating the movable member 10 than the arrangement in which the movable member 10 and the stationary portion 20 are connected to each other by a larger number of connection bars.

Figure 37:
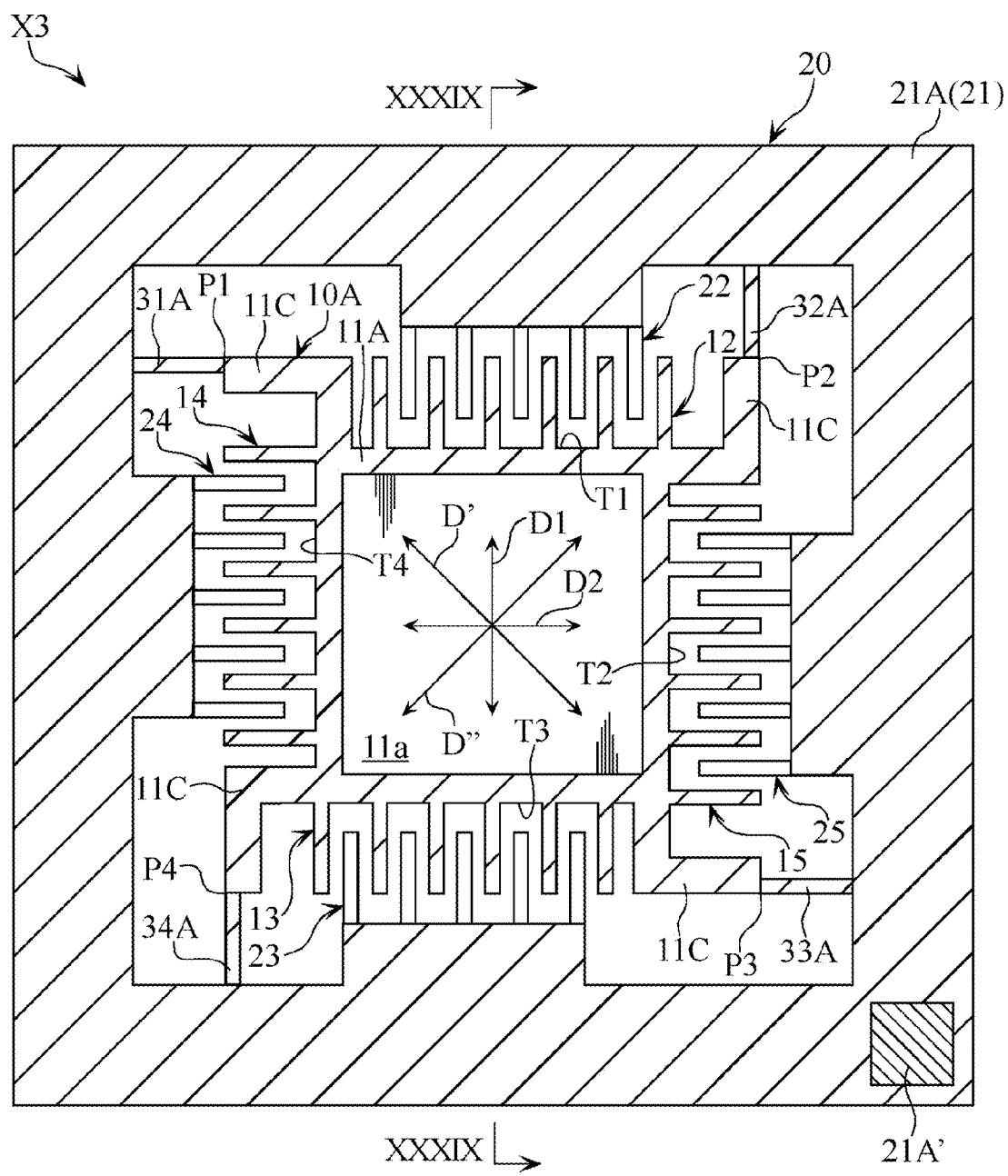
FIG. 37 is a plan view illustrating a micro movable device according to a third embodiment.
Figure 38:
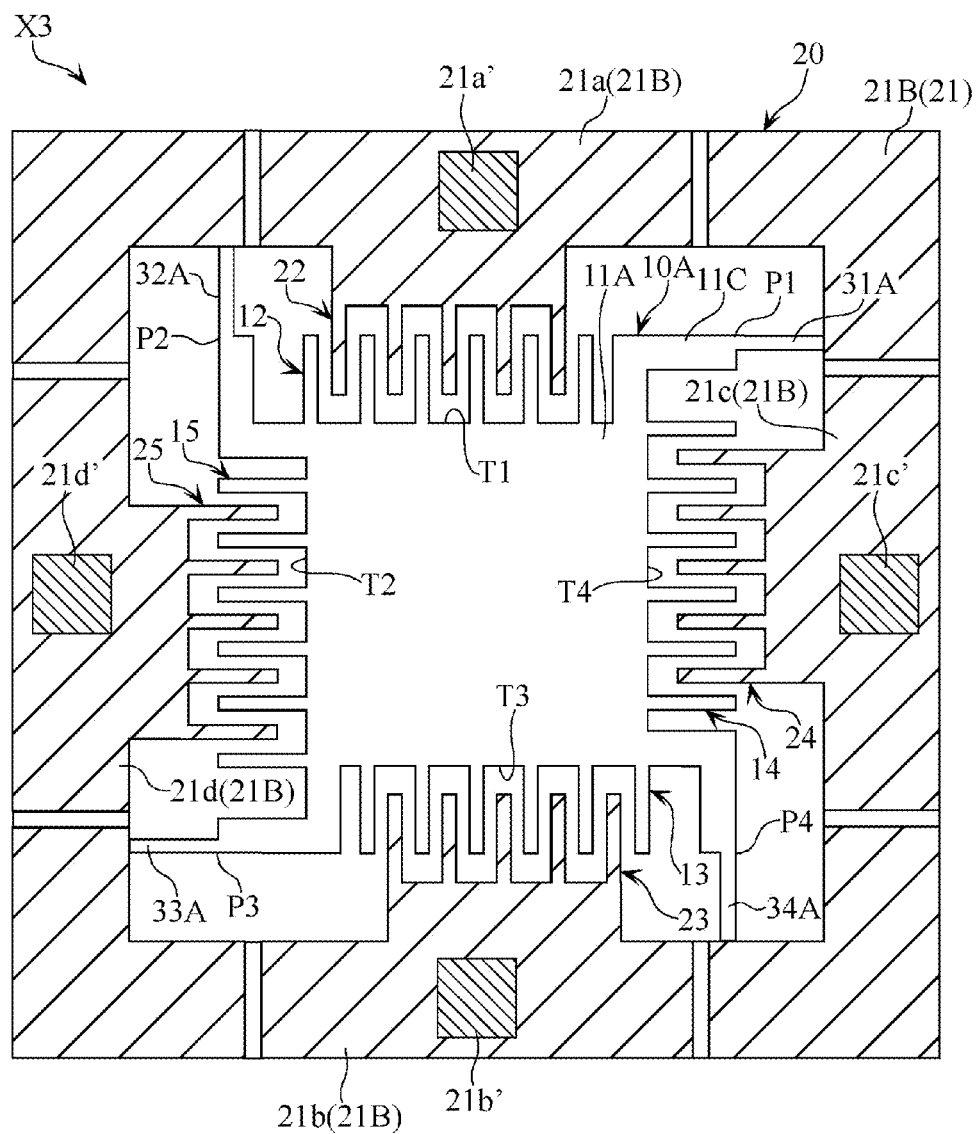
FIG. 38 is another plan view of the micro movable device illustrated in FIG. 37.
Figure 39:
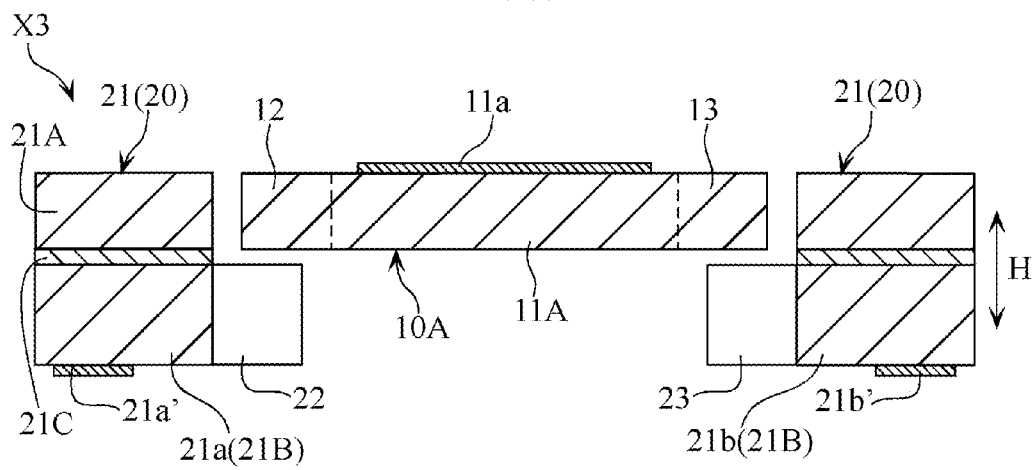
FIG. 39 is a sectional view taken along lines XXXIX-XXXIX in FIG. 37.

FIGS. 37-39 illustrate a micro movable device X3 according to a third embodiment. FIG. 37 is a plan view of the micro movable device X3. FIG. 38 is another plan view of the micro movable device X3. FIG. 39 is a sectional view taken along lines XXXIX-XXXIX in FIG. 37.

The micro movable device X3 is a micro mirror device including a movable member 10A, a stationary portion 20 and connecting portions 31A, 32A, 33A and 34A. The micro mirror device X3 differs from the micro mirror device X2 in that the micro mirror device X3 includes a movable member 10A instead of the movable member 10, and connecting portions 31A, 32A, 33A and 34A instead of the connecting portions 31, 32, 33 and 34. Similarly to the micro mirror device X2, the micro movable device X3 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X3 are mainly made of the first silicon layer and/or the second silicon layer. FIG. 37 illustrates the first silicon layer side, whereas FIG. 38 illustrates the second silicon layer side. For a better understanding, the portions made of the first silicon layer are indicated by hatching in FIG. 37, whereas the portions made of the second silicon layer are indicated by hatching in FIG. 38.

The movable member 10A is made of the first silicon layer. The movable member 10A includes a land 11A, four arms 11C and electrodes 12, 13, 14 and 15. The movable member 10A differs from the movable member 10 of the micro movable device X2 in that the movable member 10A includes arms 11C having a bent shape instead of the arms 11B. Specifically, one of the arms 11C includes a first portion extending from the edge T1 of the land 11A at a position adjacent to the edge T4, and a second portion extending perpendicularly from the first portion. Another one of the arms 11C includes a first portion extending from the edge T2 of the land 11A at a position adjacent to the edge T1, and a second portion extending perpendicularly from the first portion. Another one of the arms 11C includes a first portion extending from the edge T3 of the land 11A at a position adjacent to the edge T2, and a second portion extending perpendicularly from the first portion. Another one of the arms 11C includes a first portion extending from the edge T4 of the land 11A at a position adjacent to the edge T3, and a second portion extending perpendicularly from the first portion. The structure of other parts of the movable member 10A is the same as that of the movable member 10 of the micro movable device X2.

Similarly to the stationary portion 20 of the micro movable device X2, the stationary portion 20 of the micro movable device X3 includes a frame 21 and electrodes 22, 23, 24 and 25. The specific structure of the frame 21 and the electrodes 22, 23, 24 and 25 of the micro movable device X3 is the same as that described before with respect to the frame 21 and the electrodes 22, 23, 24 and 25 of the micro movable device X2.

The connecting portions 31A-34A are made of the first silicon layer and connect the movable member 10A and the stationary portion 20 to each other. The connecting portion 31A is a connection bar extending perpendicularly to the spacing direction D1 of the electrodes 12 and 13 and is connected to one of the arms 11C of the movable member 10A and also connected to the first layer 21A of the frame 21 of the stationary portion 20. The point at which the connecting portion 31A and the arm 11C of the movable member 10A are connected to each other is referred to as a connection point P1. Similarly to the connecting portion 31 (connection bars 31a, 31b) of the micro movable device X2, the connecting portion 31A is smaller in thickness than the first layer 21A of the frame 21 and the movable member 10A.

The connecting portion 32A is a connection bar extending perpendicularly to the spacing direction D2 of the electrodes 14 and 15 and is connected to one of the arms 11C of the movable member 10A and also connected to the first layer 21A of the frame 21 of the stationary portion 20. The point at which the connecting portion 32A and the arm 11C of the movable member 10A are connected to each other is referred to as a connection point P2. Similarly to the connecting portion 32 (connection bars 32a, 32b) of the micro movable device X2, the connecting portion 32A is smaller in thickness than the first layer 21A of the frame 21 and the movable member 10A.

The connecting portion 33A is a connection bar extending perpendicularly to the spacing direction D1 of the electrodes 12 and 13 and is connected to one of the arms 11C of the movable member 10A and also connected to the first layer 21A of the frame 21 of the stationary portion 20. The point at which the connecting portion 33A and the arm 11C of the movable member 10A are connected to each other is referred to as a connection point P3. Similarly to the connecting portion 33 (connection bars 33a, 33b) of the micro movable device X2, the connecting portion 33A is smaller in thickness than the first layer 21A of the frame 21 and the movable member 10A.

The connecting portion 34A is a connection bar extending perpendicularly to the spacing direction D2 of the electrodes 14 and 15 and is connected to one of the arms 11C of the movable member 10A and also connected to the first layer 21A of the frame 21 of the stationary portion 20. The point at which the connecting portion 34A and the arm 11C of the movable member 10A are connected to each other is referred to as a connection point P4. Similarly to the connecting portion 34 (connection bars 34a, 34b) of the micro movable device X2, the connecting portion 34A is smaller in thickness than the first layer 21A of the frame 21 and the movable member 10A.

Figure 40:
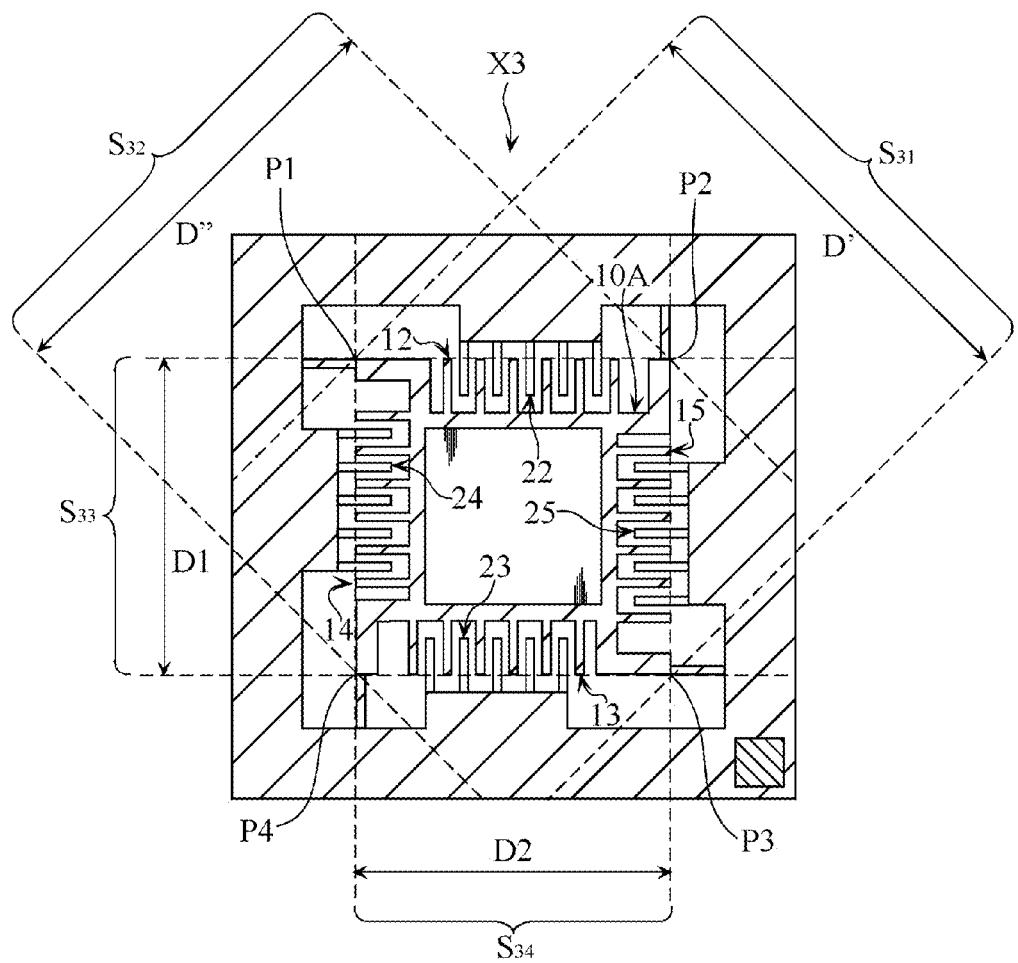
FIG. 40 is a plan view illustrating internal regions according to the third embodiment.

As illustrated in FIG. 40, in the micro movable device X3, the entirety of the electrodes 12-15 of the movable member 10A, which are utilized for generating an electrostatic attraction force with the electrodes 22-25, is positioned within the internal region $S_{31}$ extending between the connection points P1 and P3 in the spacing direction D' in which the connection points P1 and P3 are spaced from each other. The entirety of the electrodes 12-15 is also positioned within the internal region $S_{32}$ extending between the connection points P2 and P4 in the spacing direction D'' in which the connection points P2 and P4 are spaced from each other. The entirety of the electrodes 12-15 is also positioned within the internal region $S_{33}$ extending between a set of connection points P1, P2 and a set of connection points P3, P4 in the spacing direction D1 in which the set of connection points P1, P2 and the set of connection points P3, P4 are spaced from each other. The entirety of the electrodes 12-15 is also positioned within the internal region $S_{34}$ extending between a set of connection points P1, P4 and a set of connection points P2, P3 in the spacing direction D2 in which the set of connection points P1, P4 and the set of connection points P2, P3 are spaced from each other.

In the micro movable device X3, the movable member 10A is translated in the thickness direction H indicated in FIG. 39 by applying a driving voltage across the electrodes 12 and 22, the electrodes 13 and 23, the electrodes 14 and 24 and the electrodes 15 and 25. The method for translating the movable member 10A is the same as the above-described method for translating the movable member 10 of the micro movable device X2. When light is to impinge on the mirror surface 11a on the land 11A of the movable member 10A at right angles for reflection, the reflection position of the light on the mirror surface 11a can be changed by translating the movable member 10A, so that the optical path length of the light can be changed.

As noted before, in the micro movable device X3, the entirety of the electrodes 12-15 of the movable member 10A, which are utilized for generating an electrostatic attraction force with the electrodes 22-25, is positioned within the internal region $S_{31}$ extending between the connection points P1 and P3 in the spacing direction D' of the connection points P1 and P3. Thus, in translating the movable member 10A from the position in the natural state or changing the amount of the translation, the electrostatic attraction force as the driving force acts on the movable member 10A, or the electrodes 12-15 within the internal region $S_{31}$. This is suitable for suppressing the rotation of the movable member 10A about the connection point P1 or P3 as the fulcrum in translating the movable member 10A or changing the amount of the translation.

As noted before, in the micro movable device X3, the entirety of the electrodes 12-15 of the movable member 10A, which are utilized for generating an electrostatic attraction force with the electrodes 22-25, is positioned within the internal region $S_{32}$ extending between the connection points P2 and P4 in the spacing direction D'' of the connection points P2 and P4. Thus, in translating the movable member 10A from the position in the natural state or changing the amount of the translation, the electrostatic attraction force as the driving force acts on the movable member 10A, or the electrodes 12-15 within the internal region $S_{32}$. This is suitable for suppressing the rotation of the movable member 10A about the connection point P2 or P4 as the fulcrum in translating the movable member 10A or changing the amount of the translation.

As noted before, in the micro movable device X3, the entirety of the electrodes 12-15 of the movable member 10A is positioned within the internal region $S_{33}$ extending between the set of connection points P1, P2 and the set of connection points P3, P4 in the spacing direction D1 of the set of connection points P1, P2 and the set of connection points P3, P4. Thus, in translating the movable member 10A from the position in the natural state or changing the amount of the translation, the electrostatic attraction force as the driving force acts on the movable member 10A, or the electrodes 12-15 within the internal region $S_{33}$. This is suitable for suppressing the rotation of the movable member 10A about the set of connection points P1, P2 or the set of connection points P3, P4 as the fulcrum in translating the movable member 10A or changing the amount of the translation.

As noted before, in the micro movable device X3, the entirety of the electrodes 12-15 of the movable member 10A is positioned within the internal region $S_{34}$ extending between the set of connection points P1, P4 and the set of connection points P2, P3 in the spacing direction D2 of the set of connection points P1, P4 and the set of connection points P2, P3. Thus, in translating the movable member 10A from the position in the natural state or changing the amount of the translation, the electrostatic attraction force as the driving force acts on the movable member 10A, or the electrodes 12-15 within the internal region $S_{34}$. This is suitable for suppressing the rotation of the movable member 10A about the set of connection points P1, P4 or the set of connection points P2, P3 as the fulcrum in translating the movable member 10A or changing the amount of the translation.

In the micro movable device X3, the connecting portions 31A-34A are connected respectively to the arms 11C extending from the land 11A of the movable member 10A. This arrangement is suitable for positioning the electrodes 12-15 extending from the land 11A in the internal region $S_{31}$, $S_{32}$ $S_{33}$ or $S_{34}$.

As noted before, in the micro movable device X3, the connecting portions 31A and 33A extend perpendicularly to the spacing direction D1 of the electrodes 12 and 13. With this arrangement, the displacement of the movable member 10A in a direction perpendicular to the spacing direction D1 is suppressed. Further, the connecting portions 32A and 34A extend perpendicularly to the spacing direction D2 of the electrodes 14 and 15. With this arrangement, the displacement of the movable member 10A in a direction perpendicular to the spacing direction D2 is suppressed.

Each of the arms 11C of the micro movable device X3 extends from only one edge of the land 11A and is smaller in width than the arms 11B of the micro movable device X2. Thus, in the micro movable device X3, a larger space is secured for the arrangement of the electrodes 12-15 than in the micro movable device X2, which makes it possible to increase the number of electrode teeth of each of the electrodes 12-15. By increasing the number of electrode teeth of the electrodes 12-15 as well as the number of electrode teeth of the electrodes 22-25, the driving voltage of the micro movable device X3 is reduced.

Figure 41:
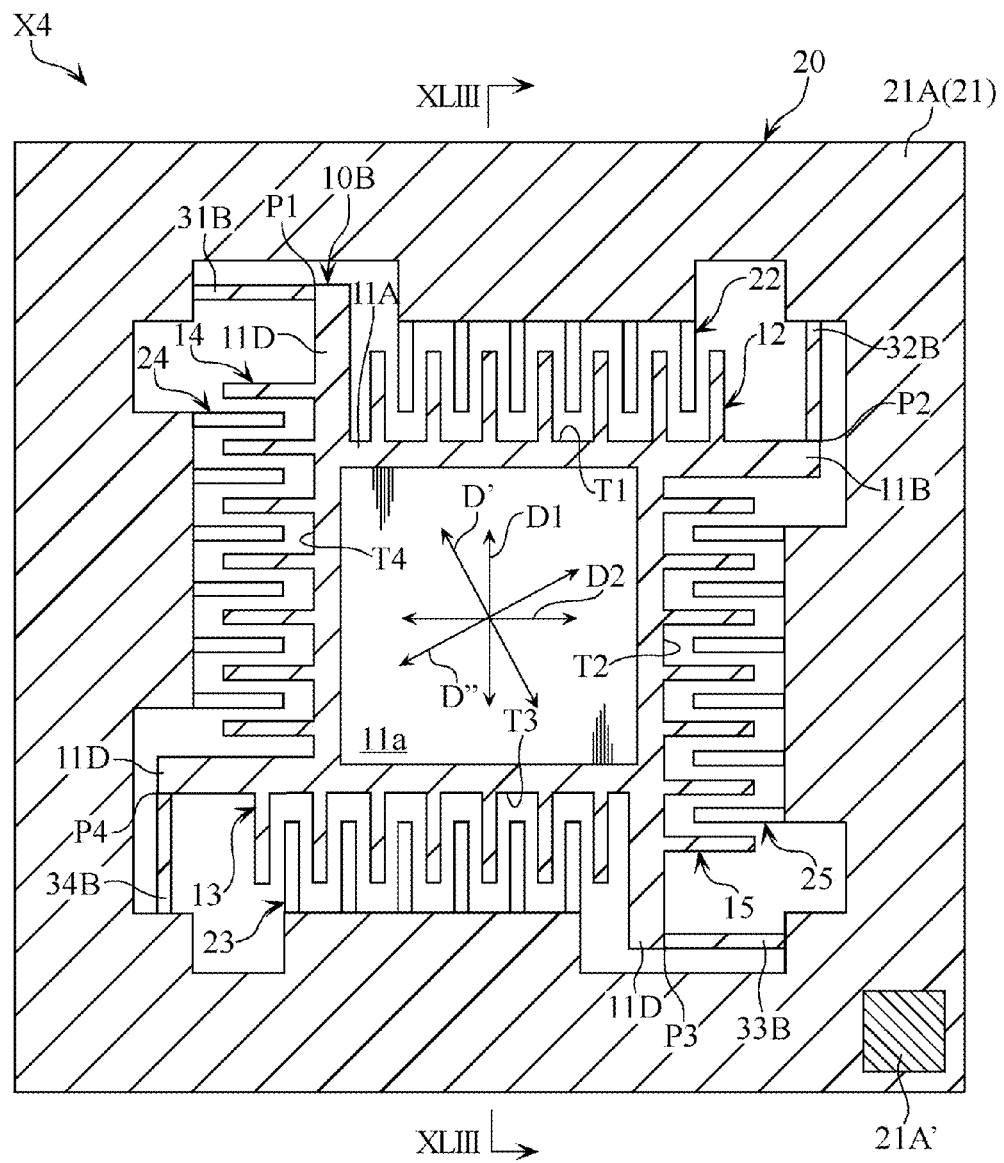
FIG. 41 is a plan view illustrating a micro movable device according to a fourth embodiment.
Figure 42:
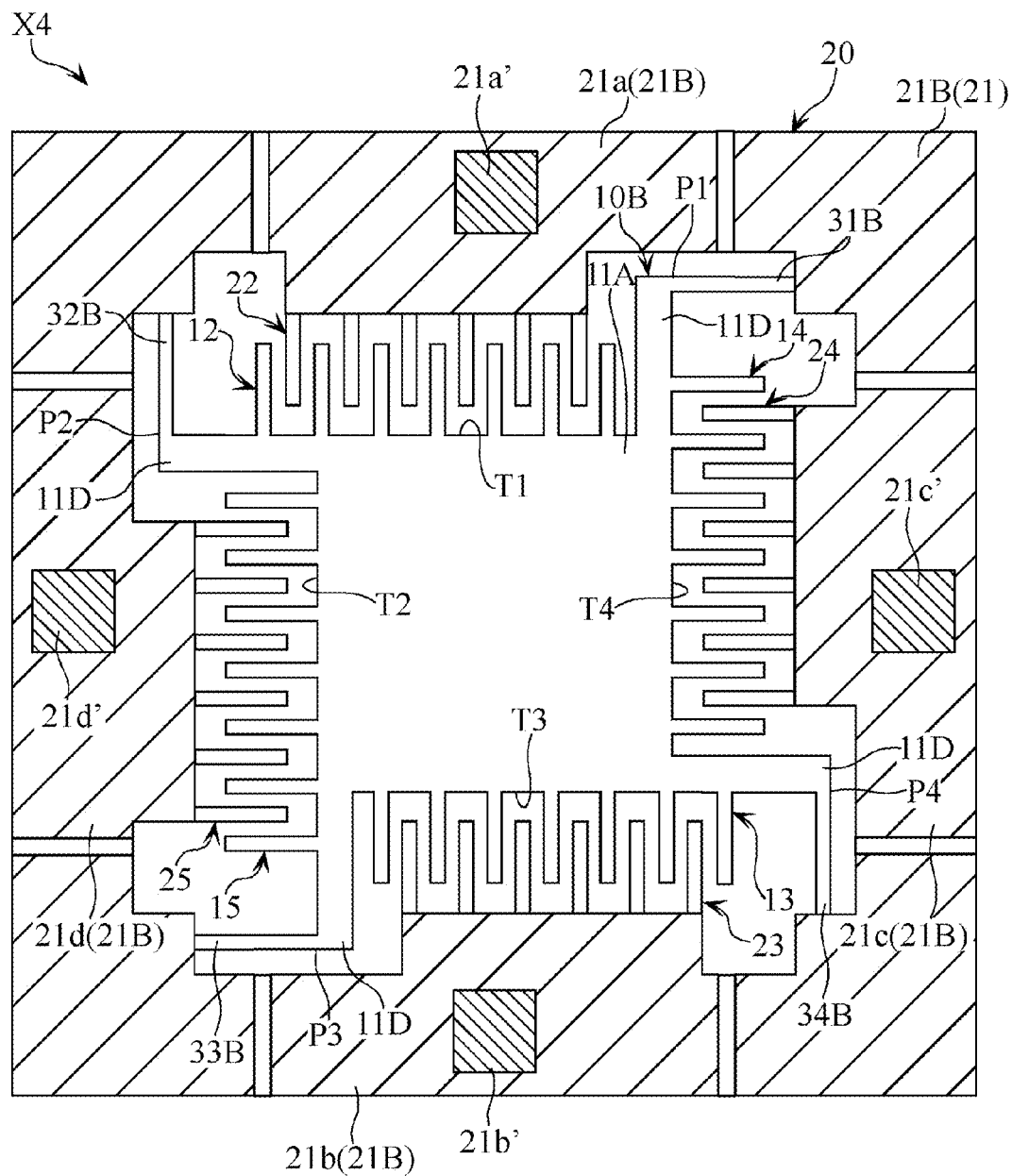
FIG. 42 is another plan view of the micro movable device illustrated in FIG. 41.
Figure 43:
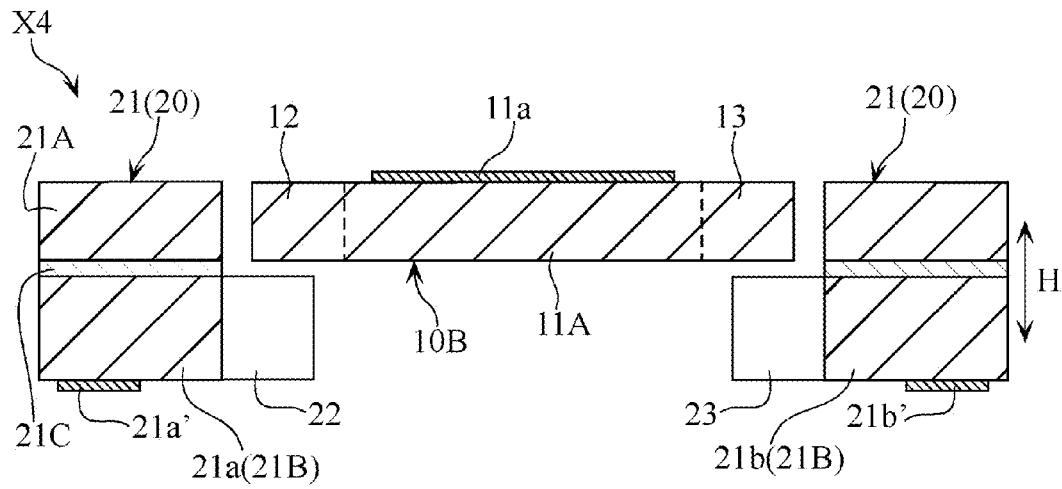
FIG. 43 is a sectional view taken along lines XLIII-XLIII in FIG. 41.

FIGS. 41-43 illustrate a micro movable device X4 according to a fourth embodiment. FIG. 41 is a plan view of the micro movable device X4. FIG. 42 is another plan view of the micro movable device X4. FIG. 43 is a sectional view taken along lines XLIII-XLIII in FIG. 41.

The micro movable device X4 is a micro mirror device including a movable member 10B, a stationary portion 20 and connecting portions 31B, 32B, 33B and 34B. The micro mirror device X4 differs from the micro mirror device X2 in that the micro mirror device X4 includes a movable member 10B instead of the movable member 10, and connecting portions 31B, 32B, 33B and 34B instead of the connecting portions 31, 32, 33 and 34. Similarly to the micro mirror device X2, the micro movable device X4 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X4 are mainly made of the first silicon layer and/or the second silicon layer. FIG. 41 illustrates the first silicon layer side, whereas FIG. 42 illustrates the second silicon layer side. For a better understanding, the portions made of the first silicon layer are indicated by hatching in FIG. 41, whereas the portions made of the second silicon layer are indicated by hatching in FIG. 42.

The movable member 10B is made of the first silicon layer. The movable member 10B includes a land 11A, four arms 11D and electrodes 12, 13, 14 and 15. The movable member 10B differs from the movable member 10 of the micro movable device X2 in that the movable member 10B includes arms 11D instead of the arms 11B. As illustrated in FIGS. 41 and 42, one of the arms 11D extends from the edge T1 of the land 11A at a position adjacent to the edge T4, and the direction of its extension is parallel to the edge T4. Another one of the arms 11D extends from the edge T2 of the land 11A at a position adjacent to the edge T1, and the direction of its extension is parallel to the edge T1. Another one of the arms 11D extends from the edge T3 of the land 11A at a position adjacent to the edge T2, and the direction of its extension is parallel to the edge T2. Another one of the arms 11D extends from the edge T4 of the land 11A at a position adjacent to the edge T3, and the direction of its extension is parallel to the edge. Each of the electrodes 12-15 of this embodiment has a comb-tooth electrode structure including a set of electrode teeth, which includes a plurality of electrode teeth projecting from an edge of the land 11A and a plurality of electrode teeth projecting from one of the arms 11D. The electrodes 12-15 are electrically connected to each other via the land 11A and the arms 11D. The spacing direction D1 in which the electrodes 12 and 13 are spaced from each other is perpendicular to the spacing direction D2 in which the electrodes 14 and 15 are spaced from each other. The structure of other parts of the movable member 10B is the same as that of the movable member 10 of the micro movable device X2.

Similarly to the stationary portion 20 of the micro movable device X2, the stationary portion 20 of the micro movable device X4 includes a frame 21 and electrodes 22, 23, 24 and 25. The frame 21 of the micro movable device X4 is partially different from that of the micro movable device X2 in pattern shape of the first layer 21A. The specific structure of other portions of the frame 21 and the electrodes 22, 23, 24 and 25 of the micro movable device X4 is the same as that described before with respect to the frame 21 and the electrodes 22, 23, 24 and 25 of the micro movable device X2.

The connecting portions 31B-34B are made of the first silicon layer and connect the movable member 10B and the stationary portion 20 to each other. The connecting portion 31B is a connection bar extending perpendicularly to the spacing direction D1 of the electrodes 12 and 13 and is connected to one of the arms 11D of the movable member 10B and also connected to the first layer 21A of the frame 21 of the stationary portion 20. The point at which the connecting portion 31B and the arm 11D of the movable member 10B are connected to each other is referred to as a connection point P1. Similarly to the connecting portion 31 (connection bars 31a, 31b) of the micro movable device X2, the connecting portion 31B is smaller in thickness than the first layer 21A of the frame 21 and the movable member 10B.

The connecting portion 32B is a connection bar extending perpendicularly to the spacing direction D2 of the electrodes 14 and 15 and is connected to one of the arms 11D of the movable member 10B and also connected to the first layer 21A of the frame 21 of the stationary portion 20. The point at which the connecting portion 32B and the arm 11D of the movable member 10B are connected to each other is referred to as a connection point P2. Similarly to the connecting portion 32 (connection bars 32a, 32b) of the micro movable device X2, the connecting portion 32B is smaller in thickness than the first layer 21A of the frame 21 and the movable member 10B.

The connecting portion 33B is a connection bar extending perpendicularly to the spacing direction D1 of the electrodes 12 and 13 and is connected to one of the arms 11D of the movable member 10B and also connected to the first layer 21A of the frame 21 of the stationary portion 20. The point at which the connecting portion 33B and the arm 11D of the movable member 10B are connected to each other is referred to as a connection point P3. Similarly to the connecting portion 33 (connection bars 33a, 33b) of the micro movable device X2, the connecting portion 33B is smaller in thickness than the first layer 21A of the frame 21 and the movable member 10B.

The connecting portion 34B is a connection bar extending perpendicularly to the spacing direction D2 of the electrodes 14 and 15 and is connected to one of the arms 11D of the movable member 10B and also connected to the first layer 21A of the frame 21 of the stationary portion 20. The point at which the connecting portion 34B and the arm 11D of the movable member 10B are connected to each other is referred to as a connection point P4. Similarly to the connecting portion 34 (connection bars 34a, 34b) of the micro movable device X2, the connecting portion 34B is smaller in thickness than the first layer 21A of the frame 21 and the movable member 10B.

Figure 44:
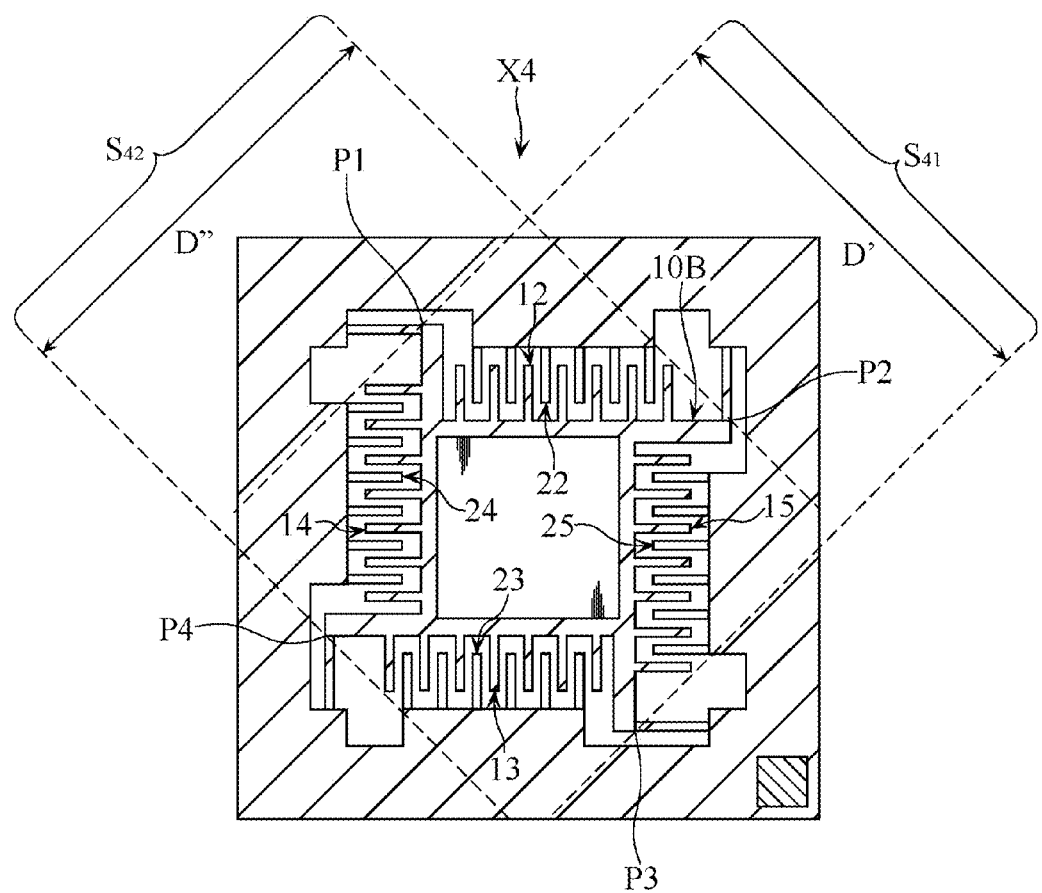
FIG. 44 is a plan view illustrating internal regions according to the fourth embodiment.

As illustrated in FIG. 44, in the micro movable device X4, the entirety of the electrodes 12-15 of the movable member 10B, which are utilized for generating an electrostatic attraction force with the electrodes 22-25, is positioned within the internal region $S_{41}$ extending between the connection points P1 and P3 in the spacing direction D' in which the connection points P1 and P3 are spaced from each other. The entirety of the electrodes 12-15 is also positioned within the internal region $S_{42}$ extending between the connection points P2 and P4 in the spacing direction D" in which the connection points P2 and P4 are spaced from each other.

In the micro movable device X4, the movable member 10B is translated in the thickness direction H indicated in FIG. 43 by applying a driving voltage across the electrodes 12 and 22, the electrodes 13 and 23, the electrodes 14 and 24 and the electrodes 15 and 25. The method for translating the movable member 10B is the same as the above-described method for translating the movable member 10 of the micro movable device X2. When light is to impinge on the mirror surface 11a on the land 11A of the movable member 10B at right angles for reflection, the reflection position of the light on the mirror surface 11a can be changed by translating the movable member 10B, so that the optical path length of the light can be changed.

As noted before, in the micro movable device X4, the entirety of the electrodes 12-15 of the movable member 10B, which are utilized for generating an electrostatic attraction force with the electrodes 22-25, is positioned within the internal region $S_{41}$ extending between the connection points P1 and P3 in the spacing direction D' of the connection points P1 and P3. Thus, in translating the movable member 10B from the position in the natural state or changing the amount of the translation, the electrostatic attraction force as the driving force acts on the movable member 10B, or the electrodes 12-15 within the internal region $S_{41}$. This is suitable for suppressing the rotation of the movable member 10B about the connection point P1 or P3 as the fulcrum in translating the movable member 10B or changing the amount of the translation.

As noted before, in the micro movable device X4, the entirety of the electrodes 12-15 of the movable member 10B, which are utilized for generating an electrostatic attraction force with the electrodes 22-25, is positioned within the internal region $S_{42}$ extending between the connection points P2 and P4 in the spacing direction D" of the connection points P2 and P4. Thus, in translating the movable member 10B from the position in the natural state or changing the amount of the translation, the electrostatic attraction force as the driving force acts on the movable member 10B, or the electrodes 12-15 within the internal region $S_{42}$. This is suitable for suppressing the rotation of the movable member 10B about the connection point P2 or P4 as the fulcrum in translating the movable member 10B or changing the amount of the translation.

In the micro movable device X4, the connecting portions 31B-34B are connected respectively to the arms 11D extending from the land 11A of the movable member 10B. This arrangement is suitable for positioning the electrodes 12-15 extending from the land 11A in the internal region $S_{41}$ or $S_{42}$.

As noted before, in the micro movable device X4, the connecting portions 31B and 33B extend perpendicularly to the spacing direction D1 of the electrodes 12 and 13. With this arrangement, the displacement of the movable member 10B in a direction perpendicular to the spacing direction D1 is suppressed. Further, the connecting portions 32B and 34B extend perpendicularly to the spacing direction D2 of the electrodes 14 and 15. With this arrangement, the displacement of the movable member 10B in a direction perpendicular to the spacing direction D2 is suppressed.

In the micro movable device X4, each of the arms 11D extends from one of opposite ends of an edge of the land 11A in the direction in which the adjacent edge connected to that end extends. Further, the set of electrode teeth of each of the electrodes 12-15 projects from an edge of the land 11A and from the arm 11D extending from that edge in the same direction as the edge. Thus, in the micro movable device X4, larger space is secured for the arrangement of the electrodes 12-15 than in the micro movable device X2, which makes it possible to increase the number of electrode teeth of each of the electrodes 12-15. By increasing the number of electrode teeth of the electrodes 12-15 as well as the number of electrode teeth of the electrodes 22-25, the driving voltage of the micro movable device X3 is reduced.

Figure 45:
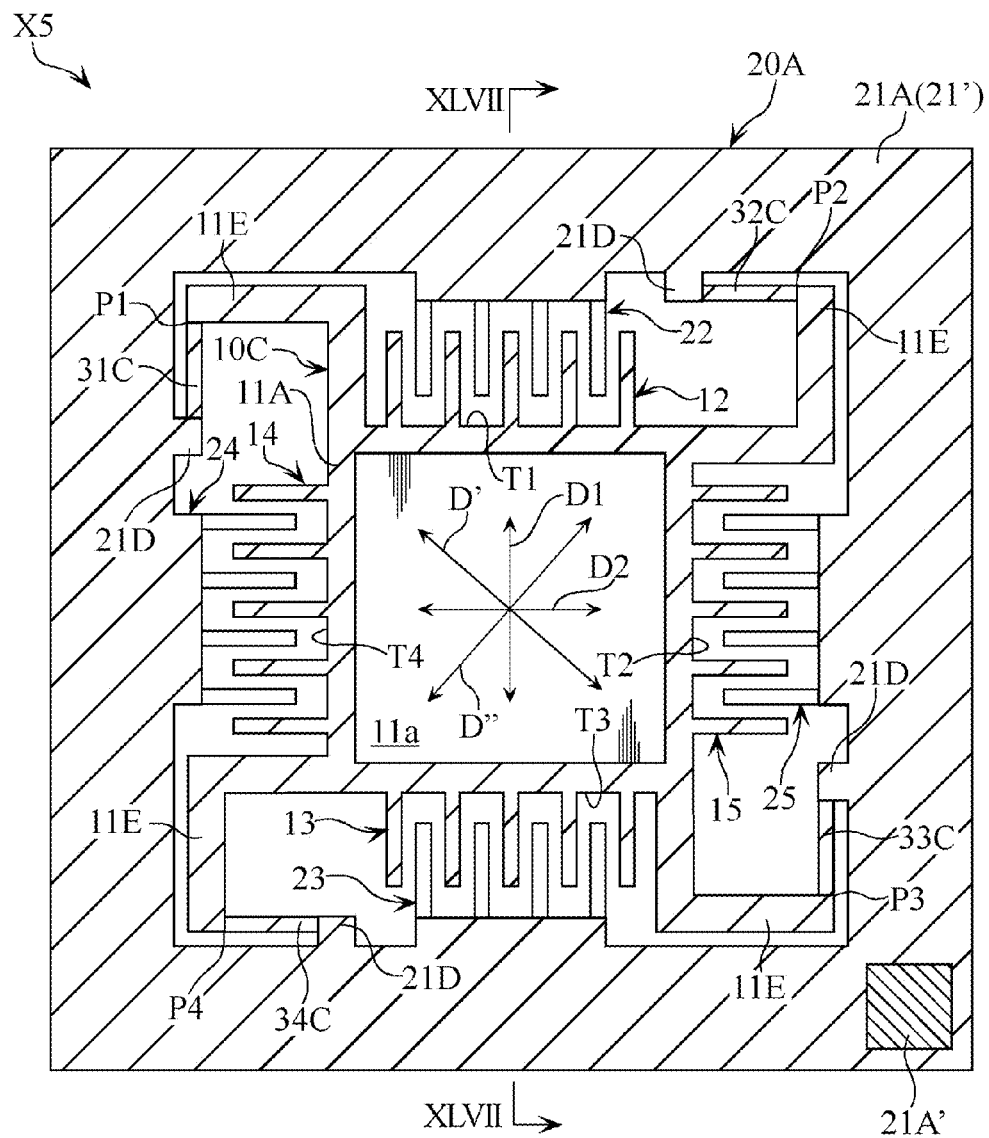
FIG. 45 is a plan view illustrating a micro movable device according to a fifth embodiment.
Figure 46:
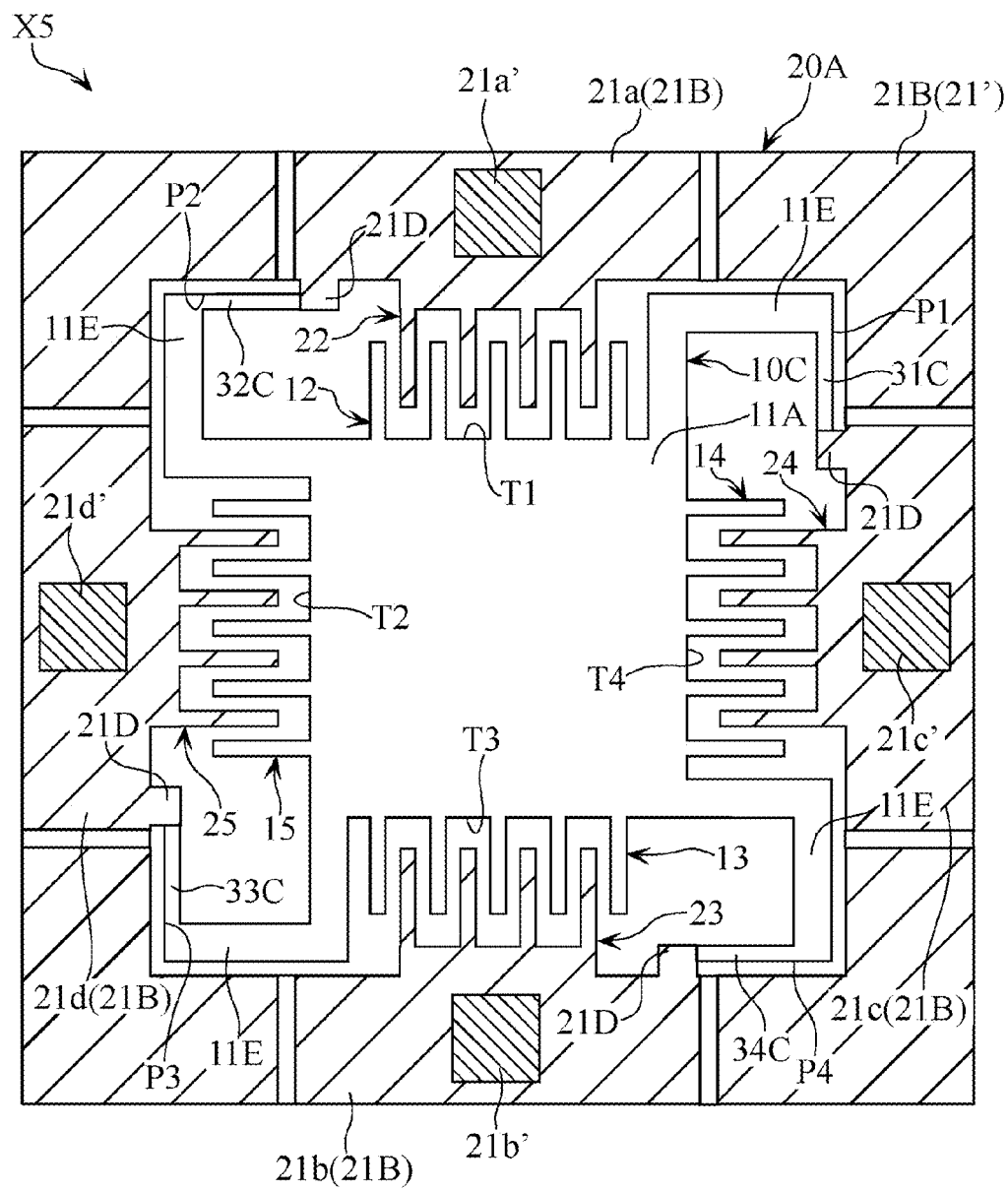
FIG. 46 is another plan view of the micro movable device illustrated in FIG. 45.
Figure 47:
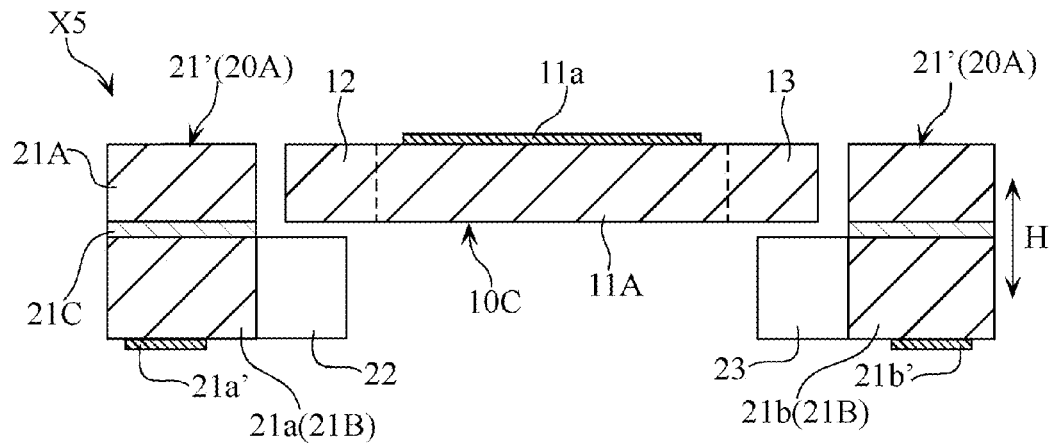
FIG. 47 is a sectional view taken along lines XLVII-XLVII in FIG. 45.

FIGS. 45-47 illustrate a micro movable device X5 according to a fifth embodiment. FIG. 45 is a plan view of the micro movable device X5. FIG. 46 is another plan view of the micro movable device X5. FIG. 47 is a sectional view taken along lines XLVII-XLVII in FIG. 45.

The micro movable device X5 is a micro mirror device including a movable member 10C, a stationary portion 20A and connecting portions 31C, 32C, 33C and 34C. Similarly to the micro mirror device X2, the micro movable device X5 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X5 are mainly made of the first silicon layer and/or the second silicon layer. FIG. 45 illustrates the first silicon layer side, whereas FIG. 46 illustrates the second silicon layer side. For a better understanding, the portions made of the first silicon layer are indicated by hatching in FIG. 45, whereas the portions made of the second silicon layer are indicated by hatching in FIG. 46.

The movable member 10C is made of the first silicon layer. The movable member 10C includes a land 11A, four arms 11E and electrodes 12, 13, 14 and 15. The movable member 10C differs from the movable member 10 of the micro movable device X2 in that the movable member 10C includes arms 11E having a bent shape instead of the arms 11B. Specifically, one of the arms 11E includes a first portion extending from the edge T1 of the land 11A at a position adjacent to the edge T4, and a second portion extending perpendicularly from the first portion. Another one of the arms 11E includes a first portion extending from the edge T2 of the land 11A at a position adjacent to the edge T1, and a second portion extending perpendicularly from the first portion. Another one of the arms 11E includes a first portion extending from the edge T3 of the land 11A at a position adjacent to the edge T2, and a second portion extending perpendicularly from the first portion. Another one of the arms 11C includes a first portion extending from the edge T4 of the land 11A at a position adjacent to the edge T3, and a second portion extending perpendicularly from the first portion. The structure of other parts of the movable member 10C is the same as that of the movable member 10 of the micro movable device X2.

The stationary portion 20A includes a frame 21' and electrodes 22, 23, 24 and 25. The stationary portion 20A is different from the stationary portion 20 of the micro movable device X2 in that the stationary portion 20A includes a frame 21' instead of the frame 21. As illustrated in FIGS. 45 and 46, the frame 21' surrounds the movable member 10C and includes arms 21D. As illustrated in FIG. 47, the frame 21' has a laminated structure made up of a first layer 21A made of the first silicon layer, a second layer 21B made of the second silicon layer, and an insulating layer 21C intervening between the first and the second layers 21A and 21B. The frame 21' is different from the frame 21 of the micro movable device X2 in that the frame 21' includes the arms 21D. The structure of other portions of the frame 21' is the same as that of the frame 21. The structure of other portions of the stationary portion 20A is the same as that of the stationary portion 20 of the micro movable device X2.

The connecting portions 31C-34C are made of the first silicon layer and connect the movable member 10C and the stationary portion 20A to each other. The connecting portion 31C is a connection bar extending perpendicularly to the spacing direction D2 of the electrodes 14 and 15. The connecting portion 31C is connected to one of the arms 11E of the movable member 10C and also connected to the first layer 21A of a corresponding arm 21D of the frame 21' of the stationary portion 20A. The point at which the connecting portion 31C and the arm 11E of the movable member 10C are connected to each other is referred to as a connection point P1. Similarly to the connecting portion 31 (connection bars 31a, 31b) of the micro movable device X2, the connecting portion 31C is smaller in thickness than the first layer 21A and the movable member 10C.

The connecting portion 32C is a connection bar extending perpendicularly to the spacing direction D1 of the electrodes 12 and 13. The connecting portion 32C is connected to one of the arms 11E of the movable member 10C and also connected to the first layer 21A of a corresponding arm 21D of the frame 21' of the stationary portion 20A. The point at which the connecting portion 32C and the arm 11E of the movable member 10C are connected to each other is referred to as a connection point P2. Similarly to the connecting portion 32 (connection bars 32a, 32b) of the micro movable device X2, the connecting portion 32C is smaller in thickness than the first layer 21A and the movable member 10C.

The connecting portion 33C is a connection bar extending perpendicularly to the spacing direction D2 of the electrodes 14 and 15. The connecting portion 33C is connected to one of the arms 11E of the movable member 10C and also connected to the first layer 21A of a corresponding arm 21D of the frame 21' of the stationary portion 20A. The point at which the connecting portion 33C and the arm 11E of the movable member 10C are connected to each other is referred to as a connection point P3. Similarly to the connecting portion 33 (connection bars 33a, 33b) of the micro movable device X2, the connecting portion 33C is smaller in thickness than the first layer 21A and the movable member 10C.

The connecting portion 34C is a connection bar extending perpendicularly to the spacing direction D1 of the electrodes 12 and 13. The connecting portion 34C is connected to one of the arms 11E of the movable member 10C and also connected to the first layer 21A of a corresponding arm 21D of the frame 21' of the stationary portion 20A. The point at which the connecting portion 34C and the arm 11E of the movable member 10C are connected to each other is referred to as a connection point P4. Similarly to the connecting portion 34 (connection bars 34a, 34b) of the micro movable device X2, the connecting portion 34C is smaller in thickness than the first layer 21A and the movable member 10C.

Figure 48:
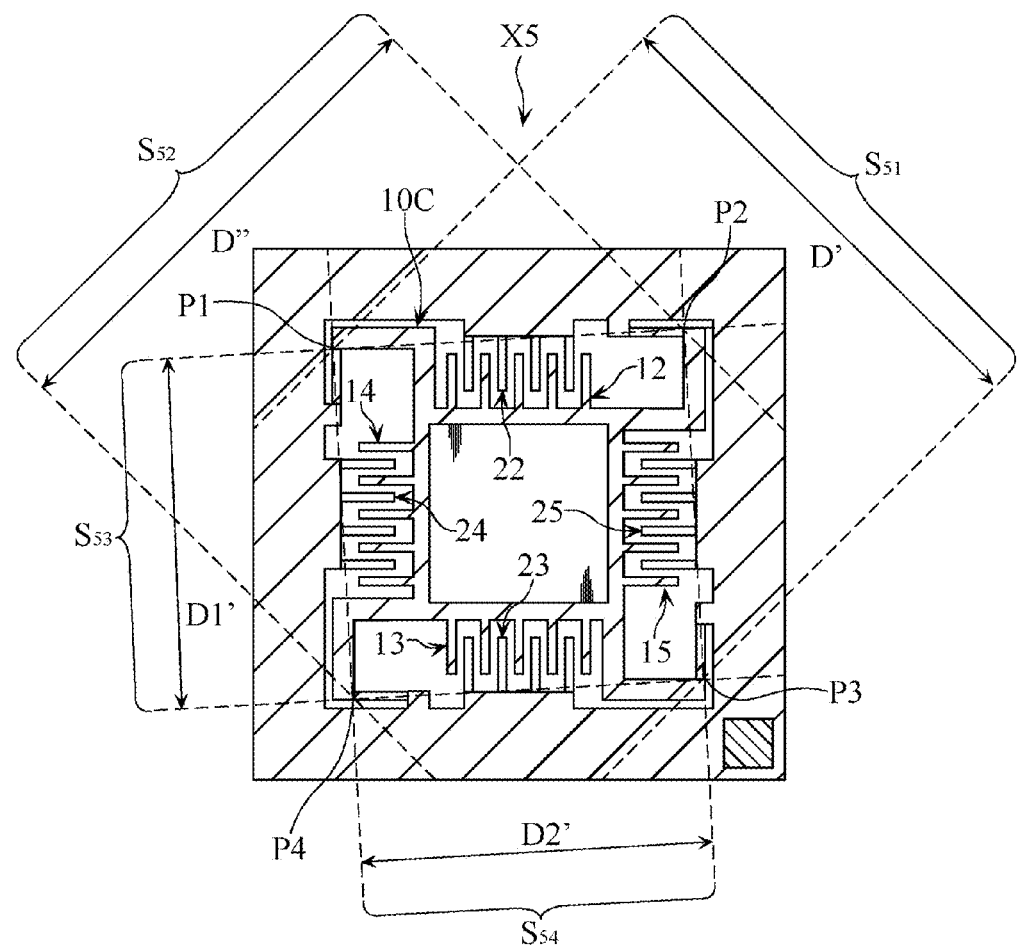
FIG. 48 is a plan view illustrating internal regions according to the fifth embodiment.

As illustrated in FIG. 48, in the micro movable device X5, the entirety of the electrodes 12-15 of the movable member 10C, which are utilized for generating an electrostatic attraction force with the electrodes 22-25, is positioned within the internal region $S_{51}$ extending between the connection points P1 and P3 in the spacing direction D' in which the connection points P1 and P3 are spaced from each other. The entirety of the electrodes 12-15 is also positioned within the internal region $S_{52}$ extending between the connection points P2 and P4 in the spacing direction D" in which the connection points P2 and P4 are spaced from each other. The entirety of the electrodes 12-15 is also positioned within the internal region $S_{53}$ extending between a set of connection points P1, P2 and a set of connection points P3, P4 in the spacing direction D1' in which the set of connection points P1, P2 and the set of connection points P3, P4 are spaced from each other. The entirety of the electrodes 12-15 is also positioned within the internal region $S_{54}$ extending between a set of connection points P1, P4 and a set of connection points P2, P3 in the spacing direction D2' in which the set of connection points P1, P4 and the set of connection points P2, P3 are spaced from each other.

In the micro movable device X5, the movable member 10C is translated in the thickness direction H indicated in FIG. 47 by applying a driving voltage across the electrodes 12 and 22, the electrodes 13 and 23, the electrodes 14 and 24 and the electrodes 15 and 25. The method for translating the movable member 10C is the same as the above-described method for translating the movable member 10 of the micro movable device X2. When light is to impinge on the mirror surface 11a on the land 11A of the movable member 10C at right angles for reflection, the reflection position of the light on the mirror surface 11a can be changed by translating the movable member 10C, so that the optical path length of the light can be changed.

As noted before, in the micro movable device X5, the entirety of the electrodes 12-15 of the movable member 10C, which are utilized for generating an electrostatic attraction force with the electrodes 22-25, is positioned within the internal region $S_{51}$ extending between the connection points P1 and P3 in the spacing direction D' of the connection points P1 and P3. Thus, in translating the movable member 10C from the position in the natural state or changing the amount of the translation, the electrostatic attraction force as the driving force acts on the movable member 10C, or the electrodes 12-15 within the internal region $S_{51}$. This is suitable for suppressing the rotation of the movable member 10C about the connection point P1 or P3 as the fulcrum in translating the movable member 10C or changing the amount of the translation.

As noted before, in the micro movable device X5, the entirety of the electrodes 12-15 of the movable member 10C, which are utilized for generating an electrostatic attraction force with the electrodes 22-25, is positioned within the internal region $S_{52}$ extending between the connection points P2 and P4 in the spacing direction D" of the connection points P2 and P4. Thus, in translating the movable member 10C from the position in the natural state or changing the amount of the translation, the electrostatic attraction force as the driving force acts on the movable member 10C, or the electrodes 12-15 within the internal region $S_{52}$. This is suitable for suppressing the rotation of the movable member 10C about the connection point P2 or P4 as the fulcrum in translating the movable member 10C or changing the amount of the translation.

As noted before, in the micro movable device X5, the entirety of the electrodes 12-15 of the movable member 10C is positioned within the internal region $S_{53}$ extending between the set of connection points P1, P2 and the set of connection points P3, P4 in the spacing direction D1' of the set of connection points P1, P2 and the set of connection points P3, P4. Thus, in translating the movable member 10C from the position in the natural state or changing the amount of the translation, the electrostatic attraction force as the driving force acts on the movable member 10C, or the electrodes 12-15 within the internal region $S_{53}$. This is suitable for suppressing the rotation of the movable member 10C about the set of connection points P1, P2 or the set of connection points P3, P4 as the fulcrum in translating the movable member 10C or changing the amount of the translation.

As noted before, in the micro movable device X5, the entirety of the electrodes 12-15 of the movable member 10C is positioned within the internal region $S_{54}$ extending between the set of connection points P1, P4 and the set of connection points P2, P3 in the spacing direction D2' of the set of connection points P1, P4 and the set of connection points P2, P3. Thus, in translating the movable member 10C from the position in the natural state or changing the amount of the translation, the electrostatic attraction force as the driving force acts on the movable member 10C, or the electrodes 12-15 within the internal region $S_{54}$. This is suitable for suppressing the rotation of the movable member 10C about the set of connection points P1, P4 or the set of connection points P2, P3 as the fulcrum in translating the movable member 10C or changing the amount of the translation.

In the micro movable device X5, the connecting portions 31C-34C are connected respectively to the arms 11E extending from the land 11A of the movable member 10C. This arrangement is suitable for positioning the electrodes 12-15 extending from the land 11A in the internal region $S_{51}$, $S_{52}$ $S_{53}$ or $S_{54}$.

As noted before, in the micro movable device X5, the connecting portions 31C and 33C extend perpendicularly to the spacing direction D2 of the electrodes 14 and 15. With this arrangement, the displacement of the movable member 10C in a direction perpendicular to the spacing direction D2 is suppressed. Further, the connecting portions 32C and 34C extend perpendicularly to the spacing direction D1 of the electrodes 12 and 13. With this arrangement, the displacement of the movable member 10C in a direction perpendicular to the spacing direction D1 is suppressed.

In the micro movable device X5, the connecting portion 31C connecting the movable member 10C and the stationary portion 20A extends from the connection point P1 so as not to be away from the land 11A, which is the main part of the movable member 10C. Similarly, the connecting portions 32C, 33C and 34C extend from the connection points P2, P3 and P4, respectively, so as not to be away from the land 11A. The micro movable device X5 having this structure is suitable for the size reduction of the frame 21' and hence the size reduction of the entire device.

Figure 49:
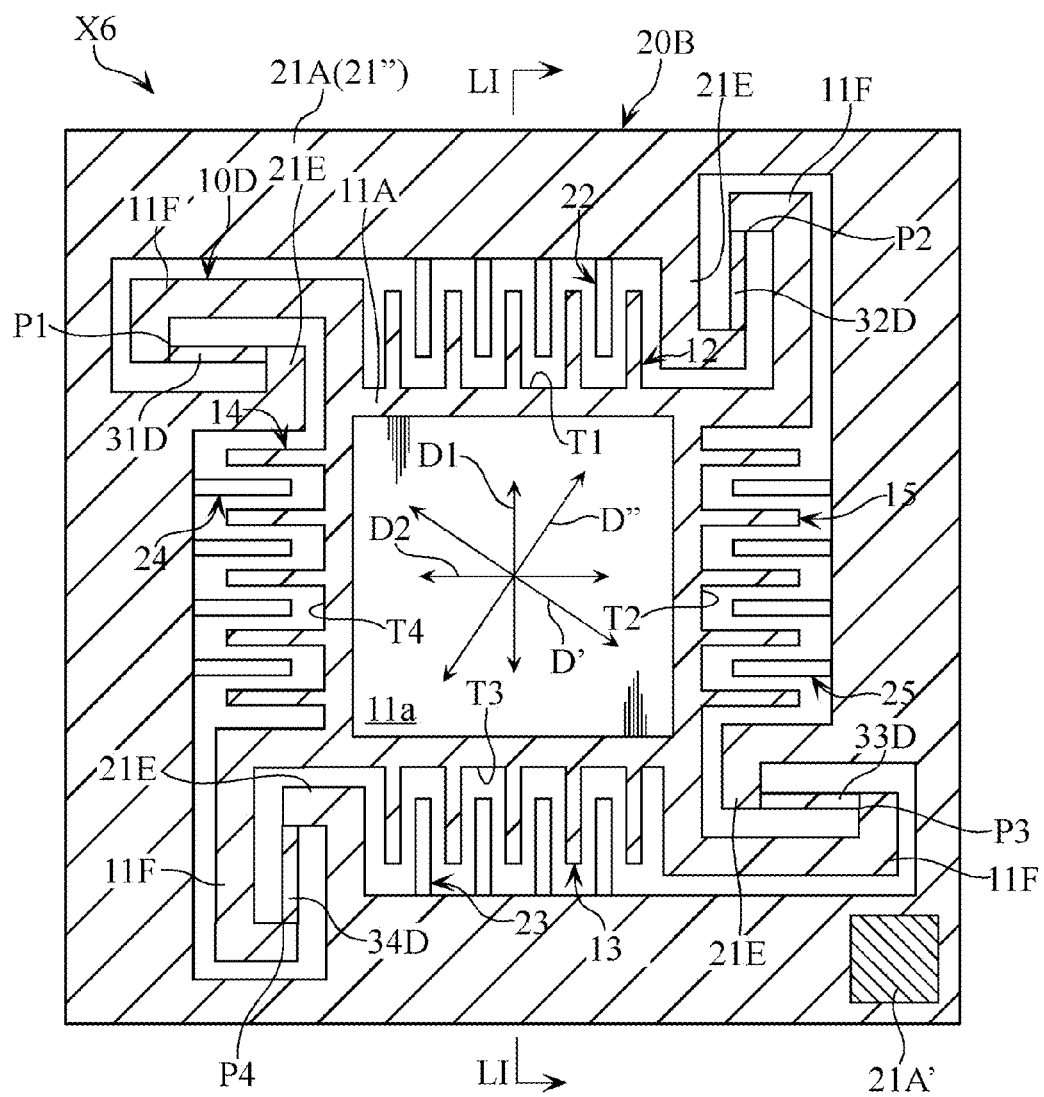
FIG. 49 is a plan view illustrating a micro movable device according to a sixth embodiment.
Figure 50:
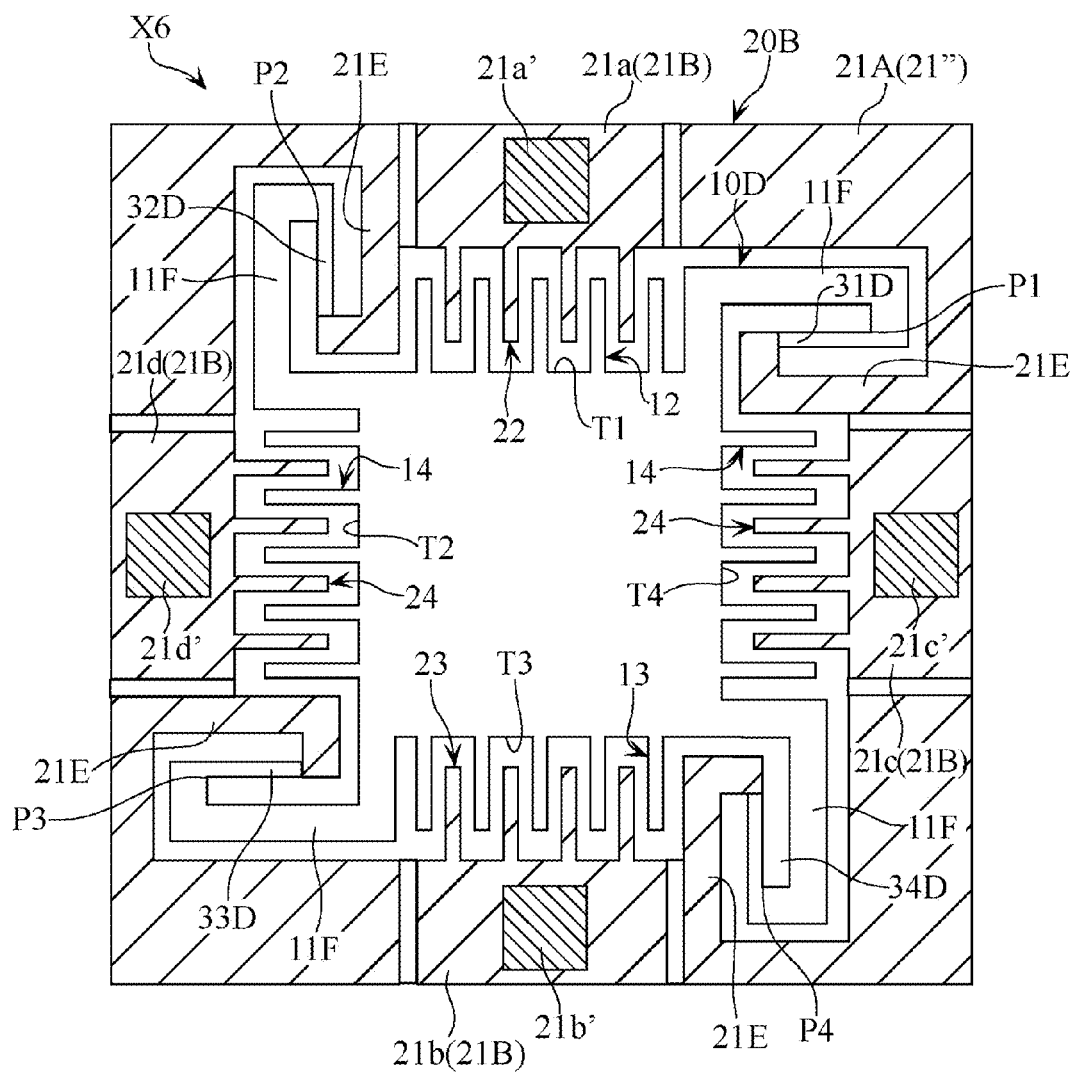
FIG. 50 is another plan view of the micro movable device illustrated in FIG. 49.
Figure 51:
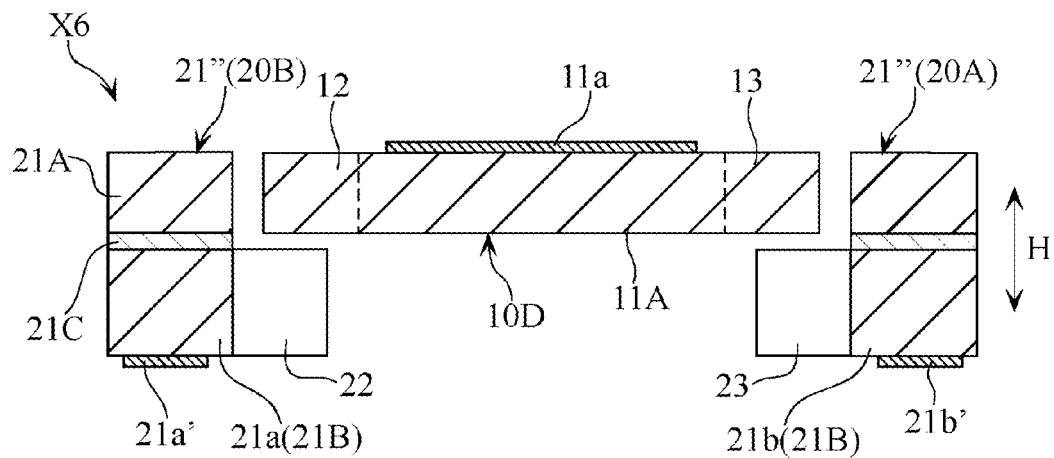
FIG. 51 is a sectional view taken along lines LI-LI in FIG. 49.

FIGS. 49-51 illustrate a micro movable device X6 according to a sixth embodiment. FIG. 49 is a plan view of the micro movable device X6. FIG. 50 is another plan view of the micro movable device X6. FIG. 51 is a sectional view taken along lines LI-LI in FIG. 49.

The micro movable device X6 is a micro mirror device including a movable member 10D, a stationary portion 20B and connecting portions 31D, 32D, 33D and 34D. Similarly to the micro mirror device X2, the micro movable device X6 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X6 are mainly made of the first silicon layer and/or the second silicon layer. FIG. 49 illustrates the first silicon layer side, whereas FIG. 50 illustrates the second silicon layer side. For a better understanding, the portions made of the first silicon layer are indicated by hatching in FIG. 49, whereas the portions made of the second silicon layer are indicated by hatching in FIG. 50.

The movable member 10D is made of the first silicon layer. The movable member 10D includes a land 11A, four arms 11F and electrodes 12, 13, 14 and 15. The movable member 10D differs from the movable member 10 of the micro movable device X2 in that the movable member 10D includes arms 11F having a bent shape instead of the arms 11B. Specifically, one of the arms 11F includes a first portion extending from the edge T1 of the land 11A at a position adjacent to the edge T4, a second portion extending perpendicularly to the first portion, and a third portion extending in parallel to the first portion. Another one of the arms 11F includes a first portion extending from the edge T2 of the land 11A at a position adjacent to the edge T1, a second portion extending perpendicularly to the first portion, and a third portion extending in parallel to the first portion. Another one of the arms 11F includes a first portion extending from the edge T3 of the land 11A at a position adjacent to the edge T2, a second portion extending perpendicularly to the first portion, and a third portion extending in parallel to the first portion. Another one of the arms 11E includes a first portion extending from the edge T4 of the land 11A at a position adjacent to the edge T3, a second portion extending perpendicularly to the first portion, and a third portion extending in parallel to the first portion. The structure of other parts of the movable member 10D is the same as that of the movable member 10 of the micro movable device X2.

The stationary portion 20B includes a frame 21" and electrodes 22, 23, 24 and 25. The stationary portion 20B is different from the stationary portion 20 of the micro movable device X2 in that the stationary portion 20B includes a frame 21" instead of the frame 21. As illustrated in FIGS. 49 and 50, the frame 21" surrounds the movable member 10D and includes arms 21E. As illustrated in FIG. 51, the frame 21" has a laminated structure made up of a first layer 21A made of the first silicon layer, a second layer 21B made of the second silicon layer, and an insulating layer 21C intervening between the first and the second layers 21A and 21B. The frame 21" is different from the frame 21 of the micro movable device X2 in that the frame 21" includes the arms 21E. The structure of other portions of the frame 21" is the same as that of the frame 21. The structure of other portions of the stationary portion 20B is the same as that of the stationary portion 20 of the micro movable device X2.

The connecting portions 31D-34D are made of the first silicon layer and connect the movable member 10D and the stationary portion 20B to each other. The connecting portion 31D is a connection bar extending perpendicularly to the spacing direction D1 of the electrodes 12 and 13. The connecting portion 31D is connected to one of the arms 11F of the movable member 10D and also connected to the first layer 21A of a corresponding arm 21E of the frame 21" of the stationary portion 20B. The point at which the connecting portion 31D and the arm 11F of the movable member 10D are connected to each other is referred to as a connection point P1. Similarly to the connecting portion 31 (connection bars 31a, 31b) of the micro movable device X2, the connecting portion 31D is smaller in thickness than the first layer 21A and the movable member 10D.

The connecting portion 32D is a connection bar extending perpendicularly to the spacing direction D2 of the electrodes 14 and 15. The connecting portion 32D is connected to one of the arms 11F of the movable member 10D and also connected to the first layer 21A of a corresponding arm 21E of the frame 21" of the stationary portion 20B. The point at which the connecting portion 32D and the arm 11F of the movable member 10D are connected to each other is referred to as a connection point P2. Similarly to the connecting portion 32 (connection bars 32a, 32b) of the micro movable device X2, the connecting portion 32D is smaller in thickness than the first layer 21A and the movable member 10D.

The connecting portion 33D is a connection bar extending perpendicularly to the spacing direction D1 of the electrodes 12 and 13. The connecting portion 33D is connected to one of the arms 11F of the movable member 10D and also connected to the first layer 21A of a corresponding arm 21E of the frame 21" of the stationary portion 20B. The point at which the connecting portion 33D and the arm 11F of the movable member 10D are connected to each other is referred to as a connection point P3. Similarly to the connecting portion 33 (connection bars 33a, 33b) of the micro movable device X2, the connecting portion 33D is smaller in thickness than the first layer 21A and the movable member 10D.

The connecting portion 34D is a connection bar extending perpendicularly to the spacing direction D2 of the electrodes 14 and 15. The connecting portion 34D is connected to one of the arms 11F of the movable member 10D and also connected to the first layer 21A of a corresponding arm 21E of the frame 21" of the stationary portion 20B. The point at which the connecting portion 34D and the arm 11F of the movable member 10D are connected to each other is referred to as a connection point P4. Similarly to the connecting portion 34 (connection bars 34a, 34b) of the micro movable device X2, the connecting portion 34D is smaller in thickness than the first layer 21A and the movable member 10D.

Figure 52:
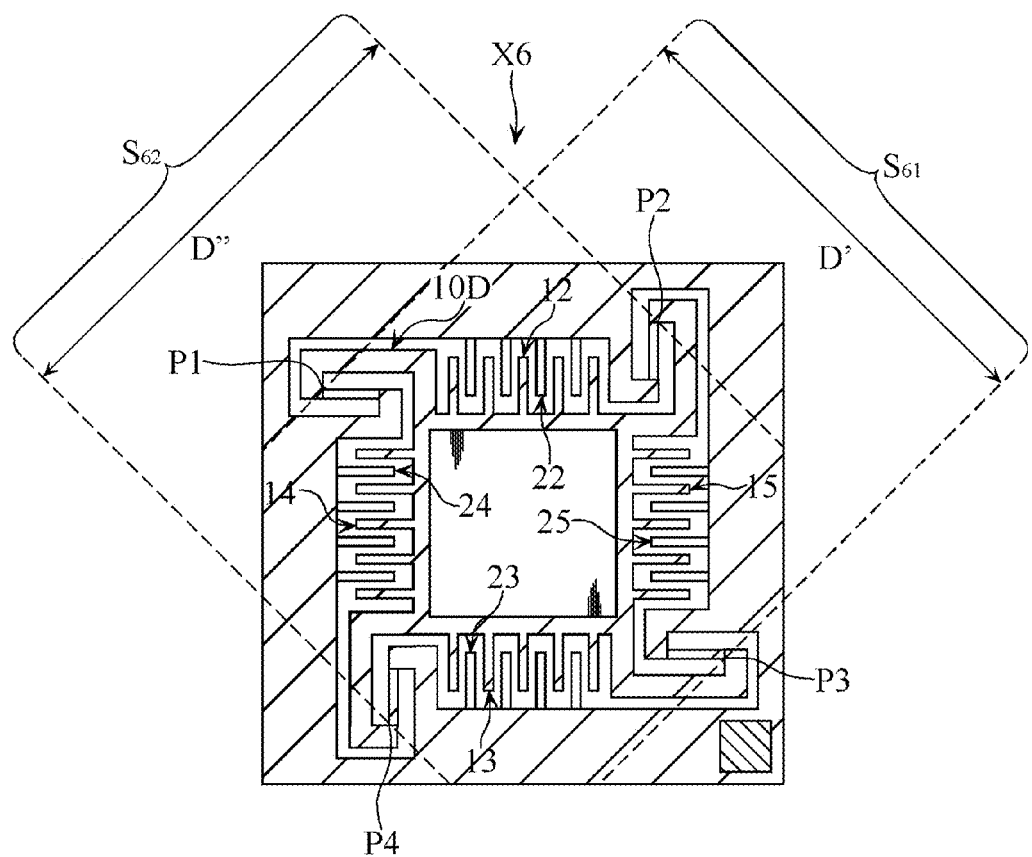
FIG. 52 is a plan view illustrating internal regions according to the sixth embodiment.

As illustrated in FIG. 52, in the micro movable device X6, the entirety of the electrodes 12-15 of the movable member 10D, which are utilized for generating an electrostatic attraction force with the electrodes 22-25, is positioned within the internal region $S_{61}$ extending between the connection points P1 and P3 in the spacing direction D' in which the connection points P1 and P3 are spaced from each other. The entirety of the electrodes 12-15 is also positioned within the internal region $S_{62}$ extending between the connection points P2 and P4 in the spacing direction D" in which the connection points P2 and P4 are spaced from each other.

In the micro movable device X6, the movable member 10D is translated in the thickness direction H indicated in FIG. 51 by applying a driving voltage across the electrodes 12 and 22, the electrodes 13 and 23, the electrodes 14 and 24 and the electrodes 15 and 25. The method for translating the movable member 10D is the same as the above-described method for translating the movable member 10 of the micro movable device X2. When light is to impinge on the mirror surface 11a on the land 11A of the movable member 10D at right angles for reflection, the reflection position of the light on the mirror surface 11a can be changed by translating the movable member 10D, so that the optical path length of the light can be changed.

As noted before, in the micro movable device X6, the entirety of the electrodes 12-15 of the movable member 10D, which are utilized for generating an electrostatic attraction force with the electrodes 22-25, is positioned within the internal region $S_{61}$ extending between the connection points P1 and P3 in the spacing direction D' of the connection points P1 and P3. Thus, in translating the movable member 10D from the position in the natural state or changing the amount of the translation, the electrostatic attraction force as the driving force acts on the movable member 10D, or the electrodes 12-15 within the internal region $S_{61}$. This is suitable for suppressing the rotation of the movable member 10D about the connection point P1 or P3 as the fulcrum in translating the movable member 10D or changing the amount of the translation.

As noted before, in the micro movable device X6, the entirety of the electrodes 12-15 of the movable member 10D, which are utilized for generating an electrostatic attraction force with the electrodes 22-25, is positioned within the internal region $S_{62}$ extending between the connection points P2 and P4 in the spacing direction D" of the connection points P2 and P4. Thus, in translating the movable member 10D from the position in the natural state or changing the amount of the translation, the electrostatic attraction force as the driving force acts on the movable member 10D, or the electrodes 12-15 within the internal region $S_{62}$. This is suitable for suppressing the rotation of the movable member 10D about the connection point P2 or P4 as the fulcrum in translating the movable member 10D or changing the amount of the translation.

In the micro movable device X6, the connecting portions 31D-34D are connected respectively to the arms 11F extending from the land 11A of the movable member 10D. This arrangement is suitable for positioning the electrodes 12-15 extending from the land 11A in the internal region $S_{61}$ or $S_{62}$.

As noted before, in the micro movable device X6, the connecting portions 31D and 33D extend perpendicularly to the spacing direction D1 of the electrodes 12 and 13. With this arrangement, the displacement of the movable member 10D in a direction perpendicular to the spacing direction D1 is suppressed. Further, the connecting portions 32D and 34D extend perpendicularly to the spacing direction D2 of the electrodes 14 and 15. With this arrangement, the displacement of the movable member 10D in a direction perpendicular to the spacing direction D2 is suppressed.

In the micro movable device X6, the connecting portion 31D connecting the movable member 10D and the stationary portion 20B extends from the connection point P1 so as not to be away from the land 11A, which is the main part of the movable member 10D. Similarly, the connecting portions 32D, 33D and 34D extend from the connection points P2, P3 and P4, respectively, so as not to be away from the land 11A. The micro movable device X6 having this structure is suitable for the size reduction of the frame 21" and hence the size reduction of the entire device.

Figure 53:
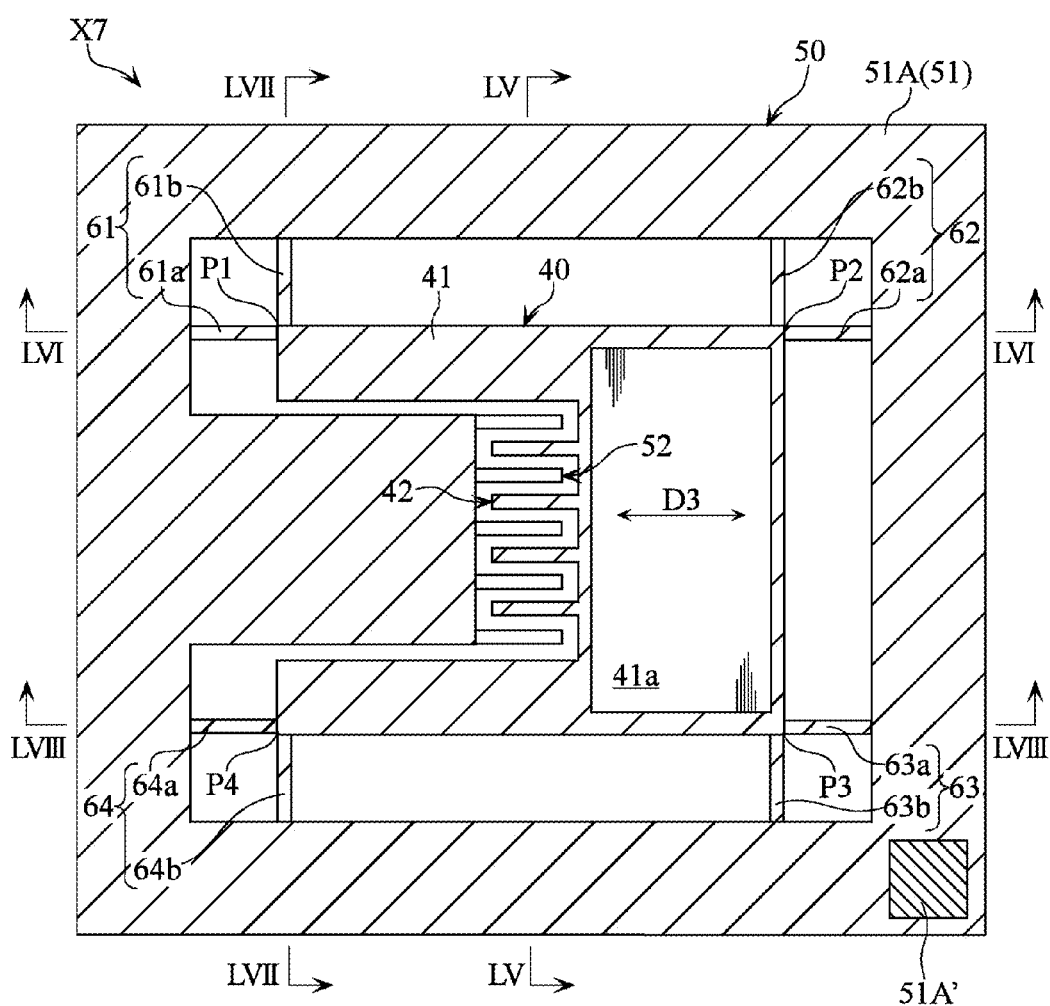
FIG. 53 is a plan view illustrating a micro movable device according to a seventh embodiment.
Figure 54:
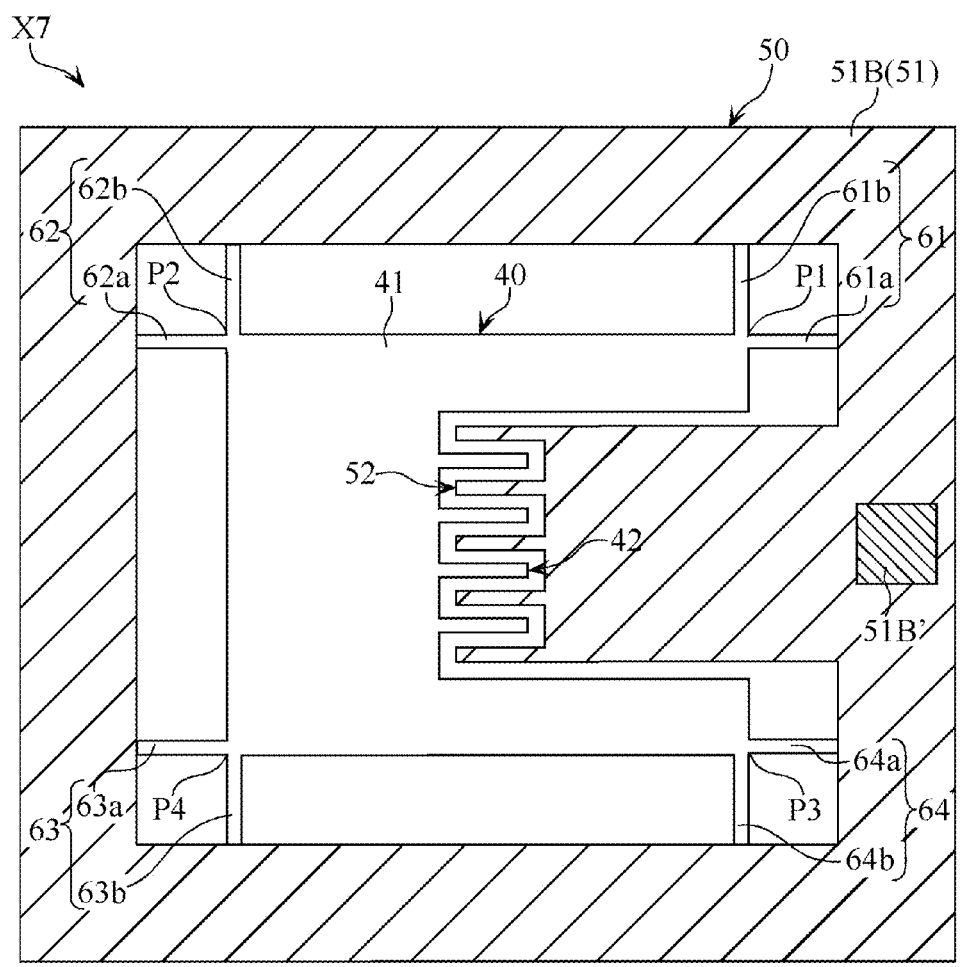
FIG. 54 is another plan view of the micro movable device illustrated in FIG. 53.

FIGS. 53-58 illustrate a micro movable device X7 according to a seventh embodiment. FIG. 53 is a plan view of the micro movable device X7. FIG. 54 is another plan view of the micro movable device X7. FIGS. 55-58 are sectional views taken along lines LV-LV in FIG. 53, lines LVI-LVI in FIG. 53, lines LVII-LVII in FIG. 53 and lines LVIII-LVIII in FIG. 53.

The micro movable device X7 is a micro mirror device including a movable member 40, a stationary portion 50 and connecting portions 61, 62, 63 and 64. The micro movable device X7 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X7 are mainly made of the first silicon layer and/or the second silicon layer. FIG. 53 illustrates the first silicon layer side, whereas FIG. 54 illustrates the second silicon layer side. For a better understanding, the portions made of the first silicon layer are indicated by hatching in FIG. 53, whereas the portions made of the second silicon layer are indicated by hatching in FIG. 54.

The movable member 40 is mainly made of the first silicon layer. The movable member 40 includes a land 41 and an electrode 42. On the land 41, a mirror surface 41a having a light reflecting function is provided. The electrode 42 has a comb-tooth electrode structure including a set of electrode teeth projecting from the land 41.

The stationary portion 50 includes a frame 51 and an electrode 52. As illustrated in FIGS. 53 and 54, the frame 51 surrounds the movable member 40. As illustrated in FIGS. 55-58, the frame 51 has a laminated structure made up of a first layer 51A made of the first silicon layer, a second layer 51B made of the second silicon layer, and an insulating layer 51C intervening between the first and the second layers 51A and 51B. The first layer 51A and the second layer 51B are electrically separated. As illustrated in FIG. 53, an electrode pad 51A' is provided on the first layer 51A. As illustrated in FIG. 54, an electrode pads 51B' is provided on the second layer 51B.

Figure 55:
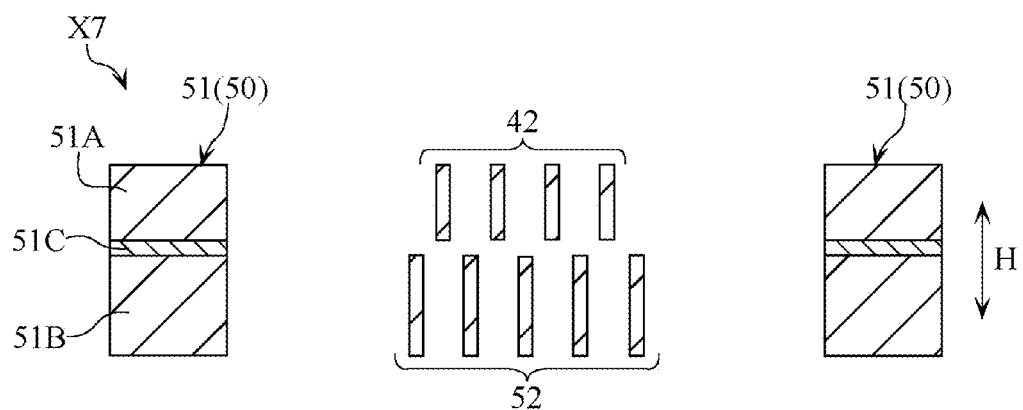
FIG. 55 is a sectional view taken along lines LV-LV in FIG. 53.

The electrode 52 is made of the second silicon layer. The electrode 52 has a comb-tooth electrode structure including a set of electrode teeth projecting from the second layer 51B of the frame 51 toward the movable member 40. The electrode 52 is arranged to face the electrode 42 as illustrated in FIG. 55 and cooperates with the electrode 42 to generate an electrostatic attraction force.

Figure 56:
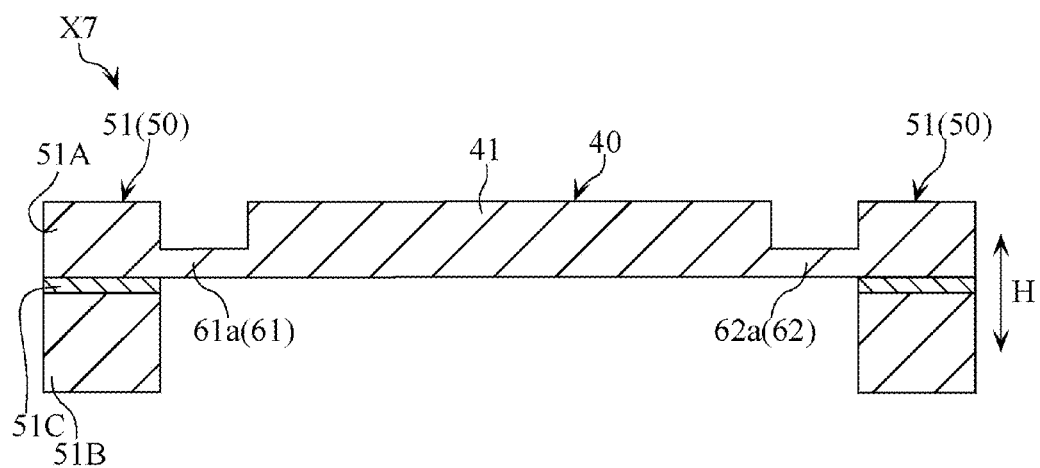
FIG. 56 is a sectional view taken along lines LVI-LVI in FIG. 53.
Figure 57:
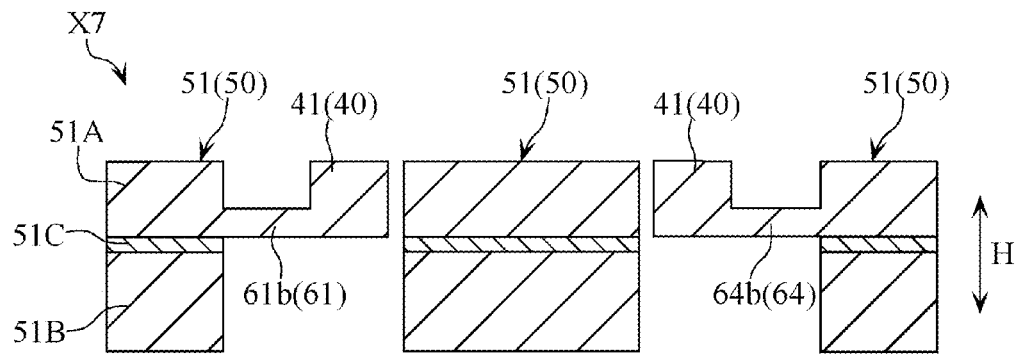
FIG. 57 is a sectional view taken along lines LVII-LVII in FIG. 53.

The connecting portions 61-64 are made of the first silicon layer and connect the movable member 40 and the stationary portion 50 to each other. The connecting portion is made up of a connection bar 61a extending in the extending direction D3 in which the electrode teeth of the electrodes 42 and 52 extend, and a connection bar 61b extending perpendicularly to the extending direction D3. The connecting portion 61, i.e., the connection bars 61a and 61b are connected to one of the corners of the land 41 of the movable member 40 and also connected to the first layer 51A of the frame 51 of the stationary portion 50. The point at which the connecting portion 61 and the land 41 of the movable member 40 are connected to each other is referred to as a connection point P1. As illustrated in FIGS. 56 and 57, the connecting portion 61 (connection bars 61a and 61b) is smaller in thickness than the movable member 40 and the first layer 51A of the frame 51.

The connecting portion 62 is made up of a connection bar 62a extending in the extending direction D3 of the electrode teeth of the electrodes 42 and 52, and a connection bar 62b extending perpendicularly to the extending direction D3. The connecting portion 62, i.e., the connection bars 62a and 62b are connected to one of the corners of the land 41 of the movable member 40 and also connected to the first layer 51A of the frame 51 of the stationary portion 50. The point at which the connecting portion 62 and the land 41 of the movable member 40 are connected to each other is referred to as a connection point P2. As illustrated in FIG. 56 with respect to the connection bar 62a, the connecting portion 62 (connection bars 62a and 62b) is smaller in thickness than the movable member 40 and the first layer 51A of the frame 51.

Figure 58:
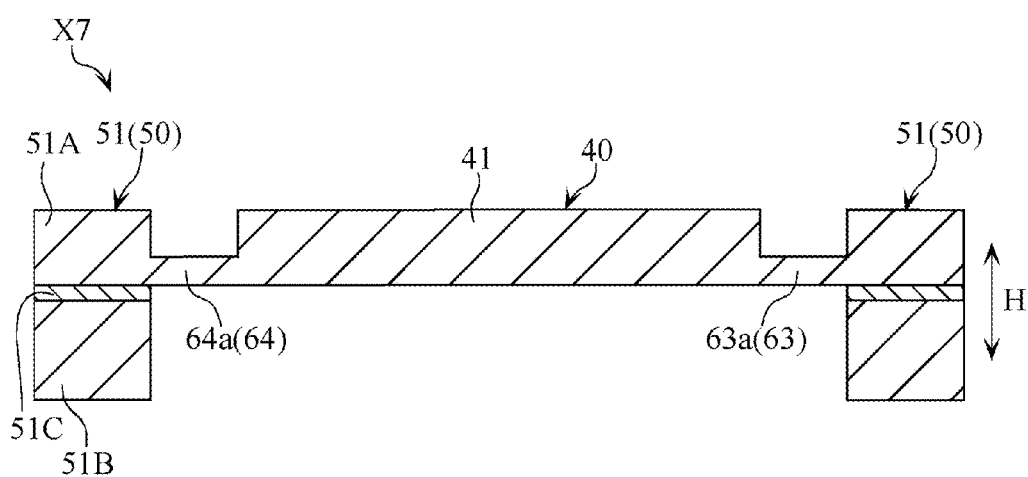
FIG. 58 is a sectional view taken along lines LVIII-LVIII in FIG. 53.

The connecting portion 63 is made up of a connection bar 63a extending in the extending direction D3 of the electrode teeth of the electrodes 42 and 52, and a connection bar 63b extending perpendicularly to the extending direction D3. The connecting portion 63, i.e., the connection bars 63a and 63b are connected to one of the corners of the land 41 of the movable member 40 and also connected to the first layer 51A of the frame 51 of the stationary portion 50. The point at which the connecting portion 63 and the land 41 of the movable member 40 are connected to each other is referred to as a connection point P3. As illustrated in FIG. 58 with respect to the connection bar 63a, the connecting portion 63 (connection bars 63a and 63b) is smaller in thickness than the movable member 40 and the first layer 51A of the frame 51.

The connecting portion 64 is made up of a connection bar 64a extending in the extending direction D3 of the electrode teeth of the electrodes 42 and 52, and a connection bar 64b extending perpendicularly to the extending direction D3. The connecting portion 64, i.e., the connection bars 64a and 64b are connected to one of the corners of the land 41 of the movable member 40 and also connected to the first layer 51A of the frame 51 of the stationary portion 50. The point at which the connecting portion 64 and the land 41 of the movable member 40 are connected to each other is referred to as a connection point P4. As illustrated in FIGS. 57 and 58, the connecting portion 64 (connection bars 64a and 64b) is smaller in thickness than the movable member 40 and the first layer 51A of the frame 51.

Figure 59:
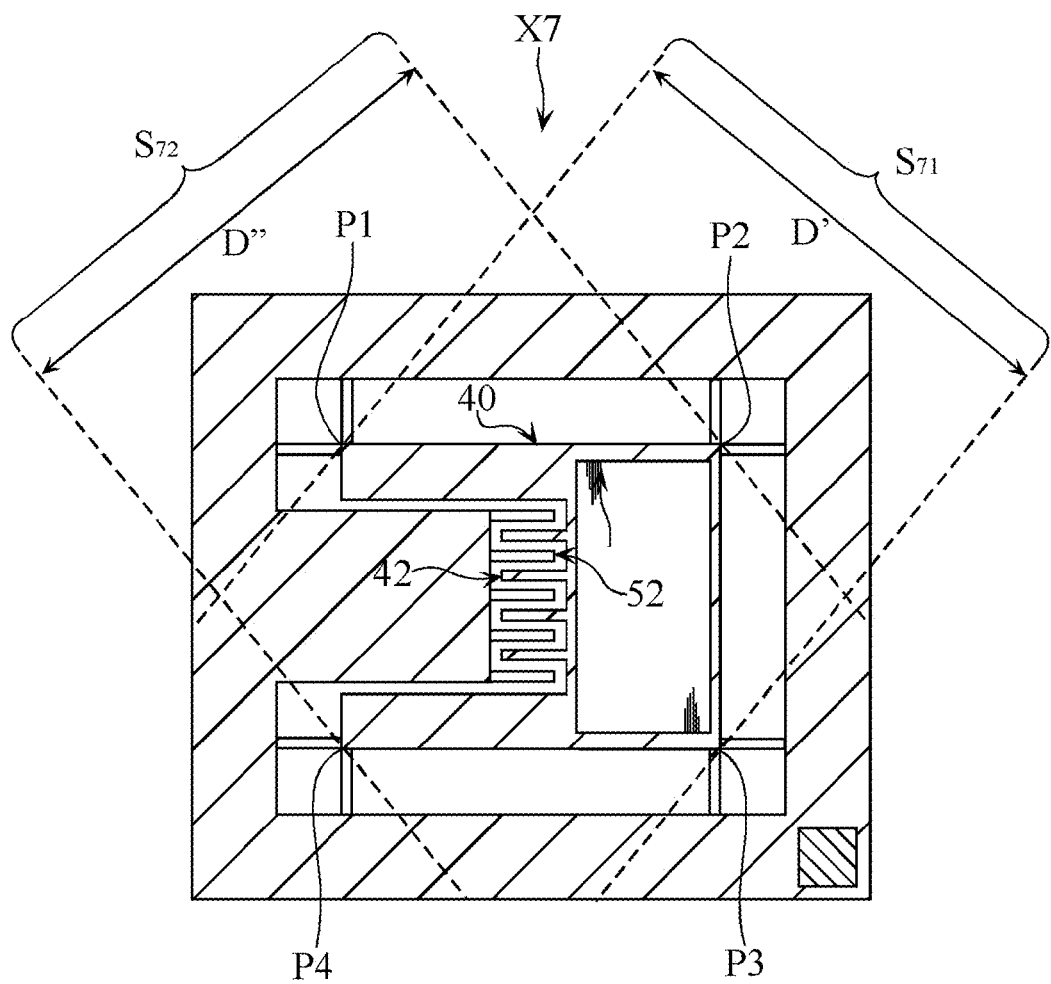
FIG. 59 is a plan view illustrating internal regions according to the seventh embodiment.

As illustrated in FIG. 59, in the micro movable device X7, the entirety of the electrode 42 of the movable member 10, which is utilized for generating an electrostatic attraction force with the electrode 52, is positioned within the internal region $S_{71}$ extending between the connection points P1 and P3 in the spacing direction D' in which the connection points P1 and P3 are spaced from each other. The entirety of the electrode 42 is also positioned within the internal region $S_{72}$ extending between the connection points P2 and P4 in the spacing direction D" in which the connection points P2 and P4 are spaced from each other.

In the micro movable device X7, the movable member 40 is translated in the thickness direction H indicated in FIG. 55 by applying a driving voltage across the electrodes 42 and 52. The potential application to the electrode 42 by the voltage application is achieved via the electrode pad 51A' on the first layer 51A of the frame 51 of the stationary portion 50, the first layer 51A, the connecting portions 61-64, and the land 41 of the movable member 40. To the electrode 42, e.g. a ground potential is applied. The potential application to the electrode 52 by the voltage application is achieved via the electrode pad 51B' on the second layer 51B of the frame 51 of the stationary portion 50 and the second layer 51B.

When no voltage is applied across the electrodes 42 and 52, the movable member 40, which is connected to the stationary portion 50 via the connecting portions 61-64, is at a position in the natural state as illustrated in FIG. 56. When a potential difference is generated by the application of a driving voltage across the electrodes 42 and 52, an electrostatic attraction force is generated between the electrodes 42 and 52. The electrostatic attraction force generated in this way acts on the electrode 42 as a driving force, so that the electrode 42 of the movable member 40 is attracted to the electrode 52 of the stationary portion 50. In this process, tension is applied to the connection bars 61a, 61b, 62a, 62b, 63a, 63b, 64a and 64b of the connecting portions 61-64, so that the connection bars are elastically deformed. Due to the attraction of the electrode 42 to the electrode 52, the movable member 40 is translated in the thickness direction H. The amount of translation depends on the magnitude of the driving force applied to the electrode 42 of the movable member 40. The amount of translation of the movable member 40 from the position in the natural state can be changed by controlling the voltage to be applied to the electrodes 42 and 52 and thereby adjusting the driving force.

When the electrostatic attraction force is eliminated, the connection bars 61a, 61b, 62a, 62b, 63a, 63b, 64a and 64b recover the original shape, and the movable member 40 returns to the initial position (position in the natural state).

When light is to impinge on the mirror surface 41a on the land 41 at right angles for reflection, the reflection position of the light on the mirror surface can be changed by translating the movable member 40 in the above-described manner, so that the optical path length of the light can be changed.

As noted before, in the micro movable device X7, the entirety of the electrode 42 of the movable member 40, which is utilized for generating an electrostatic attraction force with the electrode 52, is positioned within the internal region $S_{71}$ extending between the connection points P1 and P3 in the spacing direction D' of the connection points P1 and P3. Thus, in translating the movable member 40 from the position in the natural state or changing the amount of the translation, the electrostatic attraction force as the driving force acts on the movable member 40, or the electrode 42 within the internal region $S_{71}$. This is suitable for suppressing the rotation of the movable member in translating the movable member 40 or changing the amount of the translation.

As noted before, in the micro movable device X7, the entirety of the electrode 42 of the movable member 40 is positioned within the internal region $S_{72}$ extending between the connection points P2 and P4 in the spacing direction D" of the connection points P2 and P4. Thus, in translating the movable member 40 from the position in the natural state or changing the amount of the translation, the electrostatic attraction force as the driving force acts on the movable member 40, or the electrode 42 within the internal region $S_{72}$. This is suitable for suppressing the rotation of the movable member 40 in translating the movable member 40 or changing the amount of the translation.

As noted before, in the micro movable device X7, the connection bars 61a, 62a, 63a and 64a of the connecting portions 61-64 extend in the extending direction D3 of the electrode teeth of the electrodes 42 and 52. With this arrangement, the displacement of the movable member 40 in the extending direction D3 is suppressed. Further, the connection bars 61b, 62b, 63b and 64b of the connecting portions 61-64 extend perpendicularly to the extending direction D3. With this arrangement, the displacement of the movable member 40 in a direction perpendicular to the extending direction D3 is suppressed.

Figure 60:
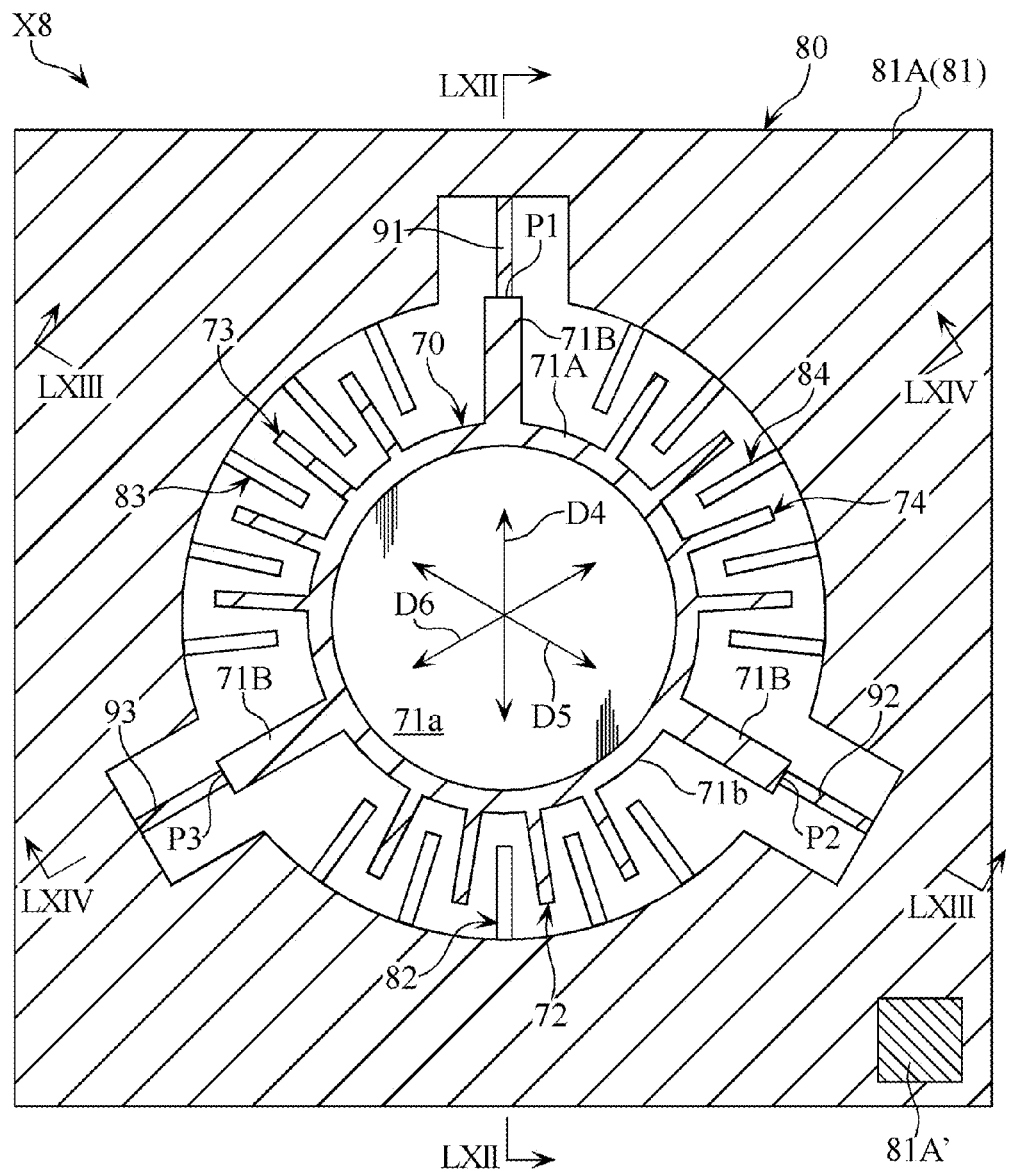
FIG. 60 is a plan view illustrating a micro movable device according to an eighth embodiment.
Figure 61:
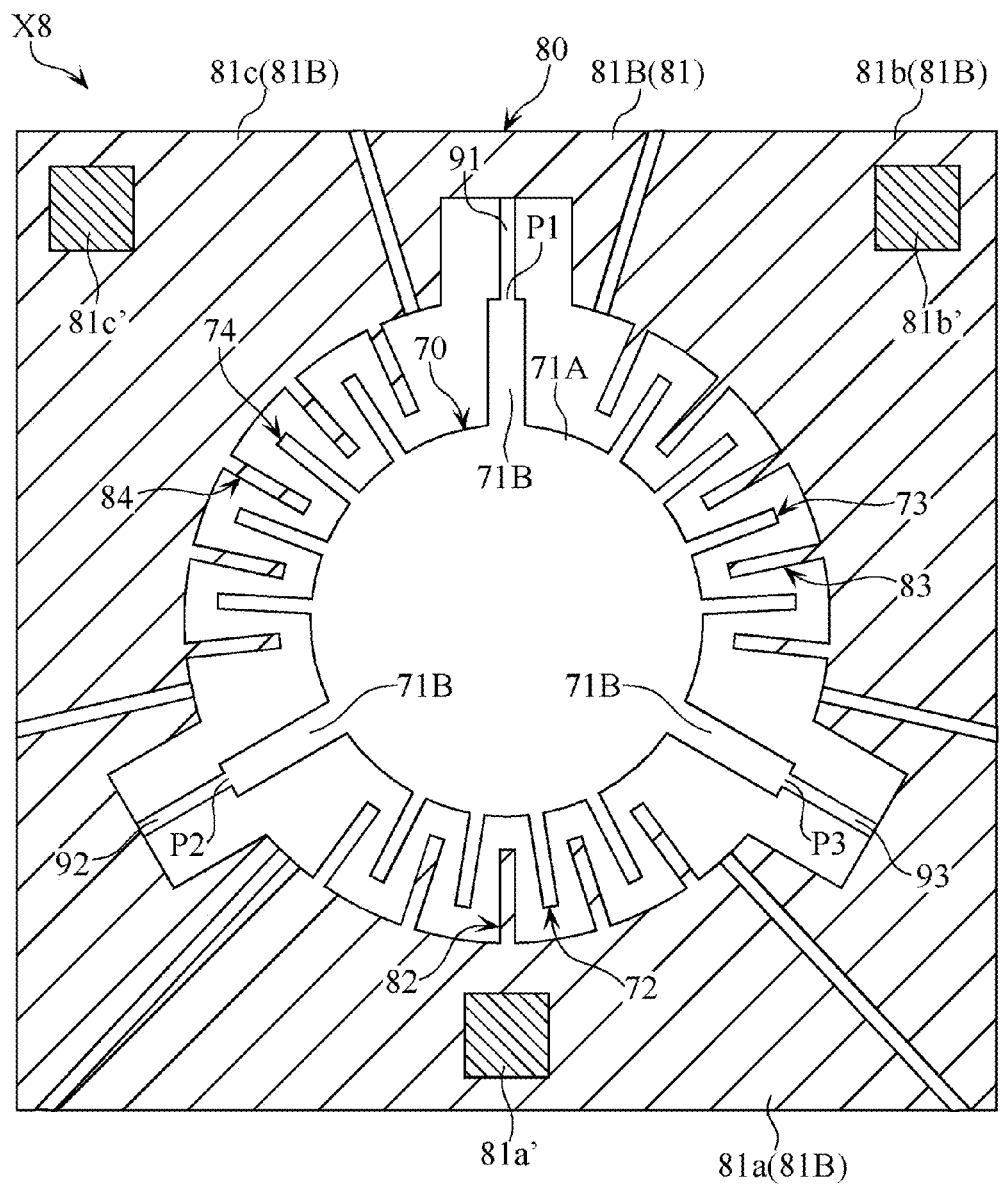
FIG. 61 is another plan view of the micro movable device illustrated in FIG. 60.
Figure 62:
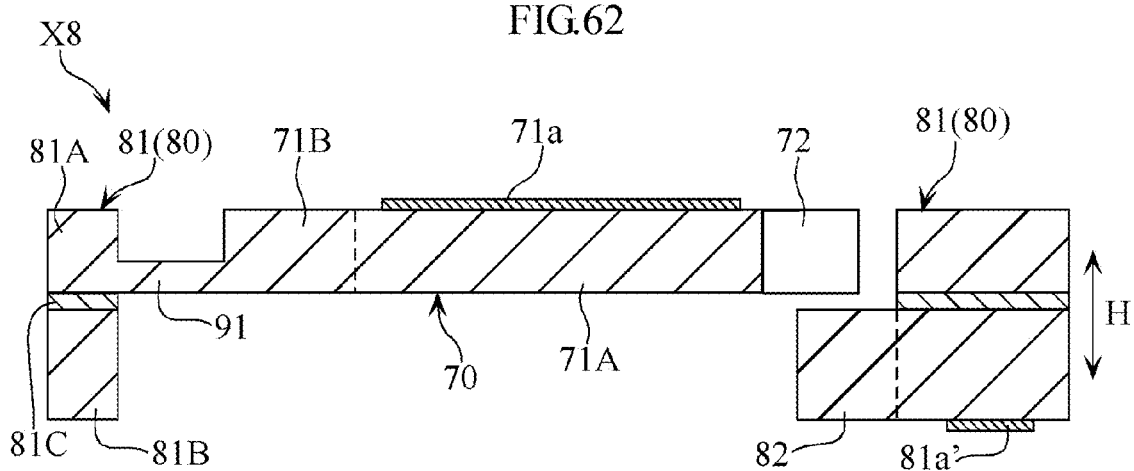
FIG. 62 is a sectional view taken along lines LXII-LXII in FIG. 60.
Figure 63:
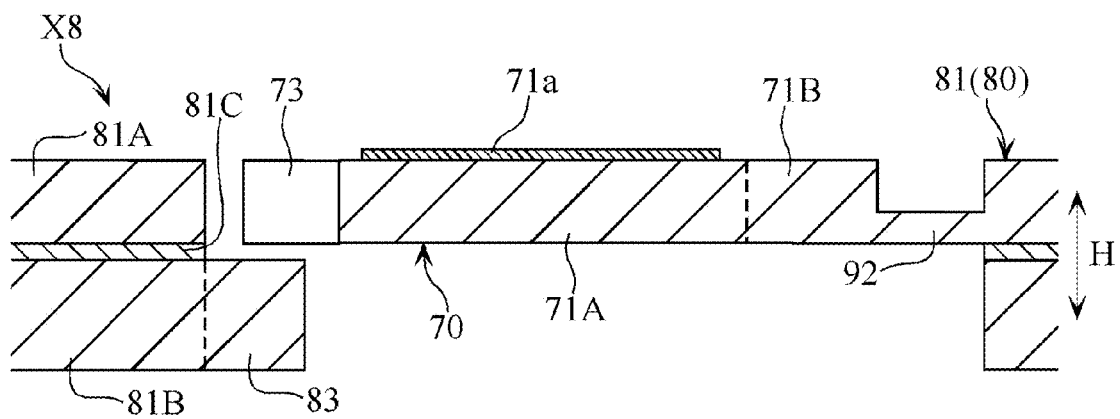
FIG. 63 is a sectional view taken along lines LXIII-LXIII in FIG. 60.
Figure 64:
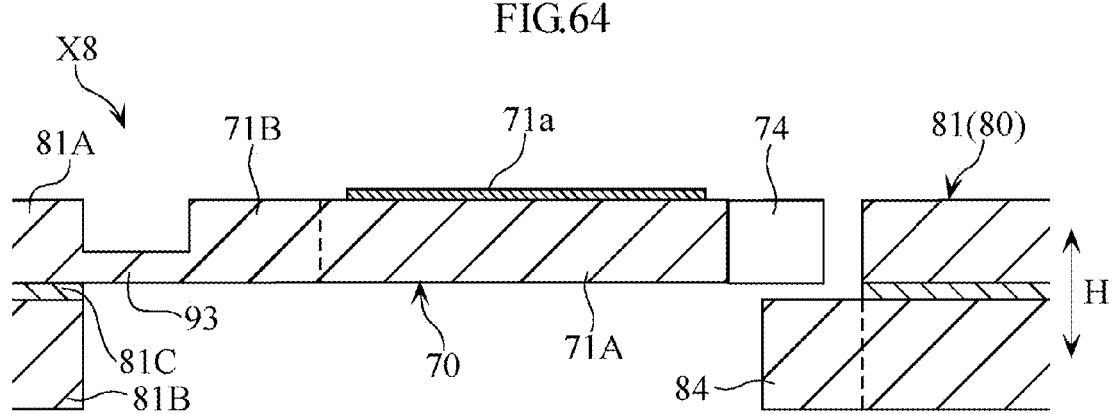
FIG. 64 is a sectional view taken along lines LXIV-LXIV in FIG. 60.

FIGS. 60-64 illustrate a micro movable device X8 according to an eighth embodiment. FIG. 60 is a plan view of the micro movable device X8. FIG. 61 is another plan view of the micro movable device X8. FIGS. 62-64 are sectional views taken along lines LXII-LXII in FIG. 60, lines LXIII-LXIII in FIG. 60 and lines LXIV-LXIV in FIG. 60, respectively.

The micro movable device X8 is a micro mirror device including a movable member 70, a stationary portion 80 and connecting portions 91, 92 and 93. The micro movable device X8 is made by processing a material substrate, which is an SOI wafer, by bulk micromachining such as MEMS. The material substrate has a laminated structure made up of a first and a second silicon layers and an insulating layer intervening between the silicon layers. Each of the silicon layers is made electrically conductive by doping impurity. The above-described portions of the micro movable device X8 are mainly made of the first silicon layer and/or the second silicon layer. FIG. 60 illustrates the first silicon layer side, whereas FIG. 61 illustrates the second silicon layer side. For a better understanding, the portions made of the first silicon layer are indicated by hatching in FIG. 60, whereas the portions made of the second silicon layer are indicated by hatching in FIG. 61.

The movable member 70 is mainly made of the first silicon layer. The movable member 70 includes a disc-shaped land 71A, three arms 71B and electrodes 72, 73 and 74. On the land 71A, a mirror surface 71a having a light reflecting function is provided. Each of the arms 71B extends from the periphery 71b of the land 71A. Each of the electrodes 72, 73 and 74 has a comb-tooth electrode structure including a set of electrode teeth projecting from the periphery 71b of the land 71A. The electrodes 72, 73 and 74 are electrically connected to each other via the land 71A. Each of the electrodes 72, 73 and 74 is positioned between two adjacent arms 71B in the circumferential direction of the land 71A. The arms 71B and the electrodes 72, 73 and 74 extend radially outward from the periphery 71b of the land 71A.

The stationary portion 80 includes a frame 81, and electrodes 82, 83 and 84. As illustrated in FIGS. 60 and 61, the frame 81 surrounds the movable member 70. As illustrated in FIGS. 62-64, the frame 81 has a laminated structure made up of a first layer 81A made of the first silicon layer, a second layer 81B made of the second silicon layer, and an insulating layer 81C intervening between the first and the second layers 81A and 81B. The second layer 81B includes portions 81a, 81b and 81c. The first layer 81A and the second layer 81B are electrically separated. The portions 81a, 81b, 81c are electrically separated. As illustrated in FIG. 60, an electrode pad 81A' is provided on the first layer 81A. As illustrated in FIG. 61, electrode pads 81a', 81b' and 81c' are provided on the portions 81a, 81b and 81c of the second layer 81B.

The electrodes 82, 83 and 84 are made of the second silicon layer. The electrode 82 has a comb-tooth electrode structure including a set of electrode teeth projecting from the portion 81a of the second layer 81B of the frame 81 toward the movable member 70. The electrode 82 is arranged to face the above-described electrode 72 as illustrated in FIG. 62 and cooperates with the electrode 72 to generate an electrostatic attraction force. The electrode 83 has a comb-tooth electrode structure including a set of electrode teeth projecting from the portion 81b of the second layer 81B toward the movable member 70. The electrode 83 is arranged to face the above-described electrode 73 as illustrated in FIG. 63 and cooperates with the electrode 73 to generate an electrostatic attraction force. The electrode 84 is arranged to face the above-described electrode 74 as illustrated in FIG. 64 and cooperates with the electrode 74 to generate an electrostatic attraction force. The electrodes 82, 83, 84 are electrically separated.

The connecting portions 91-93 are connection bars made of the first silicon layer and connecting the movable member 70 and the stationary portion 80 to each other. Each of the connecting portions 91-93 is connected to one of the arms 71B of the movable member 70 and also connected to the first layer 81A of the frame 81 of the stationary portion 80. The point at which the connecting portion 91 and the arm 71B of the movable member 70 are connected to each other is referred to as a connection point P1. The point at which the connecting portion 92 and the arm 71B of the movable member 70 are connected to each other is referred to as a connection point P2. The point at which the connecting portion 93 and the arm 71B of the movable member 70 are connected to each other is referred to as a connection point P3. As illustrated in FIGS. 62-64, the connecting portions 91-93 are smaller in thickness than the movable member 70 and the first layer 81A of the frame 81.

Figure 65:
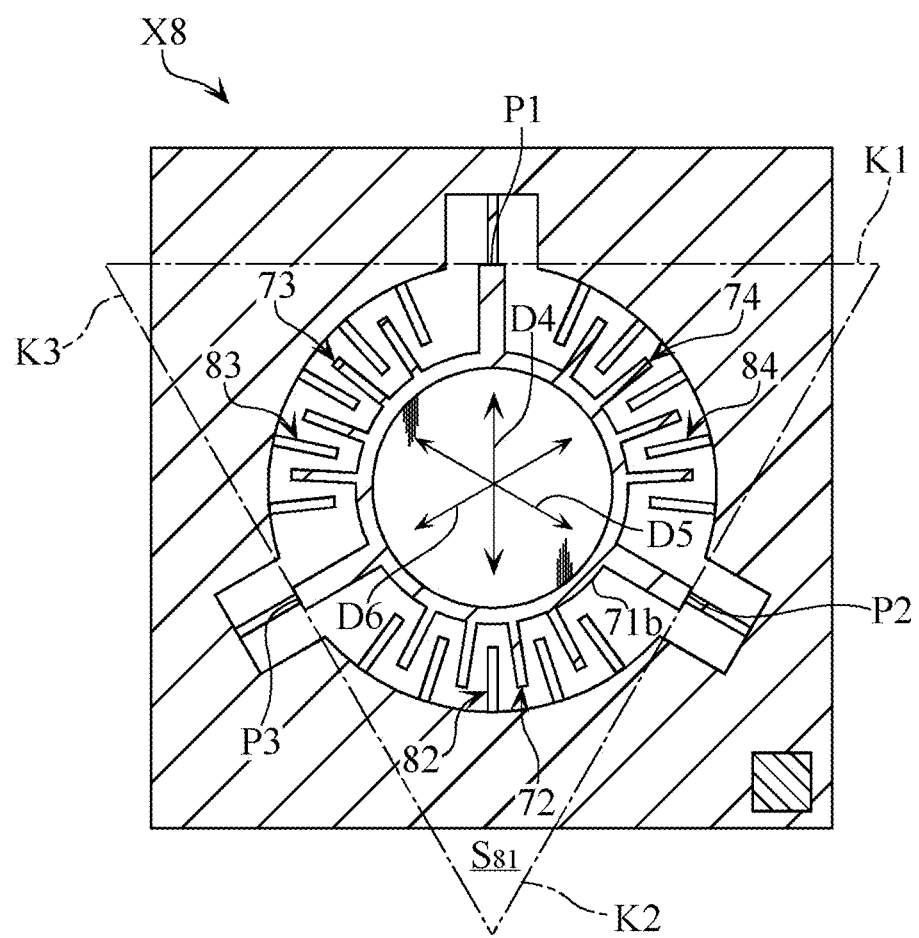
FIG. 65 is a plan view illustrating internal regions according to the eighth embodiment.

In the micro movable device X8, the electrodes 71-73 projecting from the periphery 71b of the land 71A does not extend beyond the connection point P1 in the spacing direction D4 in which the connection point P1 and the land 71A are spaced from each other. Further, the electrodes 71-73 do not extend beyond the connection point P2 in the spacing direction D5 in which the connection point P2 and the land 71A are spaced from each other. Moreover, the electrodes 71-73 do not extend beyond the connection point P3 in the spacing direction D6 in which the connection point P3 and the land 71A are spaced from each other. In FIG. 65, a hypothetical surface extending perpendicularly to the spacing direction D4 of the connection point P1 and the land 71A and passing through the connection point P1 is referred to as a surface K1. Similarly, a hypothetical surface extending perpendicularly to the spacing direction D5 of the connection point P2 and the land 71A and passing through the connection point P2 is referred to as a surface K2. Similarly, a hypothetical surface extending perpendicularly to the spacing direction D6 of the connection point P3 and the land 71A and passing through the connection point P3 is referred to as a surface K3. In this state, the entirety of the electrodes 72-74 of the movable member 70, which are utilized for generating an electrostatic attraction force with the electrodes 82-84 of the stationary portion 80, is positioned within the internal region $S_{81}$ surrounded or enclosed by the surfaces K1, K2 and K3.

In the micro movable device X8, the movable member 70 is translated in the thickness direction H indicated in FIG. 62 by applying a driving voltage across the electrodes 72 and 82, the electrodes 73 and 83 and the electrodes 74 and 84. The potential application to the electrodes 72-74 by the voltage application is achieved via the electrode pad 81A' on the first layer 81A of the frame 81 of the stationary portion 80, the first layer 81A, the connecting portions 91-93, and the arms 71B and land 71A of the movable member 70. To the electrodes 72-74, e.g. a ground potential is applied. The potential application to the electrode 82 by the voltage application is achieved via the electrode pad 81a' on the portion 81a of the second layer 81B of the frame of the stationary portion 80 and the portion 81a. The potential application to the electrode 83 is achieved via the electrode pad 81b' on the portion 81b of the second layer 81B of the frame 81 and the portion 81b. The potential application to the electrode 84 is achieved via the electrode pad 81c' on the portion 81c of the second layer 81B of the frame 81 and the portion 81c. The potential to be applied to the electrodes 82-84 can be set individually for each electrode.

When no voltage is applied across the electrodes 72 and 82, the electrodes 73 and 83, and the electrodes 74 and 84, the movable member 70, which is connected to the stationary portion 80 via the connecting portions 91-93, is at a position in the natural state as illustrated in FIG. 62. When a potential difference is generated by the application of a driving voltage across the electrodes 72 and 82, an electrostatic attraction force is generated between the electrodes 72 and 82. When a potential difference is generated by the application of a driving voltage across the electrodes 73 and 83, an electrostatic attraction force is generated between the electrodes 73 and 83. When a potential difference is generated by the application of a driving voltage across the electrodes 74 and 84, an electrostatic attraction force is generated between the electrodes 74 and 84. The electrostatic attraction forces generated in this way act on the electrodes 72-74 as a driving force, so that the electrodes 72-74 of the movable member 70 are attracted to the electrodes 82-84 of the stationary portion 80, respectively. In this process, tension is applied to the connecting portions 91-93, so that the connection bars are elastically deformed. Since the electrodes 72-74 are attracted to the electrodes 82-84, the movable member 70 is translated in the thickness direction H. The amount of translation depends on the magnitude of the driving force applied to the electrodes 72-74 of the movable member 70. The amount of translation of the movable member 70 from the position in the natural state can be changed by controlling the voltage to be applied to each set of the electrodes and thereby adjusting the driving force.

When the electrostatic attraction force is eliminated, the connecting portions 91-93 recover the original shape, and the movable member 70 returns to the initial position (position in the natural state).

When the light is to impinge on the mirror surface 71a on the land 71A at right angles for reflection, the reflection position of the light on the mirror surface 71a can be changed by translating the movable member 70 in the above-described manner, so that the optical path length of the light can be changed.

As noted before, in the micro movable device X8, the entirety of the electrodes 72-74 of the movable member 70, which are utilized for generating an electrostatic attraction force with the electrodes 82-84 of the stationary portion 80, is positioned within the internal region $S_{81}$ surrounded or enclosed by the surfaces K1, K2 and K3. Thus, in translating the movable member 70 from the position in the natural state or changing the amount of the translation, the electrostatic attraction force as the driving force acts on the movable member 70, or the electrodes 72-74 within the internal region $S_{81}$. This is suitable for suppressing the rotation of the movable member 70 in translating the movable member 70 or changing the amount of the translation.

In the micro movable device X8, the connecting portions 91-93 are connected respectively to the arms 71B extending from the land 71A of the movable member 70. This arrangement is suitable for positioning the electrodes 72-74 extending from the land 71A in the internal region $S_{81}$.

Figure 66:
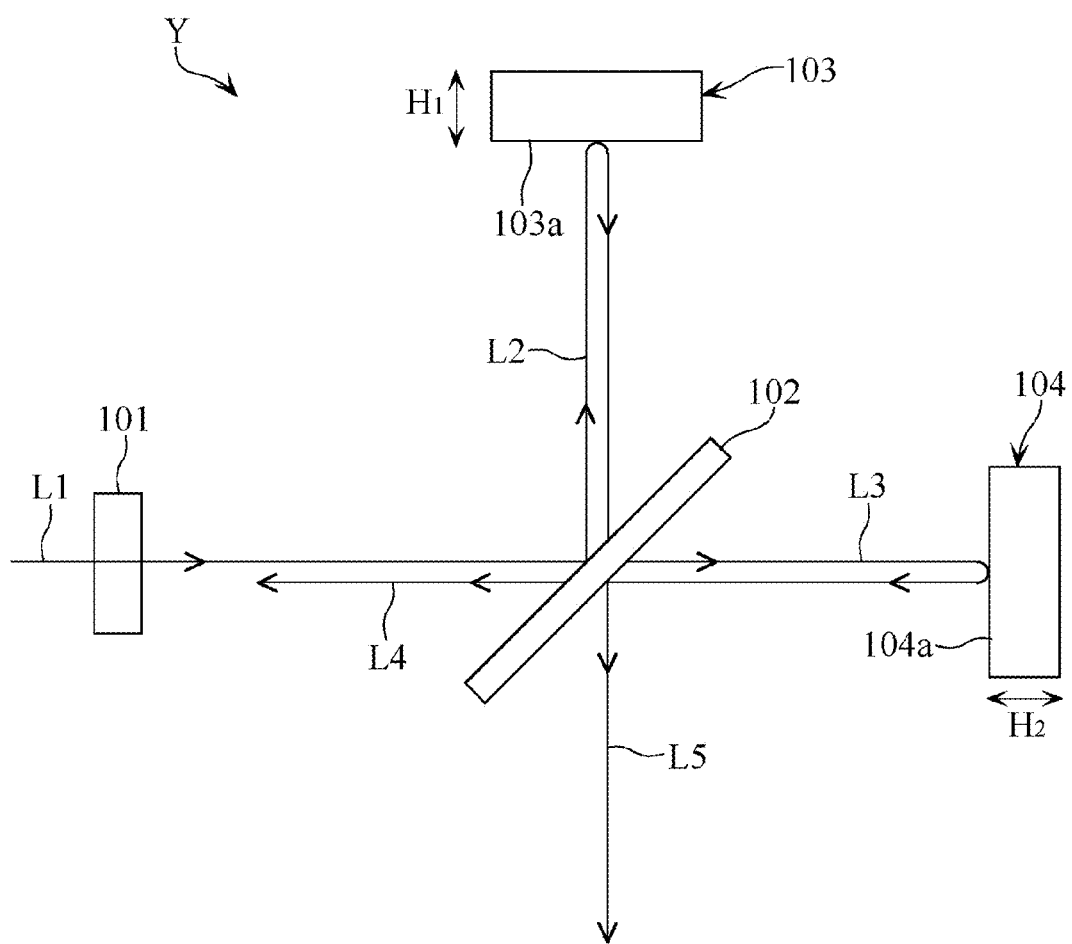
FIG. 66 schematically illustrates an interferometer according to a ninth embodiment.

FIG. 66 schematically illustrates the structure of an interferometer Y according to a ninth embodiment. The interferometer Y is a Michelson delay interferometer including a lens 101, a half mirror 102, light reflectors 103 and 104, and a detector system (not illustrated).

The lens 101 converts the light L1 emitted from a predetermined light source into parallel rays. The lens 101 may be a collimator lens. Part of the light L1 passing through the lens 101 is reflected by the half mirror 102 to travel as branch light L2, while part of the light L1 passes through the half mirror 102 to travel as branch light L3. The branch light L2 and the branch light L3 are reflected by the reflectors 103 and 104, respectively, and then caused to be superimposed on and interfere with each other at the half mirror 102 to be divided into coherent light L4 and coherent light L5. The reflector 103 has a mirror surface 103a for reflecting the branch light L2 traveling from the half mirror 102 toward the half mirror 102. The mirror surface 103a can be translated in the arrow $H_1$ direction so that the optical path length of the branch light L2 which reciprocates between the half mirror 102 and the mirror surface 103a is changeable. In this embodiment, the reflector 103 is provided by any one of the above-described micro movable devices X1-X8. (Thus, the mirror surface 103a is any one of the mirror surfaces 11a, 41a and 71a). The reflector 104 has a mirror surface 104a for reflecting the branch light L3 traveling from the half mirror 102 toward the half mirror 102. The mirror surface 104a can be translated in the arrow $H_2$ direction so that the optical path length of the branch light L3 which reciprocates between the half mirror 102 and the mirror surface 104a is changeable. In this embodiment, the reflector 104 is provided by any one of the above-described micro movable devices X1-X8. (Thus, the mirror surface 104a is any one of the mirror surfaces 11a, 41a and 71a). The optical path length of the branch light L2 is set to be longer than that of the branch light L3. Thus, when the branch light L2 and the branch light L3 are to be superimposed at the half mirror 102 after the reflection at the reflectors 103 and 104, the branch light L2 is delayed for a predetermined period of time relative to the branch light L3. The light intensity ratio of the coherent light L4 and the coherent light L5 varies depending on the phase difference of the branch light L2 and the branch light L3 being superimposed at the half mirror 102. The detector system includes a light receiving element for receiving the coherent light L4 and a light receiving element for receiving the coherent light L5.

The interferometer Y may be used as a demodulator for demodulating optical signals (DPSK optical signals) modulated by differential phase shift keying (DPSK). When the interferometer Y is used as the demodulator, the detector system includes a parallel light detector which includes light receiving elements for receiving the coherent light L4, L5 and is capable of performing parallel detection based on the electrical signals outputted from each light receiving element. The DPSK can be employed as a modulation technique in an optical communication system utilizing dense wavelength division multiplexing (WDM).

When the interferometer Y is used as a demodulator for demodulating DPSK optical signals, the light L1, which is DPSK optical signals emitted from a non-illustrated optical fiber, is converted into parallel rays at the lens 101 and then divided into the branch light L2 and the branch light L3 at the half mirror 102. The branch light L2 is reflected at the mirror surface 103a of the reflector 103 toward the half mirror 102. The branch light L3 is reflected at the mirror surface 104a of the reflector 104 toward the half mirror 102. After the reflection at the reflectors 103 and 104, the branch light L2 and the branch light L3 are superimposed on each other for interference at the half mirror 102 and divided into coherent light L4 and coherent light L5. In the superimposing process, the optical path lengths of the branch light L2 and the branch light L3 are so adjusted that the branch light L2 is delayed relative to the branch light L3 for a period of time corresponding to the one bit cycle of a DPSK optical signal. (The optical path length of the branch light L2 is longer than that of the branch light L3). The optical path length of the branch light L2, which reciprocates between the half mirror 102 and the mirror surface 103a of the reflector 103, can be adjusted by appropriately translating the mirror surface 103a in the arrow $H_2$ direction to adjust the amount of translation. The optical path length of the branch light L3, which reciprocates between the half mirror 102 and the mirror surface 104a of the reflector 104, can be adjusted by appropriately translating the mirror surface 104a in the arrow $H_2$ direction to adjust the amount of translation. In the detector system, the coherent light L4 traveling from the half mirror 102 is caused to pass through a converging lens after reflection at a reflection mirror, and is then received by a light receiving element of the parallel light detector. The coherent light L5 traveling from the half mirror 102 is caused to pass through a converging lens after reflection at a reflection mirror, and is then received by another light receiving element of the parallel light detector. Based on the electrical signals outputted from each of the light receiving elements, the parallel light detector performs parallel detection processing to generate demodulation signals and outputs the demodulation signals. When the one bit cycle of a DPSK optical signal to be demodulated is to be changed, the respective optical path lengths of the branch light L2 and the branch light L3 are so adjusted that, in the superimposing process at the half mirror 102, the branch light L2 is delayed relative to the branch light L3 for a period of time corresponding to the one bit cycle after the change. That is, when the one bit cycle of a DPSK optical signal to be demodulated is to be changed, the amount of translation of at least one of the mirror surfaces 103a and 104a of the reflectors 103 and 104 is changed to correspond to the change of the one bit cycle.

As noted before, in the interferometer Y, each of the reflectors 103 and 104 is provided by any one of the micro movable devices X1-X8. As noted before, the micro movable devices X1-X8 prevent the movable member, which is provided with a mirror surface for light reflection, from rotating when the movable member is being translated from the position in the natural state or when the amount of the translation is being changed. Thus, the interferometer Y ensures that the difference between the optical path lengths of the coherent light L2 and the coherent light L3 is adjusted precisely. Thus, when the interferometer is used as a demodulator for DPSK optical signals, proper demodulation signals are reliably obtained by precisely adjusting the difference between the optical path lengths of the coherent light L2 and the coherent light L3.

In the above-described interferometer Y, both of the reflectors 103 and 104 are provided by any of the micro movable devices X1-X8. However, one of the reflectors 103 and 104 may be provided with a stationary mirror surface. This arrangement also ensures that the difference between the optical path lengths of the coherent light L2 and the coherent light L3 is adjusted precisely.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A micro movable device comprising:
    a movable member including a pair of first electrodes spaced from each other;
    a stationary portion including a pair of second electrodes cooperating with the first electrodes to generate a driving force for translating the movable member in a direction crossing a spacing direction in which the first electrodes are spaced from each other; and
    a plurality of connecting portions each connected to the movable member and the stationary portion:
    wherein the connecting portions include a first connecting portion and a second connecting portion,
    wherein the first connecting portion is connected to the movable member at a first connection point, the second connecting portion is connected to the movable member at a second connection point that is spaced from the first connection point, the first electrodes are positioned between the first connection point and the second connection point as viewed along a spacing direction in which the first connection point and the second connection point are spaced from each other, and no first electrode is located outside of a region located between the first connection point and the second connection point as viewed along the spacing direction in which the first connection point and the second connection point are spaced from each other.

2. The micro movable device according to claim 1, wherein the second electrodes are electrically separated from each other.

3. The micro movable device according to claim 1, wherein each of the first electrodes and the second electrodes is a comb-tooth electrode.

4. The micro movable device according to claim 1, wherein the movable member includes a land and a plurality of arms extending from the land, and each of the first connecting portion and the second connecting portion is connected to one of the arms.

5. The micro movable device according to claim 1, wherein:

the connecting portions include a third connecting portion and a fourth connecting portion;

the third connecting portion is connected to the movable member at a third connection point that is spaced from the first connection point, the first electrodes being positioned between the first connection point and the third connection point as viewed along a spacing direction in which the first connection point and the third connection point are spaced from each other, no first electrode being located outside of a region located between the first connection point and the third connection point as viewed along the spacing direction in which the first connection point and the third connection point are spaced from each other;

the fourth connecting portion is connected to the movable member at a fourth connection point that is spaced from the second connection point, the first electrodes being positioned between the second connection point and the fourth connection point as viewed along a spacing direction in which the second connection point and the fourth connection point are spaced from each other, no first electrode being located outside of a region located between the second connection point and the fourth connection point as viewed along the spacing direction in which the second connection point and the fourth connection point are spaced from each other; and the third connection point and the fourth connection point are spaced from each other, the first electrodes being positioned between the third connection point and the fourth connection point as viewed along a spacing direction in which the third connection point and the fourth connection point are spaced from each other, no first electrode being located outside of a region located between the third connection point and the fourth connection point as viewed along the spacing direction in which the third connection point and the fourth connection point are spaced from each other.

6. The micro movable device according to claim 5, wherein at least one of the first connecting portion, the second connecting portion, the third connecting portion and the fourth connecting portion includes a connection bar extending perpendicularly to the spacing direction of the first electrodes.

7. The micro movable device according to claim 5, wherein at least one of the first connecting portion, the second connecting portion, the third connecting portion and the fourth connecting portion includes a connection bar extending in the spacing direction of the first electrodes.

8. The micro movable device according to claim 1, wherein the movable member includes a pair of third electrodes spaced from each other in a direction that crosses both the spacing direction of the first electrodes and the direction in which the movable member is to be translated, and the stationary portion includes a pair of fourth electrodes cooperating with the third electrodes to generate a driving force for translating the movable member.

9. The micro movable device according to claim 8, wherein the second electrodes are electrically separated from each other, the fourth electrodes are electrically separated from each other, and the second electrodes are electrically separated from the fourth electrodes.

10. The micro movable device according to claim 8, wherein each of the third electrodes and the fourth electrodes is a comb-tooth electrode.

11. The micro movable device according to claim 8, wherein:

the connecting portions include a third connecting portion and a fourth connecting portion;

the third connecting portion is connected to the movable member at a third connection point that is spaced from the first connection point, the first electrodes being positioned between the first connection point and the third connection point as viewed along a spacing direction in which the first connection point and the third connection point are spaced from each other;

the fourth connecting portion is connected to the movable member at a fourth connection point that is spaced from the second connection point, the first electrodes being positioned between the second connection point and the fourth connection point as viewed along a spacing direction in which the second connection point and the fourth connection point are spaced from each other;

the third connection point and the fourth connection point are spaced from each other, the first electrodes being positioned between the third connection point and the fourth connection point as viewed along a spacing direction in which the third connection point and the fourth connection point are spaced from each other;

the third connection point and the second connection point are spaced from each other, the third electrodes being positioned between the third connection point and the second connection point as viewed along a spacing direction in which the third connection point and the second connection point are spaced from each other;

the fourth connection point and the first connection point are spaced from each other, the third electrodes being positioned between the fourth connection point and the first connection point as viewed along a spacing direction in which the fourth connection point and the first connection point are spaced from each other; and the third connection point and the fourth connection point are spaced from each other, the third electrodes being positioned between the third connection point and the fourth connection point as viewed along a spacing direction in which the third connection point and the fourth connection point are spaced from each other.

12. The micro movable device according to claim 11, wherein at least one of the first connecting portion, the second connecting portion, the third connecting portion and the fourth connecting portion includes a connection bar extending perpendicularly to the spacing direction of the first electrodes.

13. The micro movable device according to claim 11, wherein at least one of the first connecting portion, the second connecting portion, the third connecting portion and the fourth connecting portion includes a connection bar extending in the spacing direction of the first electrodes.

14. The micro movable device according to claim 8, wherein:

the movable member includes a land with a plurality of edges, and a plurality of arms each extending from a corresponding one of the edges of the land;

each arm is adjacent to another edge neighboring the corresponding one of the edges, the first electrodes or the third electrodes being arranged to extend from said each arm and said another edge; and each of the first connecting portion, the second connecting portion, the third connecting portion and the fourth connecting portion is connected to one of the arms.

15. An interferometer comprising:

a light source;

a light divider that divides light emitted from the light source into first branch light and second branch light;

a first light reflector including a minor surface for reflecting the first branch light;

a second light reflector including a mirror surface for reflecting the second branch light; and
a superimposing member that causes the reflected first branch light and the reflected second branch light to be superimposed;
wherein at least one of the first light reflector and the second light reflector includes a micro movable device according to claim 1, and the mirror surface of said at least one is provided on the movable member of the micro movable device.

* * * * *